(12) United States Patent
Shimura

(10) Patent No.: US 6,650,849 B2
(45) Date of Patent: Nov. 18, 2003

(54) METHOD OF AND APPARATUS FOR CONTROLLING IMAGE DENSITY OF TONER IMAGE BASED ON HIGH AND LOW-DENSITY CORRELATION DATA

(75) Inventor: Hidetsugu Shimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/042,380

(22) Filed: Jan. 11, 2002

(65) Prior Publication Data
US 2002/0141770 A1 Oct. 3, 2002

(30) Foreign Application Priority Data

| Jan. 12, 2001 | (JP) | 2001-005448 |
| Jan. 22, 2001 | (JP) | 2001-012944 |
| Feb. 21, 2001 | (JP) | 2001-044784 |
| Apr. 9, 2001 | (JP) | 2001-109753 |

(51) Int. Cl.⁷ ............................................. G03G 15/00
(52) U.S. Cl. ..................... 399/49; 347/133; 347/140; 399/138; 399/55
(58) Field of Search ............... 399/43, 44, 46, 399/49, 138, 26, 50; 347/131, 132, 133, 140

(56) References Cited

U.S. PATENT DOCUMENTS

| 4,965,634 A | 10/1990 | Bando |
| 5,072,258 A | 12/1991 | Harada |
| 5,298,944 A | 3/1994 | Sawayama et al. |
| 5,315,351 A | 5/1994 | Matsushiro et al. |
| 5,453,773 A | 9/1995 | Hattori et al. |
| 5,502,550 A | 3/1996 | Hori et al. |
| 5,655,185 A | 8/1997 | Hori et al. |
| 5,701,551 A | * 12/1997 | Honda et al. .............. 399/50 |
| 5,724,627 A | 3/1998 | Okuno et al. |
| 5,734,948 A | 3/1998 | Nagayama et al. |
| 6,226,466 B1 | 5/2001 | Ojima et al. |
| 6,336,008 B1 | 1/2002 | Nakazato et al. |
| 6,341,203 B1 | 1/2002 | Nakazato et al. |

FOREIGN PATENT DOCUMENTS

| EP | 0 949 544 A2 | 10/1999 |
| EP | 1 093 034 A2 | 4/2001 |
| JP | 5-257354 A | * 10/1993 |
| JP | 10-239924 | 9/1998 |

* cited by examiner

Primary Examiner—Joan Pendegrass
(74) Attorney, Agent, or Firm—Sughrue Mion, PLLC

(57) ABSTRACT

After forming solid patch images under various patch generating conditions (E, Vb), the optical densities of the respective patch images are measured by a patch sensor, and patch generating conditions matching with a higher-density side target density (OD=1.2) are extracted as "higher-density side correlation data." Further, line patch images are formed under various patch generating conditions (E, Vb), the optical densities of the respective line patch images are measured by the patch sensor, and patch generating conditions matching with a lower-density side target density (OD=0.2) are extracted as "lower-density side correlation data." An optimal exposure energy and an optimal developing bias are set based on one piece of correlation data (E2, Vb(3)) belonging to said product set of the higher-density side correlation data and the lower-density side correlation data.

46 Claims, 66 Drawing Sheets

F I G. 1 3
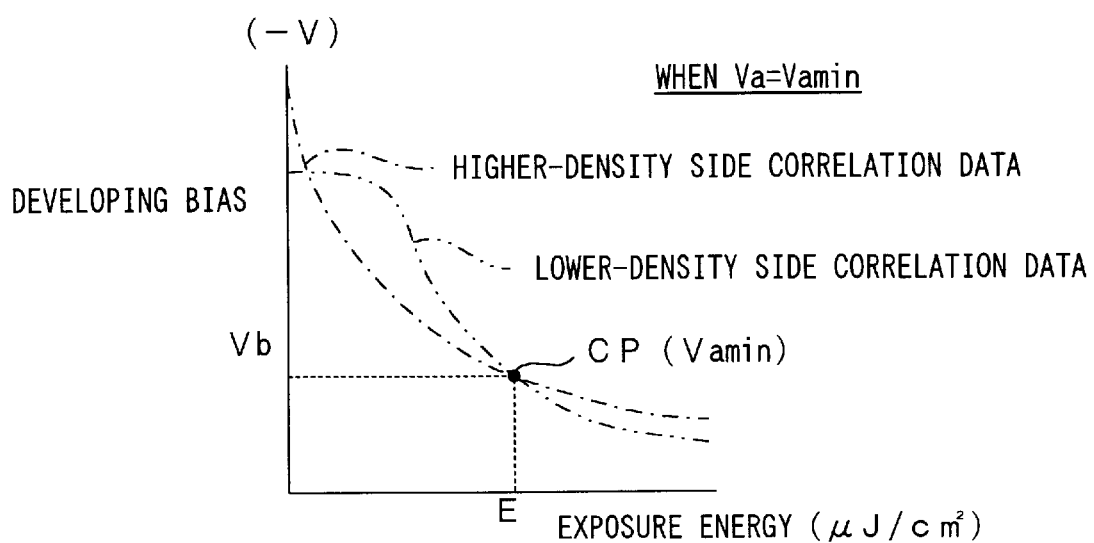

FIG. 19

| CONDITION OF USE | | OPTIMAL CONDITION | |
|---|---|---|---|
| TEMPERATURE /HUMIDITY ENVIRONMENT | FILM THICKNESS OF PHOTO-SENSITIVE MEMBER | OPTIMAL EXPOSURE ENERGY | OPTIMAL DEVELOPING BIAS |
| HH | t1 | E(H1) | Vb(H1) |
| | t2 | E(H2) | Vb(H2) |
| | t3 | E(H3) | Vb(H3) |
| | ... | ... | ... |
| NN | t1 | E(N1) | Vb(N1) |
| | t2 | E(N2) | Vb(N2) |
| | t3 | E(N3) | Vb(N3) |
| | ... | ... | ... |
| LL | t1 | E(L1) | Vb(L1) |
| | t2 | E(L2) | Vb(L2) |
| | t3 | E(L3) | Vb(L3) |
| | ... | ... | ... |

FIG. 21

| CONDITION OF USE | | OPTIMAL CONDITION | | |
|---|---|---|---|---|
| TEMPERATURE /HUMIDITY ENVIRONMENT | FILM THICKNESS OF PHOTO-SENSITIVE MEMBER | OPTIMAL CHARGING BIAS | OPTIMAL EXPOSURE ENERGY | OPTIMAL DEVELOPING BIAS |
| HH | t1 | Va(H1) | E(H1) | Vb(H1) |
| | t2 | Va(H2) | E(H2) | Vb(H2) |
| | t3 | Va(H3) | E(H3) | Vb(H3) |
| | ... | ... | ... | ... |
| NN | t1 | Va(N1) | E(N1) | Vb(N1) |
| | t2 | Va(N2) | E(N2) | Vb(N2) |
| | t3 | Va(N3) | E(N3) | Vb(N3) |
| | ... | ... | ... | ... |
| LL | t1 | Va(L1) | E(L1) | Vb(L1) |
| | t2 | Va(L2) | E(L2) | Vb(L2) |
| | t3 | Va(L3) | E(L3) | Vb(L3) |
| | ... | ... | ... | ... |

FIG. 25A

STEP S41
HIGHER-DENSITY SIDE: HIGHER-DENSITY SIDE TARGET DENSITY = 1.2

| EXPOSURE ENERGY E | DEVELOPING BIAS Vb | OPTICAL DENSITY | HIGHER-DENSITY SIDE CORRELATION DATA |
|---|---|---|---|
| E1 | Vb(1) | 1.25 | |
| E1 | Vb(2) | 1.2 | ○ |
| E1 | Vb(3) | 1.15 | |
| E1 | Vb(4) | 1.05 | |
| E1 | ... | ... | |
| E1 | Vb(n) | 0.8 | |
| E2 | Vb(1) | 1.28 | |
| E2 | Vb(2) | 1.25 | |
| E2 | Vb(3) | 1.2 | ○ |
| E2 | Vb(4) | 1.15 | |
| E2 | ... | ... | |
| E2 | Vb(n) | 0.9 | |
| ... | | | |
| Em | Vb(1) | 1.3 | |
| Em | Vb(2) | 1.28 | |
| Em | Vb(3) | 1.25 | |
| Em | Vb(4) | 1.2 | ○ |
| Em | ... | ... | |
| Em | Vb(n) | 1 | |

FIG. 25B

STEP S42
LOWER-DENSITY SIDE: LOWER-DENSITY SIDE TARGET DENSITY = 0.2

| EXPOSURE ENERGY E | DEVELOPING BIAS Vb | OPTICAL DENSITY | LOWER-DENSITY SIDE CORRELATION DATA |
|---|---|---|---|
| E1 | Vb(1) | 0.2 | ○ |
| E1 | Vb(2) | 0.18 | |
| E1 | Vb(3) | 0.17 | |
| E1 | Vb(4) | 0.15 | |
| E1 | ... | ... | |
| E1 | Vb(n) | 0.1 | |
| E2 | Vb(1) | 0.3 | |
| E2 | Vb(2) | 0.25 | |
| E2 | Vb(3) | 0.2 | ○ |
| E2 | Vb(4) | 0.15 | |
| E2 | ... | ... | |
| E2 | Vb(n) | 0.1 | |
| ... | | | |
| Em | Vb(1) | 0.4 | |
| Em | Vb(2) | 0.33 | |
| Em | Vb(3) | 0.3 | |
| Em | Vb(4) | 0.25 | |
| Em | ... | ... | |
| Em | Vb(n) | 0.2 | ○ |

FIG. 25C

STEP S43
(HIGHER-DENSITY SIDE CORRELATION DATA) ∩ (LOWER-DENSITY SIDE CORRELATION DATA) = (E2, Vb(3))

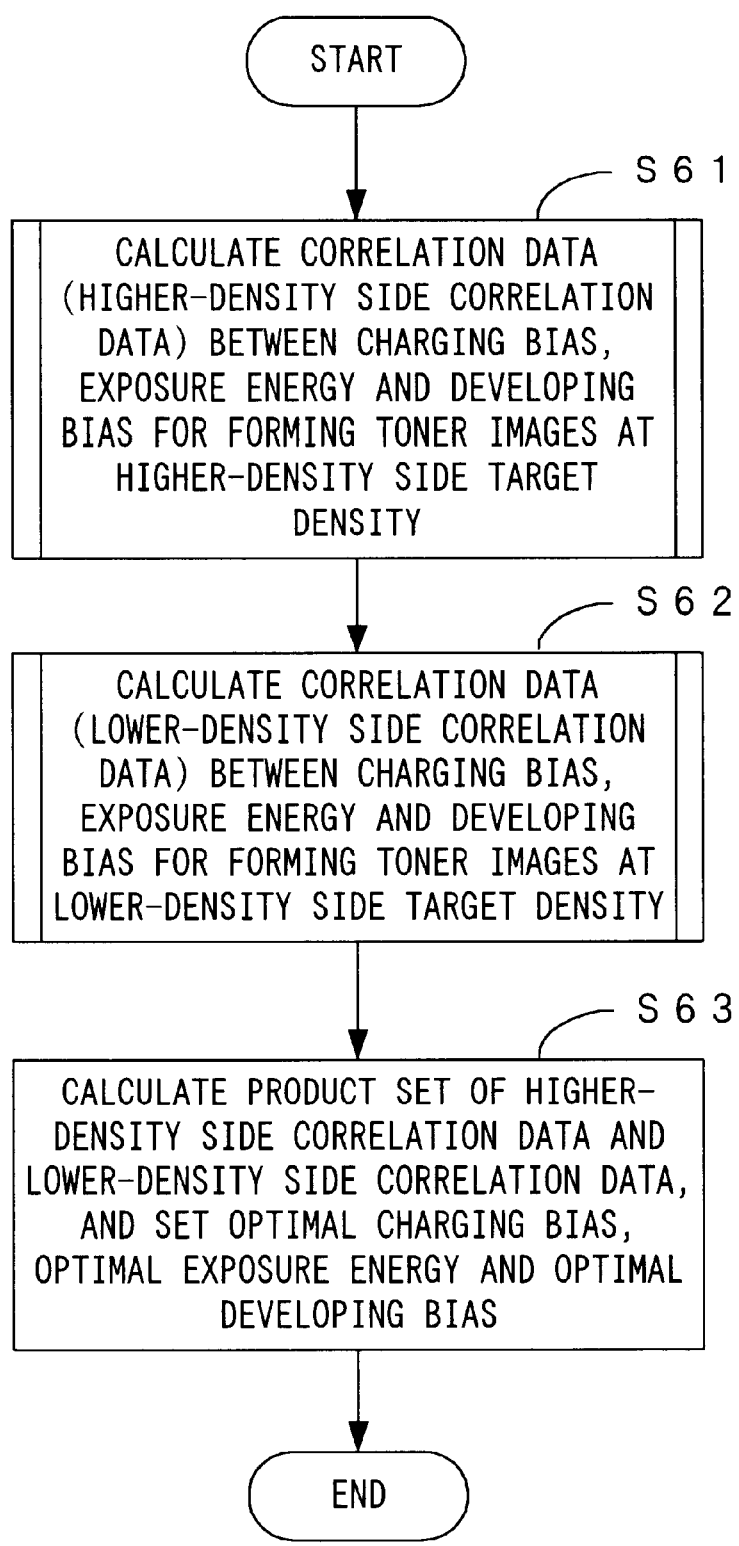

FIG. 34

| CHARGING BIAS Va | EXPOSURE ENERGY E | DEVELOPING BIAS Vb | HIGHER-DENSITY SIDE:OD=1.2 | | LOWER-DENSITY SIDE:OD=0.2 | |
|---|---|---|---|---|---|---|
| | | | OPTICAL DENSITY | HIGHER-DENSITY SIDE CORRELATION DATA | OPTICAL DENSITY | LOWER-DENSITY SIDE CORRELATION DATA |
| Va(1) | E1 | Vb(1) | 1.13 | | 0.19 | |
| | | Vb(2) | 1.08 | | 0.17 | |
| | | ... | ... | | ... | |
| | | Vb(n) | 1.02 | | 0.12 | |
| | E2 | Vb(1) | 1.2 | ○ | 0.23 | |
| | | Vb(2) | 1.15 | | 0.2 | ○ |
| | | ... | ... | | ... | |
| | | Vb(n) | 1.05 | | 0.16 | |
| | ... | ... | ... | | ... | |
| | Em | Vb(1) | 1.22 | | 0.24 | |
| | | Vb(2) | 1.21 | | 0.23 | |
| | | ... | ... | | ... | |
| | | Vb(n) | 1.09 | | 0.2 | ○ |
| Va(2) | E1 | Vb(1) | 1.22 | | 0.2 | ○ |
| | | Vb(2) | 1.2 | ○ | 0.18 | |
| | | ... | ... | | ... | |
| | | Vb(n) | 1.12 | | | |
| | E2 | Vb(1) | 1.24 | | 0.21 | |
| | | Vb(2) | 1.2 | ○ | 0.2 | ○ |
| | | ... | ... | | ... | |
| | | Vb(n) | 1.15 | | 0.15 | |
| | ... | ... | ... | | ... | |
| | Em | Vb(1) | 1.25 | | 0.24 | |
| | | Vb(2) | 1.21 | | 0.23 | |
| | | ... | ... | | ... | |
| | | Vb(n) | 1.18 | | 0.2 | ○ |
| ... | ... | ... | ... | ... | ... | ... |
| Va(k) | E1 | Vb(1) | 1.19 | | 0.21 | |
| | | Vb(2) | 1.15 | | 0.2 | ○ |
| | | ... | ... | | ... | |
| | | Vb(n) | 1.04 | | 0.17 | |
| | E2 | Vb(1) | 1.2 | ○ | 0.24 | |
| | | Vb(2) | 1.15 | | 0.23 | |
| | | ... | ... | | ... | |
| | | Vb(n) | 1.07 | | 0.21 | |
| | ... | ... | ... | | ... | |
| | Em | Vb(1) | 1.21 | | 0.25 | |
| | | Vb(2) | 1.2 | ○ | 0.24 | |
| | | ... | ... | | ... | |
| | | Vb(n) | 1.16 | | 0.22 | |

STEP S21
HIGHER-DENSITY SIDE: HIGHER-DENSITY SIDE TARGET DENSITY = 1.2

| EXPOSURE ENERGY E | DEVELOPING BIAS Vb | OPTICAL DENSITY | HIGHER-DENSITY SIDE COMBINATION |
|---|---|---|---|
| E1(t) | Vb1(t) | 1.25 | |
| E1(t) | Vb2(t) | 1.2 | ○ |
| E1(t) | Vb3(t) | 1.15 | |
| E1(t) | Vb4(t) | 1.05 | |
| E1(t) | ... | 0.8 | |
| E2(t) | Vb1(t) | 1.28 | |
| E2(t) | Vb2(t) | 1.25 | |
| E2(t) | Vb3(t) | 1.2 | ○ |
| E2(t) | Vb4(t) | 1.15 | |
| E2(t) | ... | 0.9 | |
| ... | | | |
| Em(t) | Vb1(t) | 1.3 | |
| Em(t) | Vb2(t) | 1.28 | |
| Em(t) | Vb3(t) | 1.25 | |
| Em(t) | Vb4(t) | 1.2 | ○ |
| Em(t) | ... | 1 | |

FIG. 51A

STEP S22
LOWER-DENSITY SIDE: LOWER-DENSITY SIDE TARGET DENSITY = 0.2

| EXPOSURE ENERGY E | DEVELOPING BIAS Vb | OPTICAL DENSITY | LOWER-DENSITY SIDE COMBINATION |
|---|---|---|---|
| E1(t) | Vb1(t) | 0.2 | ○ |
| E1(t) | Vb2(t) | 0.18 | |
| E1(t) | Vb3(t) | 0.17 | |
| E1(t) | Vb4(t) | 0.15 | |
| E1(t) | ... | 0.1 | |
| E2(t) | Vb1(t) | 0.3 | |
| E2(t) | Vb2(t) | 0.25 | |
| E2(t) | Vb3(t) | 0.2 | ○ |
| E2(t) | Vb4(t) | 0.15 | |
| E2(t) | ... | 0.1 | |
| ... | | | |
| Em(t) | Vb1(t) | 0.4 | |
| Em(t) | Vb2(t) | 0.33 | |
| Em(t) | Vb3(t) | 0.3 | |
| Em(t) | Vb4(t) | 0.25 | |
| Em(t) | ... | 0.2 | ○ |

FIG. 51B

STEP S23
(HIGHER-DENSITY SIDE COMBINATION) ∩ (LOWER-DENSITY SIDE COMBINATION) = (E2(t), Vb3(t))

STEP S201
HIGHER-DENSITY SIDE: HIGHER-DENSITY SIDE TARGET DENSITY = 1.2

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | |
| E1 | Vb(2) | 1.2 | ○ |
| E1 | Vb(3) | 0.9 | |
| E1 | Vb(4) | 0.8 | |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | ○ |
| E2 | Vb(4) | 1.05 | |
| E2 | Vb(5) | 0.8 | |
| E2 | Vb(6) | 0.7 | |
| ... | | | |
| Em | Vb(1) | 1.32 | |
| Em | Vb(2) | 1.3 | |
| Em | Vb(3) | 1.25 | |
| Em | Vb(4) | 1.2 | ○ |
| Em | Vb(5) | 1.1 | |
| Em | Vb(6) | 0.8 | |

FIG. 62B

STEP S202
LOWER-DENSITY SIDE: LOWER-DENSITY SIDE TARGET DENSITY = 0.2

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | ○ |
| E1 | Vb(2) | 0.1 | |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | |
| E2 | Vb(2) | 0.25 | |
| E2 | Vb(3) | 0.2 | ○ |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | |
| Em | Vb(5) | 0.25 | |
| Em | Vb(6) | 0.2 | ○ |

FIG. 62C

STEP S203
(HIGHER-DENSITY SIDE COMBINATION) ∩ (LOWER-DENSITY SIDE COMBINATION) = (E2, Vb(3))

FIG. 63A

STEP S201
HIGHER-DENSITY SIDE: HIGHER-DENSITY SIDE TARGET DENSITY = 1.2

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | |
| E1 | Vb(2) | 1.2 | ○ |
| E1 | Vb(3) | 0.9 | |
| E1 | Vb(4) | 0.8 | |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | ○ |
| E2 | Vb(4) | 1.05 | |
| E2 | Vb(5) | 0.8 | |
| E2 | Vb(6) | 0.7 | |
| ... | | | |
| Em | Vb(1) | 1.32 | |
| Em | Vb(2) | 1.3 | |
| Em | Vb(3) | 1.25 | |
| Em | Vb(4) | 1.2 | ○ |
| Em | Vb(5) | 1.1 | |
| Em | Vb(6) | 0.8 | |

FIG. 63B

STEP S202
LOWER-DENSITY SIDE: LOWER-DENSITY SIDE TARGET DENSITY = 0.1

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | |
| E1 | Vb(2) | 0.1 | ○ |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | |
| E2 | Vb(2) | 0.25 | |
| E2 | Vb(3) | 0.2 | |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | |
| Em | Vb(5) | 0.25 | |
| Em | Vb(6) | 0.2 | |

FIG. 63C

STEP S204
(HIGHER-DENSITY SIDE COMBINATION) ∩ (LOWER-DENSITY SIDE COMBINATION) = (E1, Vb(2))

FIG. 64A

STEP S201
HIGHER-DENSITY SIDE: HIGHER-DENSITY SIDE TARGET DENSITY = 1.3

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | ○ |
| E1 | Vb(2) | 1.2 | |
| E1 | Vb(3) | 0.9 | |
| E1 | Vb(4) | 0.8 | |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | |
| E2 | Vb(4) | 1.05 | |
| E2 | Vb(5) | 0.8 | |
| E2 | Vb(6) | 0.7 | |
| ... | | | |
| Em | Vb(1) | 1.32 | |
| Em | Vb(2) | 1.3 | ○ |
| Em | Vb(3) | 1.25 | |
| Em | Vb(4) | 1.2 | |
| Em | Vb(5) | 1.1 | |
| Em | Vb(6) | 0.8 | |

FIG. 64B

STEP S202
LOWER-DENSITY SIDE: LOWER-DENSITY SIDE TARGET DENSITY = 0.2

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | ○ |
| E1 | Vb(2) | 0.1 | |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | |
| E2 | Vb(2) | 0.25 | |
| E2 | Vb(3) | 0.2 | ○ |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | |
| Em | Vb(5) | 0.25 | |
| Em | Vb(6) | 0.2 | ○ |

FIG. 64C

STEP S205
(HIGHER-DENSITY SIDE COMBINATION) ∩ (LOWER-DENSITY SIDE COMBINATION) = (E1, Vb(1))

FIG. 65A

STEP S201
HIGHER-DENSITY SIDE: HIGHER-DENSITY SIDE TARGET DENSITY = 1.2

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | |
| E1 | Vb(2) | 1.2 | ○ |
| E1 | Vb(3) | 0.9 | |
| E1 | Vb(4) | 0.8 | |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | ○ |
| E2 | Vb(4) | 1.05 | |
| E2 | Vb(5) | 0.8 | |
| E2 | Vb(6) | 0.7 | |
| ... | | | |
| Em | Vb(1) | 1.32 | |
| Em | Vb(2) | 1.3 | |
| Em | Vb(3) | 1.25 | |
| Em | Vb(4) | 1.2 | ○ |
| Em | Vb(5) | 1.1 | |
| Em | Vb(6) | 0.8 | |

FIG. 65B

STEP S202
LOWER-DENSITY SIDE: LOWER-DENSITY SIDE TARGET DENSITY = 0.3

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | |
| E1 | Vb(2) | 0.1 | |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | ○ |
| E2 | Vb(2) | 0.25 | |
| E2 | Vb(3) | 0.2 | |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | ○ |
| Em | Vb(5) | 0.25 | |
| Em | Vb(6) | 0.2 | |

FIG. 65C

STEP S206
(HIGHER-DENSITY SIDE COMBINATION) ∩ (LOWER-DENSITY SIDE COMBINATION) = (Em, Vb(4))

FIG. 66A

STEP S201
HIGHER-DENSITY SIDE: HIGHER-DENSITY SIDE TARGET DENSITY = 0.8

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | |
| E1 | Vb(2) | 1.2 | |
| E1 | Vb(3) | 0.9 | |
| E1 | Vb(4) | 0.8 | ◯ |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | |
| E2 | Vb(4) | 1.05 | |
| E2 | Vb(5) | 0.8 | ◯ |
| E2 | Vb(6) | 0.7 | |
| ... | | | |
| Em | Vb(1) | 1.32 | |
| Em | Vb(2) | 1.3 | |
| Em | Vb(3) | 1.25 | |
| Em | Vb(4) | 1.2 | |
| Em | Vb(5) | 1.1 | |
| Em | Vb(6) | 0.8 | ◯ |

FIG. 66B

STEP S202
LOWER-DENSITY SIDE: LOWER-DENSITY SIDE TARGET DENSITY = 0.2

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | ◯ |
| E1 | Vb(2) | 0.1 | |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | |
| E2 | Vb(2) | 0.25 | |
| E2 | Vb(3) | 0.2 | ◯ |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | |
| Em | Vb(5) | 0.25 | |
| Em | Vb(6) | 0.2 | ◯ |

FIG. 66C

STEP S207
(HIGHER-DENSITY SIDE COMBINATION) ∩ (LOWER-DENSITY SIDE COMBINATION) = (Em, Vb(6))

FIG. 67A

STEP S201
HIGHER-DENSITY SIDE: HIGHER-DENSITY SIDE TARGET DENSITY = 1.3

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | ◯ |
| E1 | Vb(2) | 1.2 | |
| E1 | Vb(3) | 0.9 | |
| E1 | Vb(4) | 0.8 | |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | |
| E2 | Vb(4) | 1.05 | |
| E2 | Vb(5) | 0.8 | |
| E2 | Vb(6) | 0.7 | |
| ... | | | |
| Em | Vb(1) | 1.32 | |
| Em | Vb(2) | 1.3 | ◯ |
| Em | Vb(3) | 1.25 | |
| Em | Vb(4) | 1.2 | |
| Em | Vb(5) | 1.1 | |
| Em | Vb(6) | 0.8 | |

FIG. 67B

STEP S202
LOWER-DENSITY SIDE: LOWER-DENSITY SIDE TARGET DENSITY = 0.3

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | |
| E1 | Vb(2) | 0.1 | |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | ◯ |
| E2 | Vb(2) | 0.25 | |
| E2 | Vb(3) | 0.2 | |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | ◯ |
| Em | Vb(5) | 0.25 | |
| Em | Vb(6) | 0.2 | |

FIG. 67C

STEP S208
(HIGHER-DENSITY SIDE COMBINATION) ∩ (LOWER-DENSITY SIDE COMBINATION) = (E3, Vb(1.5))

FIG. 68A

STEP S201
HIGHER-DENSITY SIDE: HIGHER-DENSITY SIDE TARGET DENSITY = 0.8

| EXPOSURE ENERGY E | DEVELOPING BIAS Vb | OPTICAL DENSITY | HIGHER-DENSITY SIDE COMBINATION |
|---|---|---|---|
| E1 | Vb(1) | 1.3 | |
| E1 | Vb(2) | 1.2 | |
| E1 | Vb(3) | 0.9 | |
| E1 | Vb(4) | 0.8 | ○ |
| E1 | Vb(5) | 0.6 | |
| E1 | Vb(6) | 0.5 | |
| E2 | Vb(1) | 1.31 | |
| E2 | Vb(2) | 1.25 | |
| E2 | Vb(3) | 1.2 | |
| E2 | Vb(4) | 1.05 | |
| E2 | Vb(5) | 0.8 | ○ |
| E2 | Vb(6) | 0.7 | |
| ... | | | |
| Em | Vb(1) | 1.32 | |
| Em | Vb(2) | 1.3 | |
| Em | Vb(3) | 1.25 | |
| Em | Vb(4) | 1.2 | |
| Em | Vb(5) | 1.1 | |
| Em | Vb(6) | 0.8 | ○ |

FIG. 68B

STEP S202
LOWER-DENSITY SIDE: LOWER-DENSITY SIDE TARGET DENSITY = 0.1

| EXPOSURE ENERGY E | DEVELOPING BIAS Vb | OPTICAL DENSITY | LOWER-DENSITY SIDE COMBINATION |
|---|---|---|---|
| E1 | Vb(1) | 0.2 | |
| E1 | Vb(2) | 0.1 | ○ |
| E1 | Vb(3) | 0.08 | |
| E1 | Vb(4) | 0.07 | |
| E1 | Vb(5) | 0.06 | |
| E1 | Vb(6) | 0.05 | |
| E2 | Vb(1) | 0.3 | |
| E2 | Vb(2) | 0.25 | |
| E2 | Vb(3) | 0.2 | |
| E2 | Vb(4) | 0.15 | |
| E2 | Vb(5) | 0.09 | |
| E2 | Vb(6) | 0.08 | |
| ... | | | |
| Em | Vb(1) | 0.4 | |
| Em | Vb(2) | 0.38 | |
| Em | Vb(3) | 0.33 | |
| Em | Vb(4) | 0.3 | |
| Em | Vb(5) | 0.25 | |
| Em | Vb(6) | 0.2 | |

FIG. 68C

STEP S209
(HIGHER-DENSITY SIDE COMBINATION) ∩ (LOWER-DENSITY SIDE COMBINATION) = (E1.5, Vb(4.5))

METHOD OF AND APPARATUS FOR CONTROLLING IMAGE DENSITY OF TONER IMAGE BASED ON HIGH AND LOW-DENSITY CORRELATION DATA

BACKGROUND OF THE INVENTION

1. Field of the Invention

The present invention relates to control of an image density in an image forming apparatus which forms an electrostatic latent image by exposing a surface of a photosensitive member with a light beam and thereafter visualizes the electrostatic latent image with toner to thereby create a toner image.

2. Description of the Related Art

In this type of image forming apparatus, the image densities of toner images become sometimes different because of differences among the individual apparatuses, a change with time or fatigue of a photosensitive member and toner, a change in temperature and/or humidity around the apparatus, etc. Noting this, techniques for stabilizing an image density have been proposed which require to calculate optimal values of a charging bias and a developing bias, namely, an optimal charging bias and an optimal developing bias and set the charging bias and the developing bias respectively to the optimal charging bias and the optimal developing bias. For example, according to the invention described in Japanese Patent Application Unexamined Gazette No. H10-239924, predetermined toner images are formed on a photosensitive member as patch images while changing a charging bias and a developing bias and the image density of each reference patch is measured. Based on thus measured values, an optimal charging bias and an optimal developing bias for achieving target densities in two gradation levels, i.e., a lower-density side target density and a higher-density side target density, are determined.

However, with an approach requiring to form a plurality of patch images while changing a charging bias, since a photo-induced discharge characteristic of a photosensitive member changes with a change in charging bias and an electric potential in an exposed area largely changes, although an optimal developing bias for attaining a higher-density side target density for instance can be calculated, it is sometimes impossible to calculate an optimal charging bias which is for attaining a lower-density side target density. The opposite situation as well can occur. Thus, with a conventional apparatus noting a charging bias and a developing bias as density adjustment factors for adjusting the image densities of toner images, it is difficult to stabilize the image densities of toner images in a wide density range.

Further, in this type of image forming apparatus, since an abutting member, such as a cleaning part for clearing residual toner remaining on a surface of a photosensitive member, abuts on the photosensitive member, the film thickness of a carrier transport layer decreases in accordance with an increase in cumulative number of revolutions or the like of the photosensitive member. This changes an electric field upon the carrier transport layer, and hence, changes a photo-induced discharge characteristic of the photosensitive member because of changed mobility of carrier. The change in photo-induced discharge characteristic of the photosensitive member also changes a development γ characteristic. Such changes in characteristic due to the change in film thickness of the photosensitive member may further invite the following problems.

The first problem is that even though the density adjustment factors are set to optimal values in advance and the image densities of toner images are accordingly controlled to target densities, as the photo-induced discharge characteristic of the photosensitive member changes due to the change in film thickness of the photosensitive member, the optimal values of the density adjustment factors as well change. A result of this is a deviation of the image densities of the toner images from the target densities.

Meanwhile, so-called patch sensing method has been used frequently for optimization of the density adjustment factors. During patch sensing, patch images are created while modifying the density adjustment factors within a programmable range determined in advance, and optimal values of the density adjustment factors are determined based on the image densities of the respective patch images. At this stage, the photo-induced discharge characteristic of the photosensitive member may sometimes change due to a change in film thickness of the photosensitive member, whereby the optimal values of the density adjustment factors exceed the programmable range. When this occurs, it becomes impossible to calculate the optimal values of the density adjustment factors, and hence, control the image densities of the toner images to the target densities.

In addition, since the density adjustment factors are controlled so that the image densities of the toner images are always the target densities in the conventional image forming apparatus as described above, the apparatus can not flexibly respond to a demand from a user, and therefore, has a problem in terms of versatility. This is because a user in some cases wishes to create an image at a density which is different from an image density, i.e. reference target density set as a default value by a manufacturer. For instance, it is sometimes desirable to develop a thin line darker than the reference target density in a CAD view or an image with a great number of characters. Further, when one wishes to confirm the overall layout, the hue or the like of a print image before actually obtaining a final print output, it may be desirable to lower the density of the entire image to the extent that confirmation will not be hampered and accordingly suppress the consumption of toner. Despite this, since an image density is controlled by means of the reference target density set in advance in the conventional image forming apparatus, it is difficult to appropriately respond to such a demand from a user.

SUMMARY OF THE INVENTION

A principal object of the present invention is to provide an image forming apparatus and an image forming method with which it is possible to stabilize the image density of a toner image in a wide density range in an easy and reliable manner.

Another object of the present invention is to provide an image forming apparatus and an image forming method with which it is possible to reliably stabilize the image density of a toner image regardless of a change in film thickness of a photosensitive member.

Still another object of the present invention is to provide an image forming apparatus and an image forming method with which it is possible to properly control the image density of a toner image while flexibly responding to a demand from a user.

In fulfillment of the foregoing object, an image forming apparatus and method are provided and are particularly well suited to density adjustment of a toner image.

According to a first aspect of the present invention, one piece of correlation data, which belongs to a product set of lower-density side correlation data and higher-density side correlation data, is selected as optimal values of a plurality of density adjustment factors. The lower-density side correlation data are between said plurality of density adjustment factors and for forming a toner image at a lower-density side target density, and the higher-density side correlation data are between said plurality of density adjustment factors and for forming a toner image at a higher-density side target density which is higher than said lower-density side target density.

According to a second aspect of the present invention, a density adjustment factor influencing an image density of a toner image is set to a value which corresponds to a film thickness of a photosensitive member, to thereby control the image density of a toner image formed on a photosensitive member.

According to a third aspect of the present invention, a density adjustment factor is modified in accordance with a necessity so as to change an image density of a toner image to an image density which is deviated from a reference target density.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 9, 13, 16 and 48 are graphs showing a relationship among higher-density side correlation data, lower-density side correlation data and a product set thereof;

FIG. 19 is a schematic diagram showing operations according to the embodiment (C-1);

FIG. 21 is a schematic diagram showing operations according to the embodiment (C-2);

FIGS. 25A to 25C are schematic diagrams showing the sequence of obtaining an optimal exposure energy and an optimal developing bias in the sixth preferred embodiment;

FIG. 33 is a flow chart showing optimization of density adjustment factors in an image forming apparatus according to the eighth preferred embodiment of the present invention;

FIG. 34 is a schematic diagram showing the sequence of obtaining an optimal charging bias, an optimal exposure energy and an optimal developing bias in the eighth preferred embodiment;

FIGS. 51A to 51C are schematic diagrams showing the sequence of obtaining an optimal exposure energy and an optimal developing bias in the eleventh preferred embodiment;

FIGS. 62A to 68A, 62B to 68B, and 62C to 68C are schematic diagrams showing the sequence of obtaining an optimal exposure energy and an optimal developing bias in the thirteenth embodiment;

DETAILED DESCRIPTION OF THE PREFERRED EMBODIMENTS

A. First Preferred Embodiment

Figure 1:
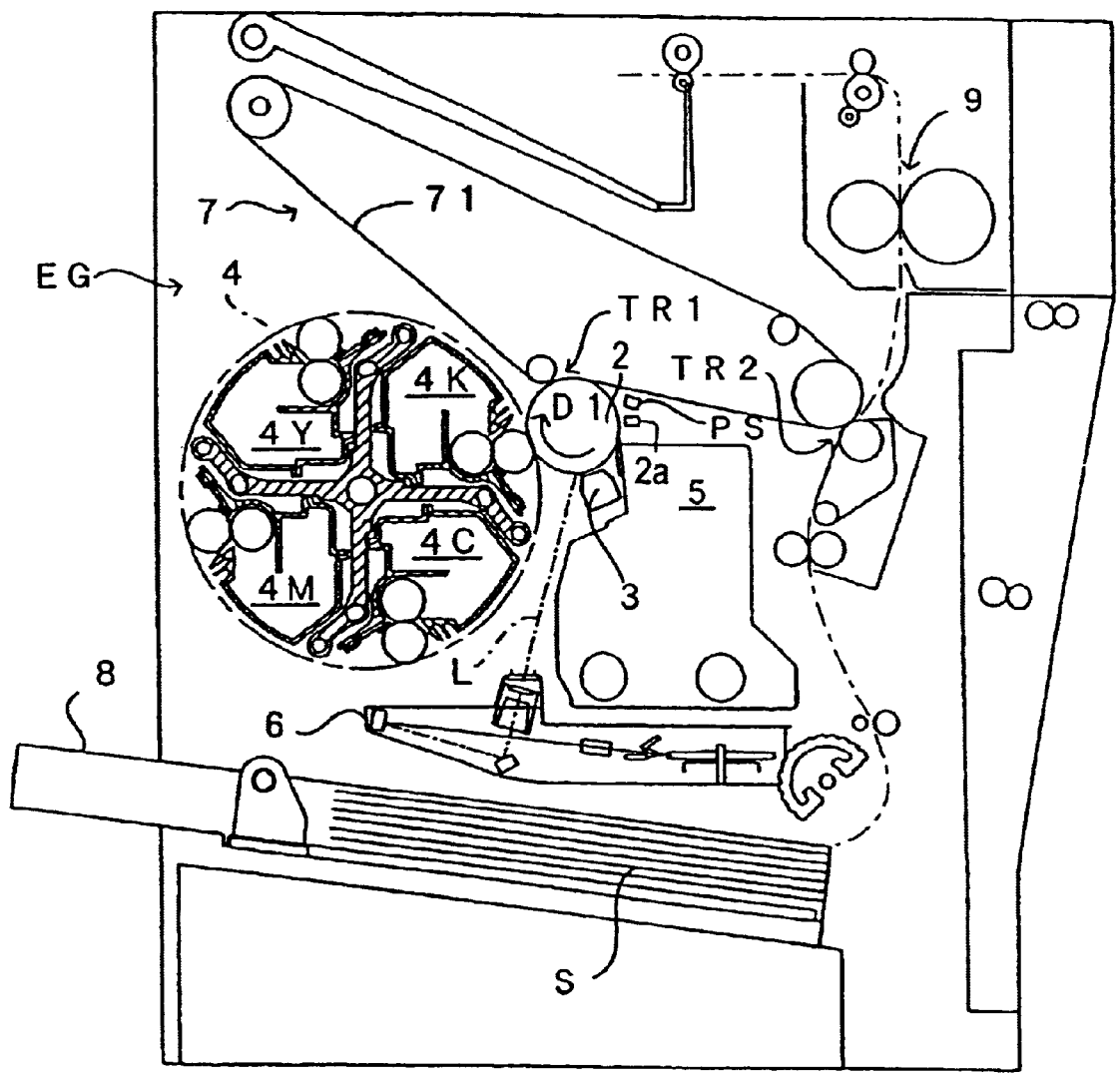
FIG. 1 is a drawing of an image forming apparatus according to a first preferred embodiment of the present invention.
Figure 2:
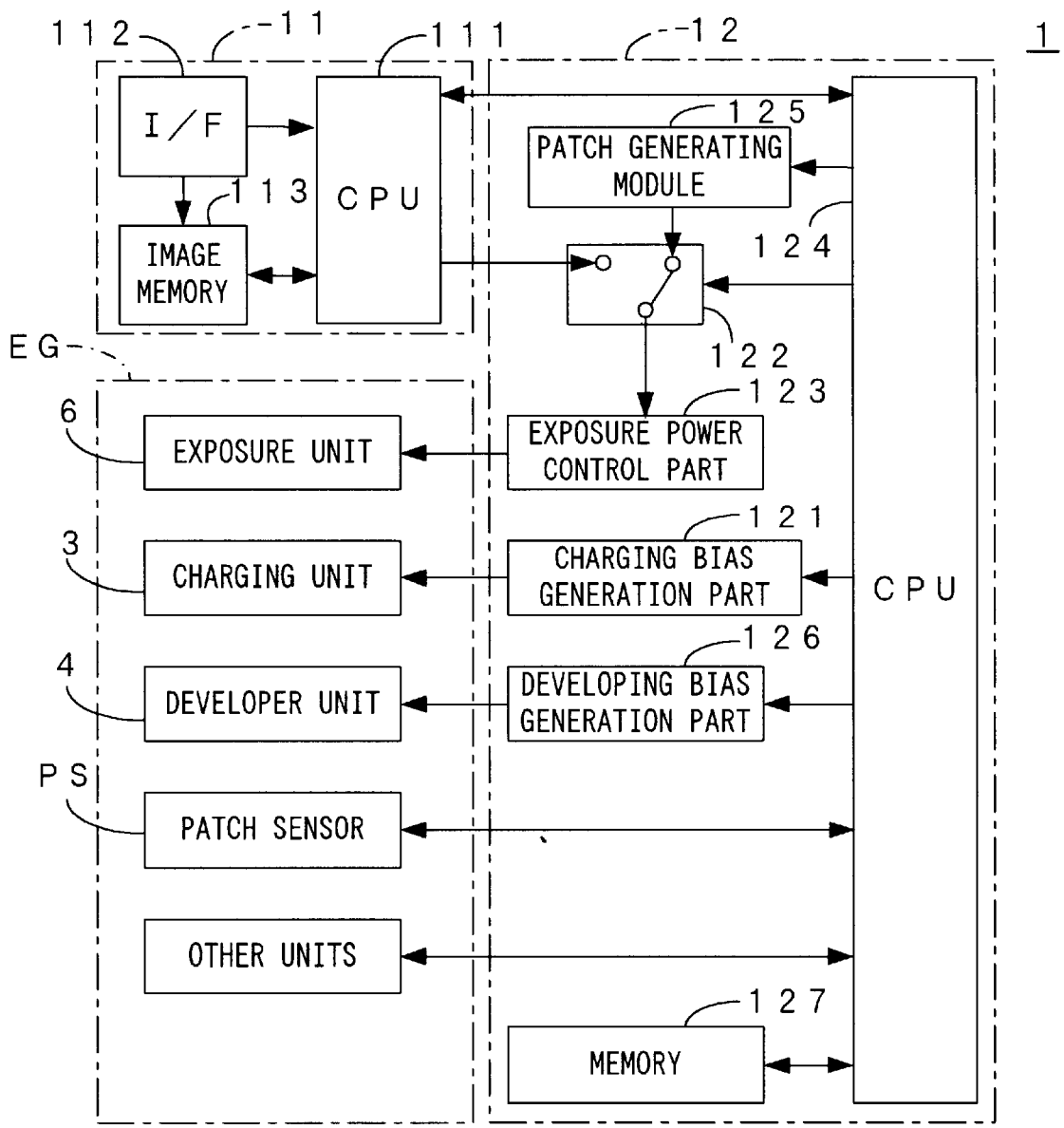
FIG. 2 is a block diagram of an electric structure of the image forming apparatus shown in FIG. 1.

FIG. 1 is a drawing of an image forming apparatus according to a first preferred embodiment of the present invention, and FIG. 2 is a block diagram of an electric structure of the image forming apparatus shown in FIG. 1. This image forming apparatus is an apparatus which overlays toner in four colors of yellow (Y), cyan (C), magenta (M) and black (K) one atop the other to thereby create a full-color image or uses only toner of black (K) to thereby create a monochrome image. In this image forming apparatus, as a main controller 11 receives an image signal from an external apparatus such as a host computer, an image corresponding to the image signal is created on a sheet S, with the respective portions of an engine part EG controlled by an engine controller 12 in response to an instruction from the main controller 11.

In the engine part EG, a photosensitive member 2 is arranged for free rotations in the direction D1 indicated by the arrow in FIG. 1. A charging unit 3 serving as charging means, a rotary developer unit 4 serving as developer means, and a cleaning part 5 are disposed around the photosensitive member 2 along the direction D1 of rotations of the photosensitive member 2. A charging bias is applied upon the charging unit 3 from a charging bias generation part 121, so that an external circumferential surface of the photosensitive member 2 is charged uniformly.

An exposure unit 6 irradiates a laser beam L toward the outer circumferential surface of the photosensitive member 2 thus charged by the charging unit 3. As shown in FIG. 2, the exposure unit 6 is electrically connected with an image signal switching part 122. In accordance with an image signal supplied through the image signal switching part 122, an exposure power control part 123 controls the exposure unit 6, whereby the laser beam L sweeps over the photosensitive member 2 in a main scanning direction and an electrostatic latent image corresponding to the image signal is formed on the photosensitive member 2. For instance, while the image signal switching part 122 stays conducted with a patch generating module 125 based on an instruction from a CPU 124 of the engine controller 12, the exposure power control part 123 receives a patch image signal outputted from the patch generating module 125 and a patch latent image is formed. On the other hand, when the image signal switching part 122 stays conducted with a CPU 111 of the main controller 11, the laser beam L sweeps over the photosensitive member 2 in a main scanning direction in accordance with an image signal supplied from an external apparatus such as a host computer through an interface 112 and an electrostatic latent image corresponding to the image signal is formed on the photosensitive member 2.

The developer unit 4 develops thus formed electrostatic latent image with toner. That is, a developer 4K for black, a developer 4C for cyan, a developer 4M for magenta and a developer 4Y for yellow are axially arranged as the developer unit 4 for free rotation in this embodiment. The developers 4K, 4C, 4M and 4Y are positioned so as to be able to rotate and selectively abut on or stay separated from the photosensitive member 2. Applied with a developing bias containing a DC component by a developing bias generation part 126, the developers 4K, 4C, 4M and 4Y cause toner of a selected color to adhere to a surface of the photosensitive member 2. This visualizes the electrostatic latent image on the photosensitive member 2 in the selected toner color.

The toner image thus developed by the developer unit 4 is primarily transferred, in a primary transfer area TR1, onto an intermediate transfer belt 71 of a transfer unit 7. At a position in the vicinity of the primary transfer area TR1, a patch sensor PS is disposed as "density measuring means" of the present invention so as to face a surface of the intermediate transfer belt 71, and measures an optical density of a patch image which is formed on an outer circumferential surface of the intermediate transfer belt 71 as described later. Further, at a position ahead of the primary transfer area TR1 in a circumferential direction (which is the direction of rotations D1 in FIG. 1), the cleaning part 5 is disposed which scrapes off toner still remaining on the outer circumferential surface of the photosensitive member 2 after primary transfer. In addition, a charge remover part not shown resets electric charges of the photosensitive member 2 in accordance with a necessity.

The transfer unit 7 comprises the intermediate transfer belt 71 stretched across a plurality of rollers and a driver part (not shown) which drives the intermediate transfer belt 71 into rotation. For transfer of a color image on a sheet S, toner images in the respective colors formed on the photosensitive member 2 are laid one atop the other on the intermediate transfer belt 71 thereby forming a color image and the color image is secondarily transferred onto the sheet S retrieved from a cassette 8. The sheet S now bearing the color image is conveyed to a discharge tray part which is in a top surface portion of a main apparatus unit, after traveling through a fixing unit 9.

After secondary transfer, a cleaning part not shown removes toner still remaining on the outer circumferential surface of the intermediate transfer belt 71.

In FIG. 2, denoted at 113 is an image memory disposed in the main controller 11 for the purpose of storing images received from an external apparatus such as a host computer through the interface 112, denoted at 127 is a memory or memory means which stores a computation program which is executed in the CPU 124, a computation result obtained by the CPU 124, control data for controlling the engine part EG, etc.

Next, a description will be given on optimization of density adjustment factors performed in the image forming apparatus having such a structure as described above. In this image forming apparatus, optimization as that shown in FIG. 3 is executed at appropriate timing, e.g., upon completion of assembly of the apparatus, prior to shipment from a plant or during maintenance of the apparatus, so that an exposure energy of the light beam L and a developing bias are optimized as density adjustment factors and the image densities of toner images in the respective colors are adjusted.

Figure 3:
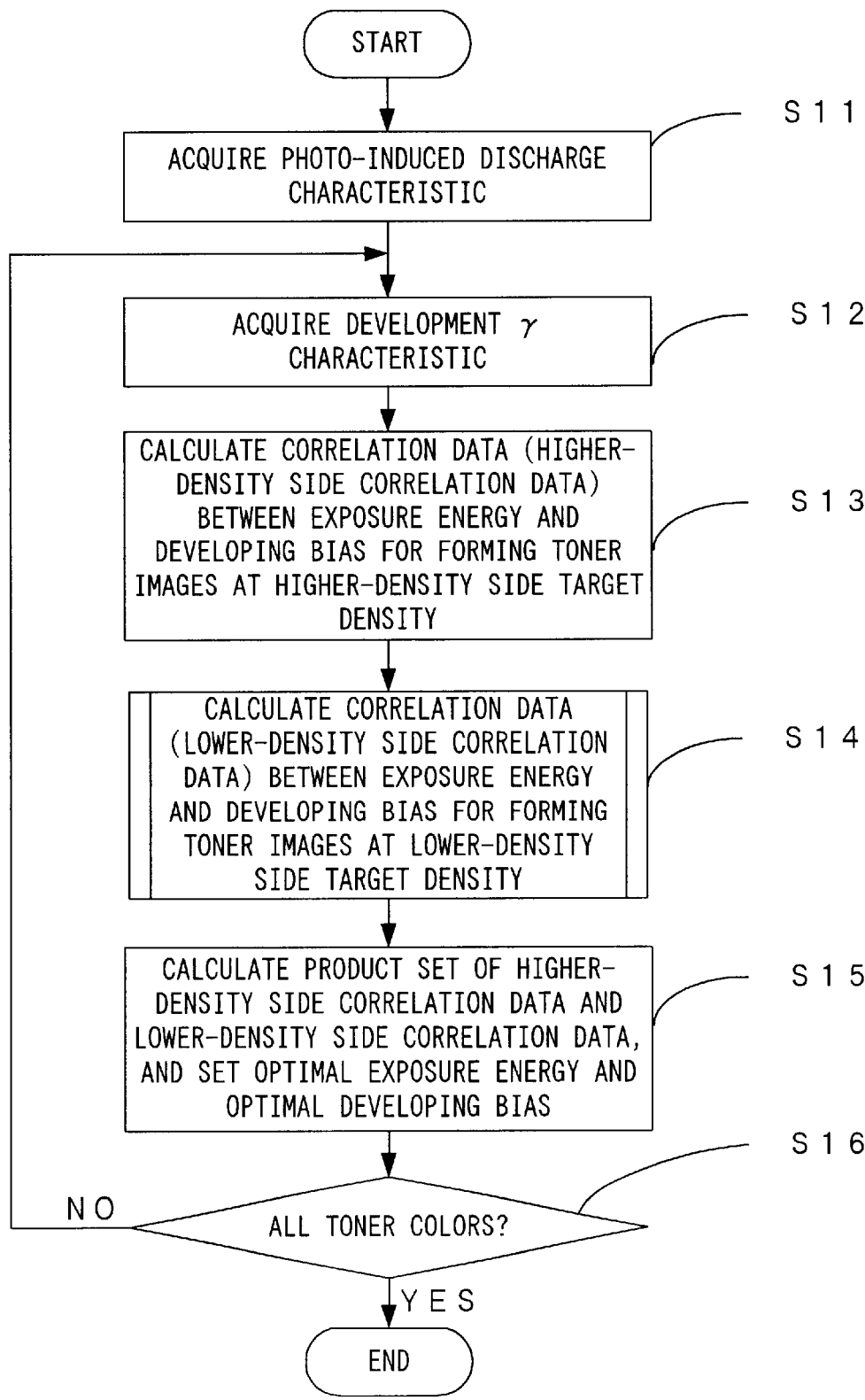
FIG. 3 is a flow chart showing optimization of density adjustment factors in the image forming apparatus of FIG. 1.

FIG. 3 is a flow chart showing optimization of density adjustment factors in the image forming apparatus of FIG. 1. First, upon completion of assembly of the apparatus for instance, via an operation part (not shown) such as a keyboard, an operator or someone appropriate provides the image forming apparatus with a photo-induced discharge characteristic of the photosensitive member 2 as that denoted at the solid line in FIGS. 4 and 5. The control unit 1 accordingly acquires the photo-induced discharge characteristic which will be temporarily stored in the memory 127 (Step S11). Further, via the operation part, the operator provides the image forming apparatus with a development γ characteristic as that shown in FIG. 6 for instance, with respect to a particular toner color. The control unit 1 accordingly acquires the development γ characteristic which will be temporarily stored in the memory 127 (Step S12).

Figure 4:
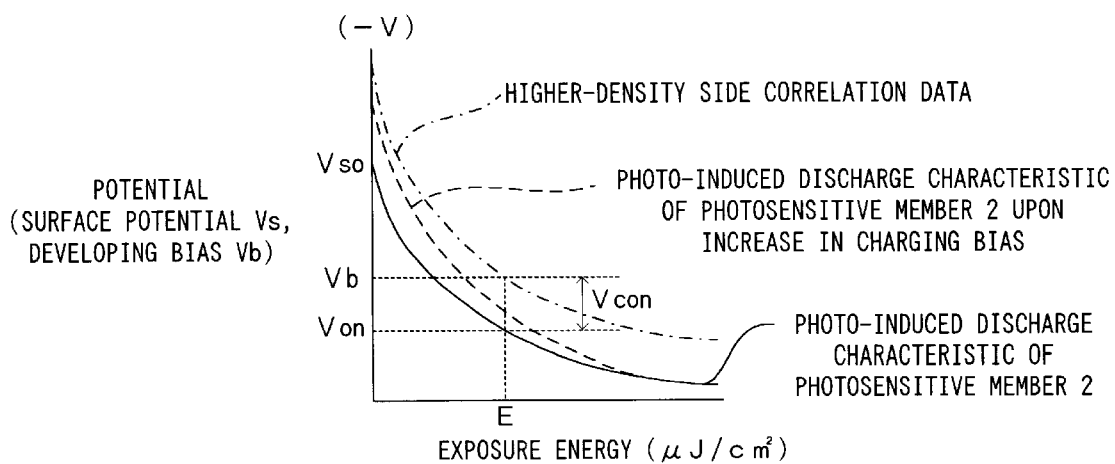
FIGS. 4, 11, 14, 47 and 71 are graphs showing a relationship between a photo-induced discharge characteristic of a photosensitive member and higher-density side correlation data.

Next, the CPU 124 of the control unit 1 reads the photo-induced discharge characteristic and the development γ characteristic from the memory 127 and calculates correlation data between an exposure energy E and a developing bias Vb for forming a toner image at a higher-density side target density as higher-density side correlation data (Step S13). In this embodiment, an "optical density (OD)=1.2" is set as the higher-density side target density, and the developing bias Vb which is necessary to make a solid image formed at each exposure energy have an optical density (OD) of 1.2 is calculated. In short, as FIG. 4 shows, the photosensitive member 2 charged by the charging unit 3 has a surface potential of Vs0, and when a latent image corresponding to a solid image is formed as the light beam L is irradiated with the exposure energy E upon the photosensitive member 2, a surface potential in the port on bearing the latent image is a potential Von. Hereinafter, the potential Von is referred to as "exposed area potential."

Figure 6:
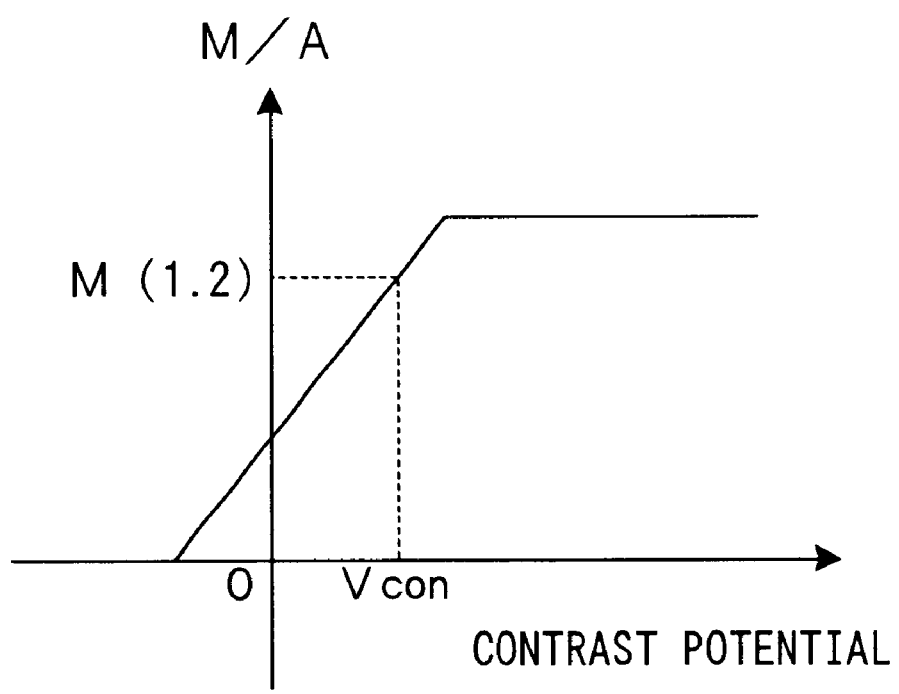
FIG. 6 is a view showing a development γ characteristic.

To obtain a toner image at the higher-density side target density, it is necessary to have toner adhere in a predetermined quantity M(1.2) to the surface of the photosensitive member 2 (The correlation between target densities and adhering toner quantities is already known.). Hence, a contrast potential (=|(the developing bias)−(the exposed area potential of the photosensitive member 2)|) corresponding to the toner adhesion quantity M(1.2) is a potential Vcon as shown in FIG. 6.

Therefore, as denoted at the dotted-and-dashed line in FIG. 4, with the exposure energy E and the developing bias Vb set such that a difference between the exposed area potential Von and the developing bias Vb is the contrast potential Vcon, it is possible to form a toner image at the higher-density side target density. Noting this, according to this embodiment, the CPU 124 calculates the correlation data denoted at the dotted-and-dashed line in FIG. 4.

At the next step S14, correlation data between the exposure energy E and the developing bias Vb for forming a toner image at a lower-density side target density (lower-density side correlation data) are calculated. This embodiment requires to set an "optical density (OD)=0.2" as the lower-density side target density, and to calculate the developing bias Vb which is necessary to make a 1-on-5-off line image LI as that shown in FIG. 7 formed at each exposure energy have an optical density (OD) of 0.2. More specifically, steps S141 to S145 shown in FIG. 8 are executed for calculation.

First, the exposure energy E is set to a minimum exposure energy Emin (Step S141). After calculating a latent image profile representing a latent image corresponding to the line image LI shown in FIG. 7 formed with this exposure energy E on the photosensitive member 2 (Step S142), a developing bias for developing the line latent image to thereby form the line image LI at the lower-density side target density is calculated (Step S143). (In other words, a developing bias for achieving toner adhesion which realizes the lower-density side target density is calculated.)

As the developing bias Vb which corresponds to the exposure energy E is calculated, whether the exposure energy E exceeds a maximum exposure energy Emax is judged at the step S144. After incrementing the exposure energy E by a fine quantity ΔE at the step S145 while the judgment remains "NO," i.e., while the exposure energy E remains equal to or smaller than the maximum exposure energy Emax, the sequence returns to the step S142 and the steps S142 and S143 are executed, whereby the developing bias Vb corresponding to the exposure energy E is calculated.

Figure 5:
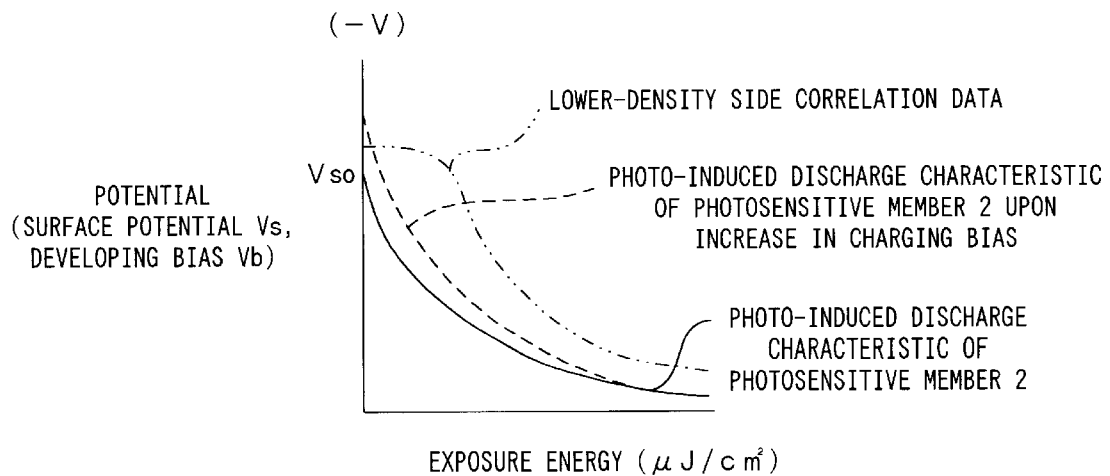
FIGS. 5, 12, 15 and 72 are graphs showing a relationship between a photo-induced discharge characteristic of a photosensitive member and lower-density side correlation data.

Correlation data as that denoted at the double-dotted-and-dashed line in FIG. 5 are obtained through the series of processing (the steps S141 to S145), which correspond to "lower-density side correlation data" of the present invention.

Figure 9:
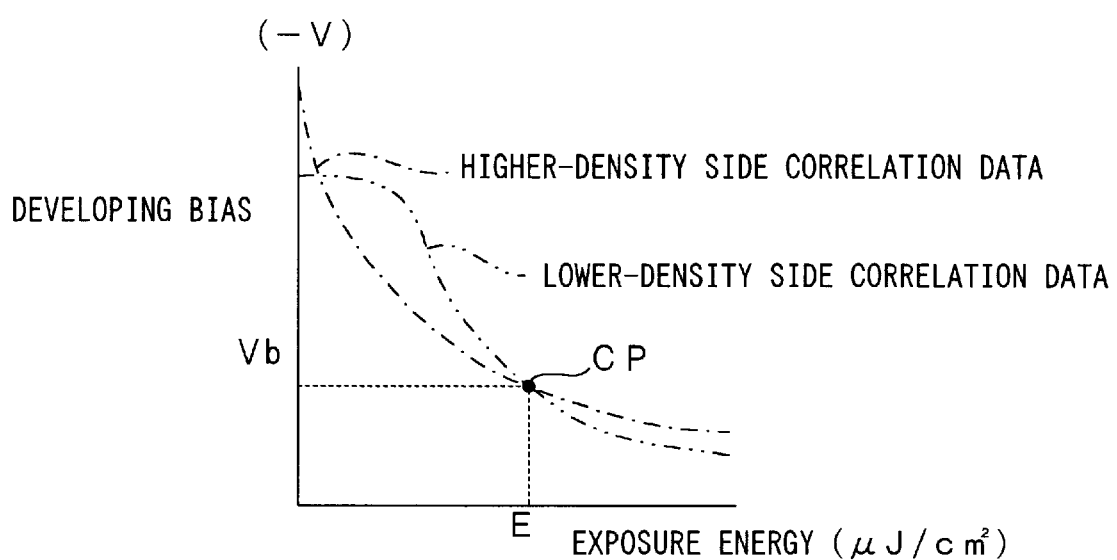

Referring back to FIG. 3 again, the optimization will be further described. At the next step S15, a product set of the higher-density side correlation data obtained at the Step S13 and the lower-density side correlation data obtained at the step S14 is calculated. More particularly, as shown in FIG. 9, an intersection CP of the dotted-and-dashed line which represents the higher-density side correlation data and the double-dotted-and-dotted-and-dashed line which represents the lower-density side correlation data is identified, the exposure energy E and the developing bias Vb corresponding to the intersection CP are set as an optimal exposure energy and an optimal developing bias and stored in the memory 127.

As the optimal exposure energy and the optimal developing bias are calculated with respect to the particular toner color acquired at the step S12, whether optimal exposure energies and optimal developing biases are calculated with respect to all toner colors is judged at the step S16. While the judgment remains "NO," the processing at the steps S12 to S16 described above is repeated for the remaining toner colors, whereby the optimal exposure energies and the optimal developing biases are calculated with respect to the respective toner colors and stored in the memory 127.

The apparatus, after shipped from a plant and delivered to a user, accesses the memory 127 at appropriate timing (e.g., at the start-up of the apparatus) and acquires the information regarding the exposure energies and the developing biases. A series of operations to form images is performed based on this information.

As described above, according to this embodiment, as the image densities of toner images in the respective toner colors are adjusted to the lower-density side target density (OD=0.2) and the higher-density side target density (OD=1.2), images are formed stably in a wide density range. The photo-induced discharge characteristic of the photosensitive member 2 changes depending on a charging bias value and it becomes difficult to optimize a density adjustment factor in a wide density range in the case of the conventional apparatus which uses a charging bias as a density adjustment factor. On the contrary, according to this embodiment which uses an exposure energy and a developing bias as density adjustment factors, neither the exposure energy nor the developing bias influences the photo-induced discharge characteristic of the photosensitive member 2, and simple calculation of a product set of the lower-density side correlation data and the higher-density side correlation data described above allows to optimize the exposure energy and the developing bias. Thus, it is possible to stabilize the image density of a toner image in a wide density range in an easy and stable manner according to this embodiment.

B. Second Preferred Embodiment

The mechanical and electrical structures of an image forming apparatus according to a second preferred embodiment are the same as those according to the first preferred embodiment. The only difference is a method of controlling image densities. Hence, the difference will be mainly described.

Now, a description will be given on optimization of density adjustment factors performed in the image forming apparatus according to the second preferred embodiment. In this image forming apparatus, optimization as that shown in FIG. 10 is executed at appropriate timing, e.g., upon completion of assembly of the apparatus, prior to shipment from a plant or during maintenance of the apparatus, so that an exposure energy of the light beam L and a developing bias are optimized as density adjustment factors and the image densities of toner images in the respective colors are adjusted.

Figure 10:
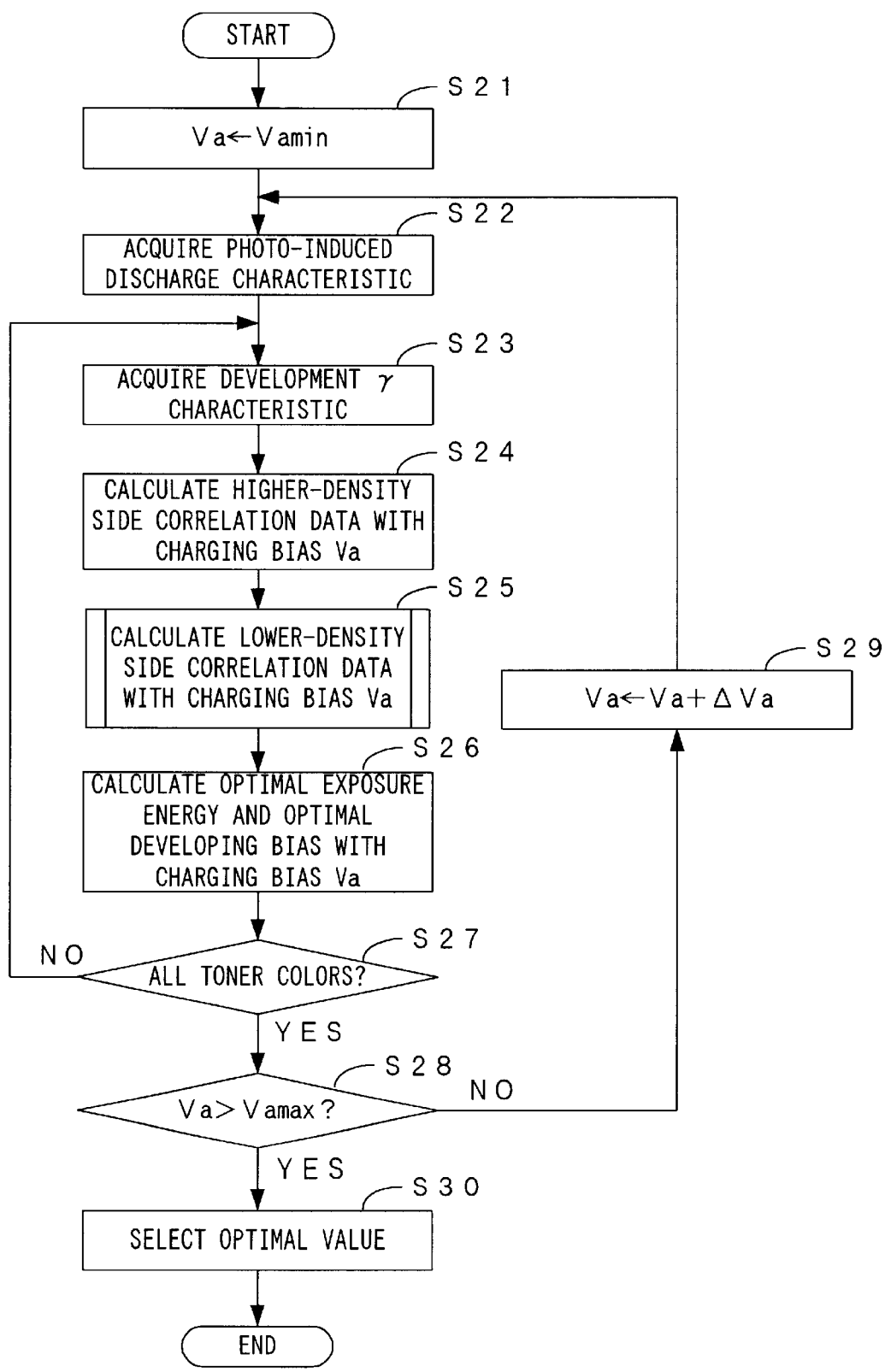
FIG. 10 is a flow chart showing optimization of density adjustment factors according to a second preferred embodiment of the present invention.

FIG. 10 is a flow chart showing optimization of density adjustment factors according to the second embodiment of the present invention. First, a charging bias Va is set to a minimum value in a programmable range which can be set by the charging bias generation part 121, namely, a minimum charging bias Vamin (note: Vamin=|Vamin|) (Step S21). Via an operation part (not shown) such as a key board, an operator or someone appropriate provides the image forming apparatus with a photo-induced discharge characteristic of the photosensitive member 2 corresponding to this charging bias, e.g., a photo-induced discharge characteristic as that denoted at the solid line in FIGS. 11 and 12. The control unit 1 accordingly acquires the photo-induced discharge characteristic which will be temporarily stored in the memory 127 (Step S22). Further, via the operation part, the operator provides the image forming apparatus with a development γ characteristic as that shown in FIG. 6 for instance, with respect to a particular toner color. The control unit 1 accordingly acquires the development γ characteristic which will be temporarily stored in the memory 127 (Step S23).

Next, the CPU 124 of the control unit 1 reads the photo-induced discharge characteristic and the development γ characteristic from the memory 127 and calculates correlation data between an exposure energy E and a developing bias Vb which are for forming a toner image at a higher-density side target density with the charging bias Va (Step S24). In this embodiment, an "optical density (OD)=1.2" is set as the higher-density side target density, and the developing bias Vb which is necessary to make a solid image formed at each exposure energy have an optical density (OD) of 1.2 is calculated. In short, as FIG. 11 shows, the photosensitive member 2 charged by the charging unit 3 has a surface potential of Vs0, and when a latent image corresponding to a solid image is formed as the light beam L is irradiated with the exposure energy E upon the photosensitive member 2, a surface potential in the portion bearing the latent image is an exposed area potential Von.

To obtain a toner image at the higher-density side target density, it is necessary to have toner adhere in a predetermined quantity M(1.2) to the surface of the photosensitive member 2 (The correlation between target densities and adhering toner quantities is already known.). Hence, a contrast potential (=|(the developing bias)−(the exposed area potential of the photosensitive member 2)|) corresponding to the toner adhesion quantity M(1.2) is a potential Vcon as shown in FIG. 6.

Figure 11:
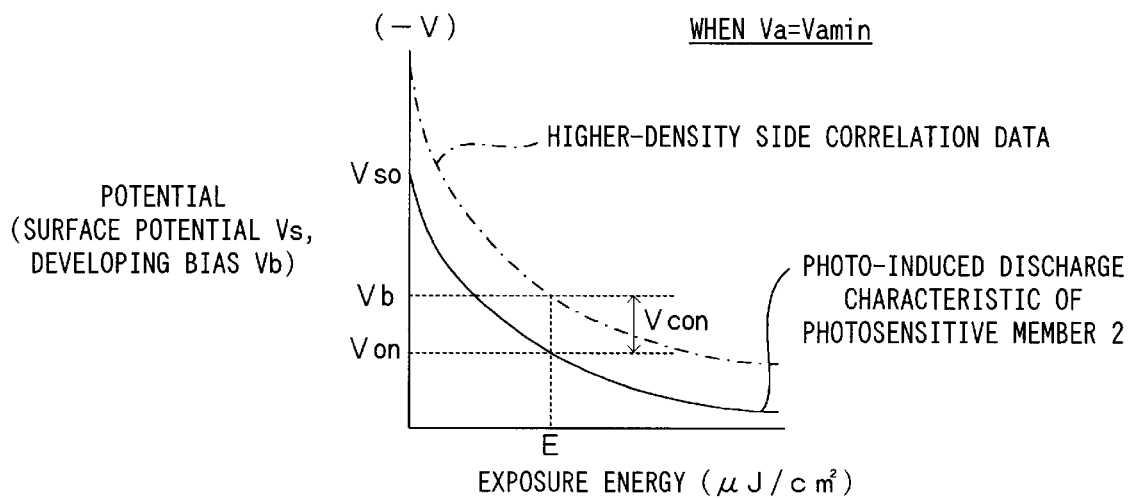
Figure 12:
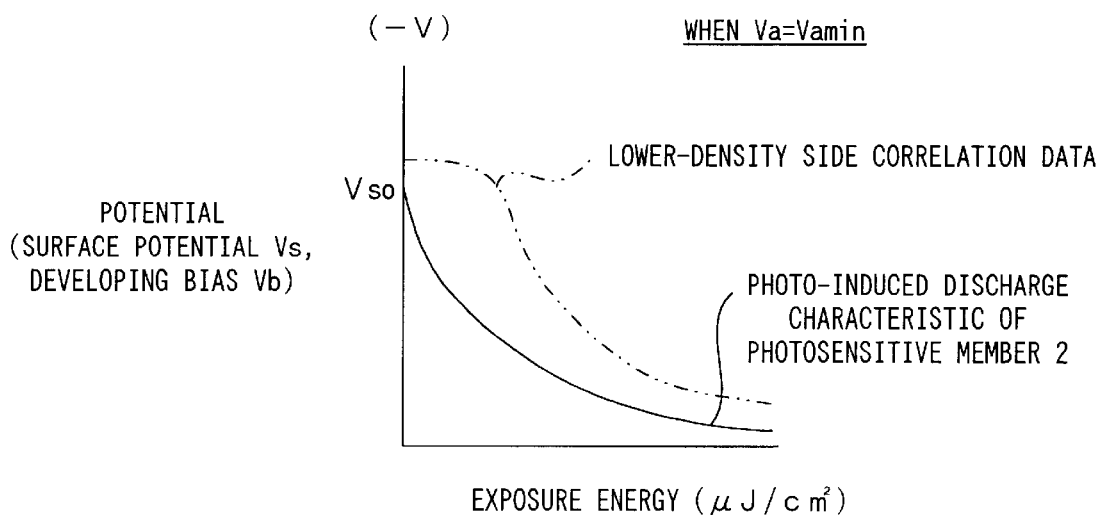

Therefore, as denoted at the dotted-and-dashed line in FIG. 11, with the exposure energy E and the developing bias Vb set such that a difference between the exposed area potential Von and the developing bias Vb is the contrast potential Vcon, it is possible to form a toner image at the higher-density side target density. Noting this, according to this embodiment, the CPU 124 calculates the correlation data denoted at the dotted-and-dashed line in FIG. 11.

At the next step S25, correlation data between the exposure energy E and the developing bias Vb for forming a toner image at a lower-density side target density with the charging bias Va (lower-density side correlation data) are calculated. This embodiment requires to set an "optical density (OD)=0.2" as the lower-density side target density, and to calculate the developing bias Vb which is necessary to make a 1-on-5-off line image LI as that shown in FIG. 7 formed at each exposure energy with the fixed charging bias Va have an optical density (OD) of 0.2. Specific operations for calculation are the same as those at the step S14 according to the first preferred embodiment, and therefore, will not be described again.

At the next step S26, a product set of the higher-density side correlation data obtained at the Step S24 and the lower-density side correlation data obtained at the step S25 is calculated. More particularly, as shown in FIG. 13, an intersection CP(Va) of the dotted-and-dashed line which represents the higher-density side correlation data and the double-dotted-and-dotted-and-dashed line which represents the lower-density side correlation data is identified, the exposure energy E and the developing bias Vb corresponding to the intersection CP(Va) are set as an optimal exposure energy and an optimal developing bias and stored in the memory 127.

As the optimal exposure energy and the optimal developing bias corresponding to the charging bias Va are calculated with respect to the particular toner color acquired at the step S23, whether optimal exposure energies and optimal developing biases are calculated with respect to all toner colors is judged at the step S27. While the judgment at the step S27 remains "NO," the processing at the steps S23 to S27 described above is repeated for the remaining toner colors, whereby the optimal exposure energies and the optimal developing biases corresponding to the charging bias Va are calculated with respect to the respective toner colors and stored in the memory 127.

On the other hand, when it is judged at the step S27 that optimal exposure energies and optimal developing biases corresponding to the charging bias Va are calculated with respect to all toner colors, whether the charging bias Va exceeds a maximum charging bias Vamax is judged at the next step S28 (note: Vamax=|Vamax|). After incrementing the charging bias Va by a fine quantity ΔVa at the step S29 while the charging bias Va remains equal to or smaller than the maximum charging bias Vamax, the sequence returns to the step S22 and the steps S22 to S27 are executed, whereby the optimal exposure energies and the optimal developing biases at the charging bias Va are calculated.

Figure 14:
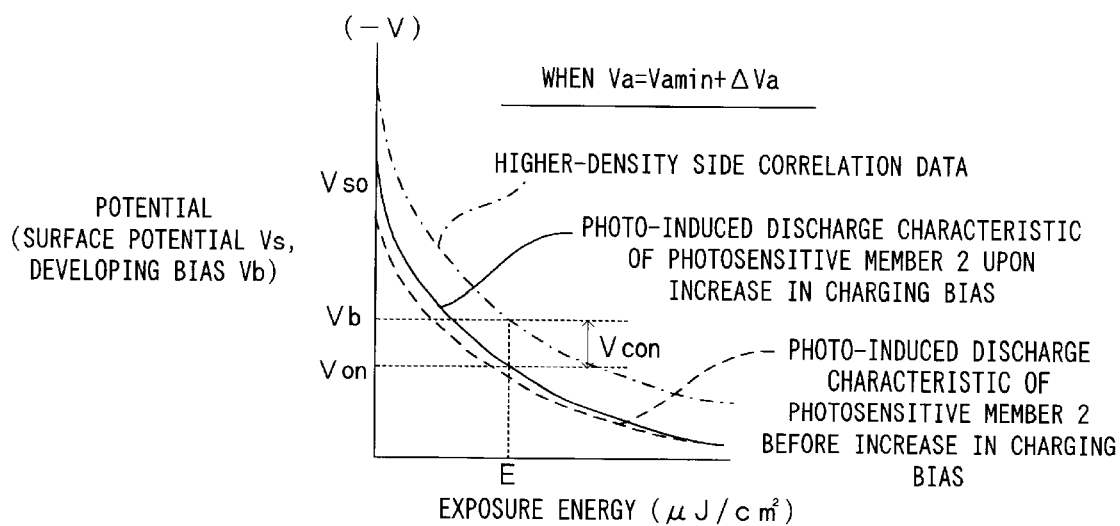
Figure 15:
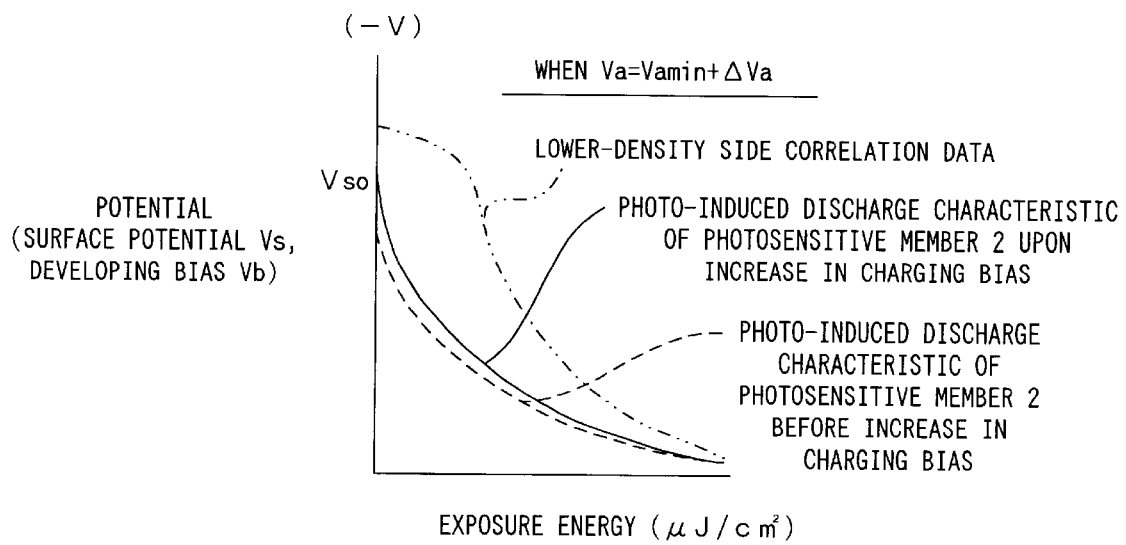

A case that the charging bias Va is changed to a value (Vamin+ΔVa) from the value Vamin for example will be described. As the charging bias is changed, the photo-induced discharge characteristic of the photosensitive member 2 changes from the dotted curve to the solid curve, shifting toward the larger absolute value side as shown in FIGS. 14 and 15. The quantity of the shift, however, changes in accordance with the exposure energy, i.e., remains relatively large on the lower-energy side (the left-hand side in FIGS. 14 and 15), decreases as the exposure energy increases and becomes almost zero on the higher-energy side (the right-hand side in FIGS. 14 and 15).

Figure 16:
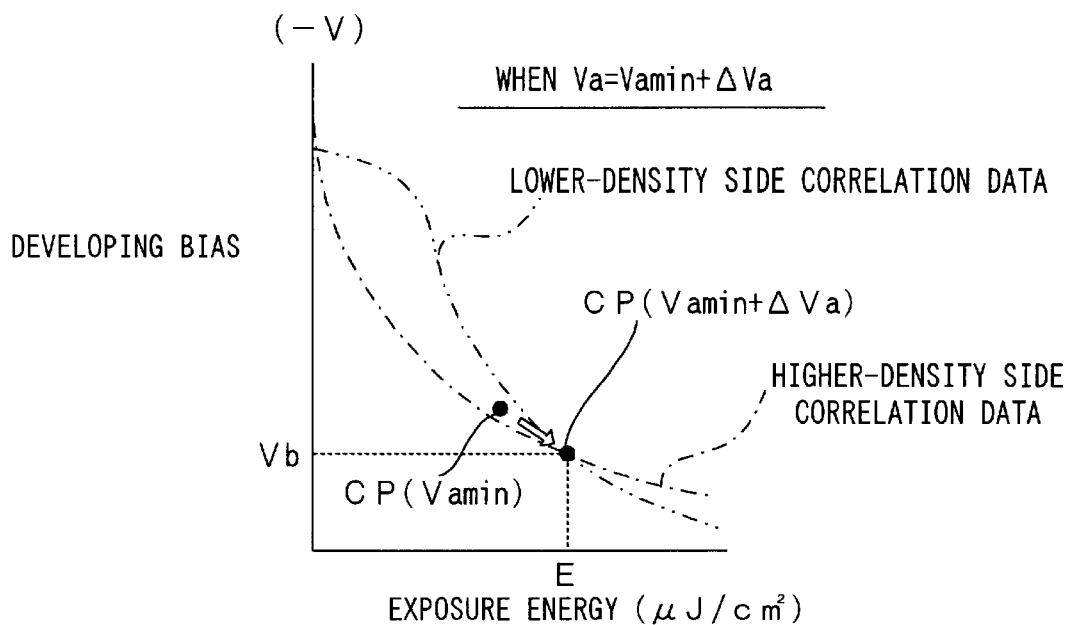

As the photo-induced discharge characteristic changes due to an increase in absolute value of the charging bias, the higher-density side correlation data as well change and so do the lower-density side correlation data to the double-dotted-and-dotted-and-dashed curve. Due to this, as shown in FIG. 16 for instance, a product set of the higher-density side correlation data and the lower-density side correlation data shifts toward a product set CP (Vamin+ΔVa) as it is upon increase in absolute value of the charging bias from a product set CP (Vamin) as it is before the absolute value of the charging bias increases. Of course, when the absolute value of the charging bias is decreased, the lower-density side correlation data, the higher-density side correlation data and the product set all shift in the opposite direction to that corresponding to an increase in absolute value of the charging bias. In this manner, the optimal exposure energies and the optimal developing biases at the respective charging biases as well change as the charging bias is modified and set.

Figure 17:
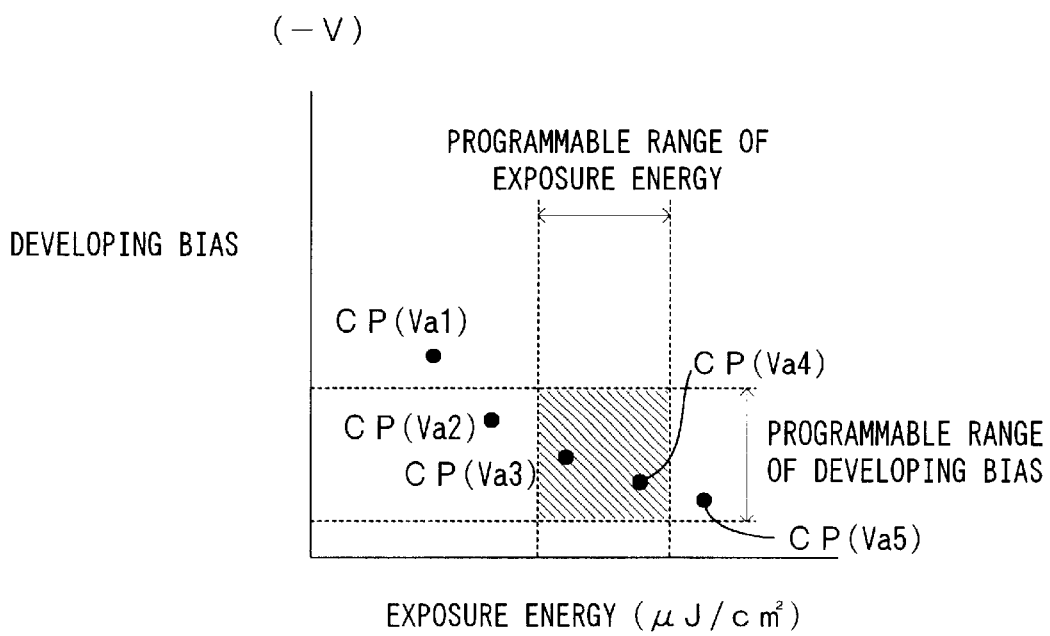
FIG. 17 is a graph showing a relationship between optimal solutions and programmable ranges of exposure energy and developing bias.

Upon judgment that the charging bias Va exceeds the maximum charging bias Vamax at the step S28, as shown in FIG. 17 for instance, optimal solutions CP(Va1) to CP(Va5) are calculated for a plurality of charging biases Va1 to Va5. In short, the optimal exposure energies and the optimal developing biases corresponding to the respective charging biases Va are calculated. Although the charging bias Va remains in the programmable range which can be set by the charging bias generation part 121 as described earlier, the optimal exposure energy and the optimal developing bias may sometimes exceeds programmable ranges.

According to the second preferred embodiment, at the next step S30, of the optimal solutions CP(Va1) to CP(Va5) calculated as described above, one fitting both the programmable range of exposure energy and the programmable range of developing bias is selected as an optimal value, and an optimal charging bias, an optimal exposure energy and an optimal developing bias expressed by this optimal value (one of the optimal solutions CP(Va3) and CP(Va4) in FIG. 17, for instance) are calculated and stored in the memory 127. In this manner, it is possible to ensure that the optimal charging bias, the optimal exposure energy and the optimal developing bias all remain in the programmable ranges.

As described above, according to the second preferred embodiment, the image densities of toner images in the respective toner colors are adjusted to the lower-density side target density (OD=0.2) and the higher-density side target density (OD=1.2), images are formed stably in a wide density range.

Figure 18:
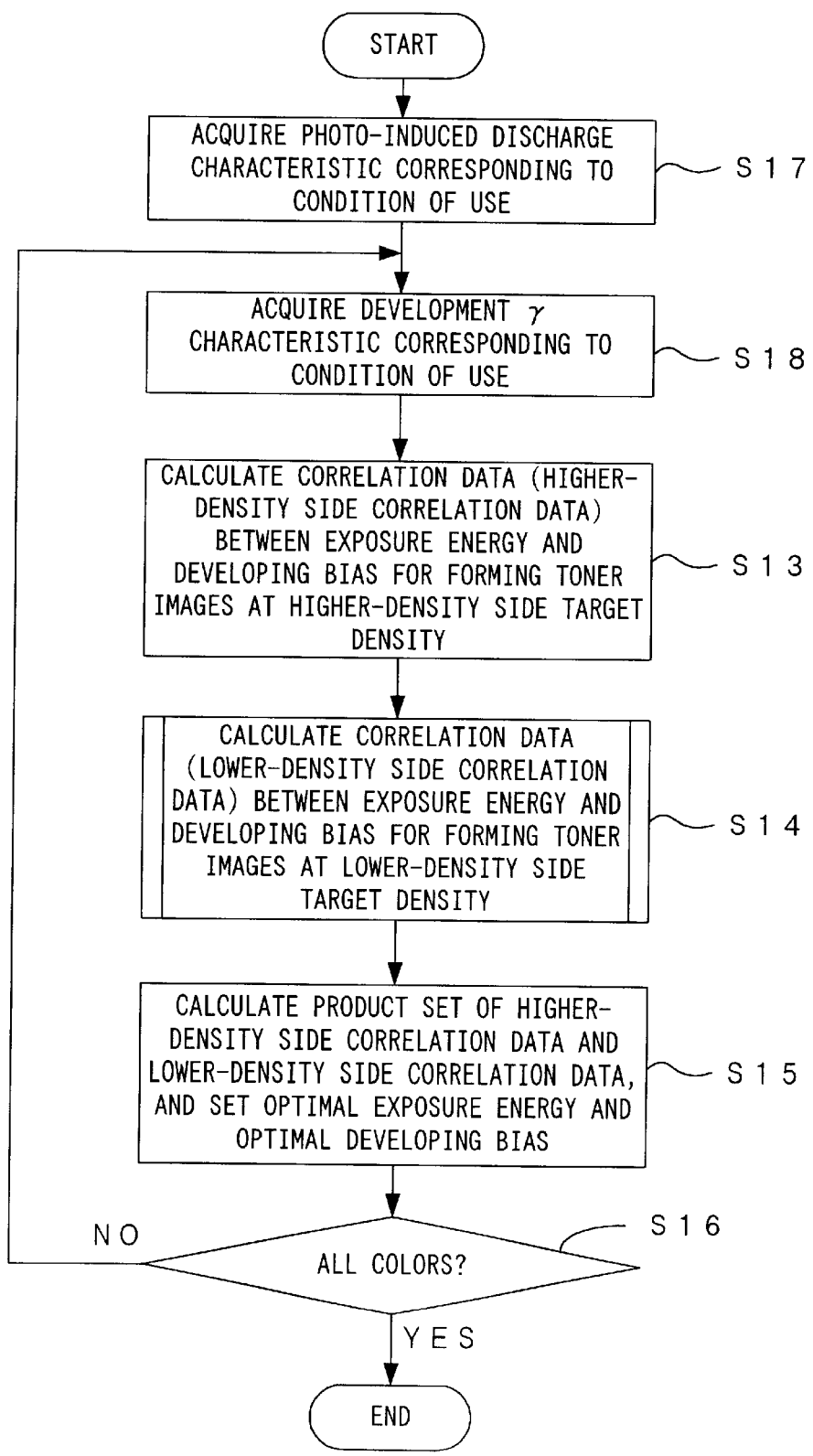
FIG. 18 is a flow chart showing optimization of density adjustment factors according to the embodiment (C-1)

According to the embodiment (C-1), first, assuming that the condition of use is the "HH" environment and that the film thickness of the photosensitive member 2 is t1, an optimal exposure energy E(H1) and an optimal developing bias Vb(H1) are calculated in accordance with the sequence shown in FIG. 18 and stored in the memory 127 as they are associated with the condition of use.

C. Third Preferred Embodiment

By the way, in this type of image forming apparatus, a photo-induced discharge characteristic may sometimes change in accordance with the operating state of the apparatus. For instance, an under coat layer, a carrier generation layer and a carrier transport layer are stacked in this order on a drum-shaped conductive base material such as aluminum, whereby the photosensitive member 2 is completed. As the light beam L is irradiated upon the photosensitive member 2, surface charges disappear in the exposed areas and an electrostatic latent image is formed. In the case of a negatively charged OPC (organic photoconductor), for example, holes and electrons generated in the carrier generation layer in response to irradiation of the light beam move in accordance with an electric field. That is, the holes move in the carrier transport layer toward the surface of the photosensitive member as if they are attracted by negative charges which are at the surface of the photosensitive member, and cancel out the negative charges at the surface. As a result, an electrostatic latent image is formed. Further, the photo-induced discharge characteristic of the photosensitive member 2 is closely related to the film thickness of the photosensitive member 2, particularly, the thickness of the carrier transport layer. As shown in FIG. 1, since a number of abutting members such as the cleaning part 5 abut on the photosensitive member 2, the thickness of the carrier transport layer decreases as an operation time of the image forming apparatus, the total number of printed sheets and the like increase. This changes an electric field upon the carrier transport layer and the mobility of carrier, and hence, alters the photo-induced discharge characteristic of the photosensitive member 2. The photo-induced discharge characteristic of the photosensitive member 2 can be changed by a factor other than the film thickness of the photosensitive member 2, e.g., an environment surrounding the apparatus as well. The development γ characteristic, too, may become largely different depending on an influence of an environment surrounding the apparatus such as humidity in particular, the film thickness of the photosensitive member, etc.

As the photo-induced discharge characteristic of the photosensitive member 2 or the development γ characteristic largely changes in accordance with the condition in which the image forming apparatus is used, an optimal charging bias, an optimal exposure energy or an optimal developing bias may deviate from an optimal value which is calculated in the manner described above. Noting this, as described in relation to the following preferred embodiment (C-1), it is desirable to store in the memory 127 optimal exposure energies and optimal developing biases corresponding to various conditions of use which are predicted in advance, read out an optimal exposure energy and an optimal developing bias for the condition of actual use and optimize the exposure energy and the developing bias.

Further, as described in relation to the following preferred embodiment (C-2), it is desirable to store in the memory 127 optimal charging biases, optimal exposure energies and optimal developing biases corresponding to various conditions of use which are presumed in advance, read out an optimal charging bias, an optimal exposure energy and an optimal developing bias for the condition of actual use and optimize the charging bias, the exposure energy and the developing bias.

C-1. Optimization of Exposure Energy and Developing Bias

A mechanical and an electrical structures of an image forming apparatus according to the embodiment (C-1) are the same as those according to the first preferred embodiment. Specific operations are only partially different with respect to processing of setting an optimal exposure energy and an optimal developing bias by the control unit 1, and the other operations are the same as those according to the first preferred embodiment. Hence, differences from the first preferred embodiment will be mainly described with reference to FIGS. 18 and 19.

FIG. 18 is a flow chart showing optimization of density adjustment factors according to the embodiment (C-1). FIG. 19 is a schematic diagram showing operations according to the embodiment (C-1). In the embodiment (C-1), "temperature/humidity environment" and "film thickness of photosensitive member" are set as the condition of use, and an optimal condition for each condition of use (an optimal exposure energy and an optimal developing bias) is determined in accordance with the sequence shown in FIG. 18 and stored in the memory 127 as they are associated with the condition of use. In FIG. 19, the symbols HH, NN and LL in the "temperature/humidity environment" column denote "higher-temperature, higher-humidity environment," "normal-temperature, normal-humidity environment" and "lower-temperature, lower-humidity environment."

According to the embodiment (C-1), first, assuming that the condition of use is the "HH" environment, an optimal exposure energy E(H1) and an optimal developing bias Vb(H1) as they are when the film thickness of the photosensitive member 2 is t1 are calculated in accordance with the sequence shown in FIG. 18 and stored in the memory 127 as they are associated with the condition of use.

First, upon completion of assembly of the apparatus for instance, via an operation part (not shown) such as a key board, an operator or someone appropriate provides the image forming apparatus with a photo-induced discharge characteristic of the photosensitive member 2 corresponding to the condition of use. The control unit 1 accordingly acquires the photo-induced discharge characteristic which will be temporarily stored in the memory 127 (Step S17). Further, via the operation part, with respect to a particular toner color, the operator provides the image forming apparatus with a development γ characteristic which corresponds to the condition of use. The control unit 1 accordingly acquires the development γ characteristic which will be temporarily stored in the memory 127 (Step S18).

Next, the CPU 124 of the control unit 1 reads the photo-induced discharge characteristic and the development γ characteristic from the memory 127. After calculating correlation data between the exposure energy E and the developing bias Vb for forming a toner image at a higher-density side target density as higher-density side correlation data (Step S13) and lower-density side correlation data between the exposure energy E and the developing bias Vb for forming a toner image at a lower-density side target density (Step S14) in a manner similar to that according to the first preferred embodiment (FIG. 3), a product set of the higher-density side correlation data and the lower-density side correlation data is calculated (Step S15). The optimal exposure energy and the optimal developing bias with respect to the particular toner color acquired at the step S12 are calculated in this fashion. This processing is repeated on all toner colors, whereby the optimal exposure energies E(H1) and the optimal developing biases Vb(H1) are calculated and stored in the memory 127.

Next, as to a situation that the film thickness of the photosensitive member 2 is t2 as well, the series of processing above shown in FIG. 18 is executed so that optimal exposure energies E(H2) and optimal developing biases Vb(H2) corresponding to the respective conditions of use are calculated and stored in the memory 127. This is performed for other conditions of use, and a data table is created in the memory 127 (See FIG. 19.).

As the apparatus is shipped from a plant and delivered to a user, the CPU 124 detects the condition in which the apparatus is used at appropriate timing (e.g., at the start-up of the apparatus or during a stand-by for printing) based on the film thickness of the photosensitive member. The CPU 124 may infer from temperature/humidity information which is detected by means of an output from a temperature/humidity sensor disposed within the apparatus and data such as a total operation time, the total number of printed sheets, etc. The CPU 124 also reads an optimal condition which corresponds to the detection results from the data table (FIG. 19) in the memory 127 and sets this as an optimal exposure energy and an optimal developing bias. Thus, in the embodiment (C-1), as the CPU 124 functions as "film thickness deriving means" and "optimization means" of the present invention, an image is formed always with an optimal exposure energy and an optimal developing bias which correspond to the condition of use, and therefore, it is possible to further stabilize a toner image.

Although optimal exposure energies and optimal developing biases corresponding to various conditions of use which are assumed in advance are stored in the memory 127 as shown in FIG. 19 in the embodiment (C-1), a photo-induced discharge characteristic and a development γ characteristic in the respective conditions of use may be stored in the memory 127 instead of an optimal exposure energy and an optimal developing bias. In the modified embodiment, the CPU 124 reads a photo-induced discharge characteristic and a development γ characteristic corresponding to the condition in which the apparatus is used at appropriate timing, and calculates an optimal exposure energy and an optimal developing bias are through similar processing flow to that shown in FIG. 18.

C-2. Optimization of Charging Bias, Exposure Energy and Developing Bias

The mechanical and electrical structures of an image forming apparatus according to the embodiment (C-2) are the same as those according to the first preferred embodiment. Specific operations are only partially different with respect to processing of setting an optimal charging bias, an optimal exposure energy and an optimal developing bias by the control unit 1, and the other operations are the same as those according to the second preferred embodiment. Hence, differences from the second preferred embodiment will mainly be described with reference to FIGS. 20 and 21.

Figure 20:
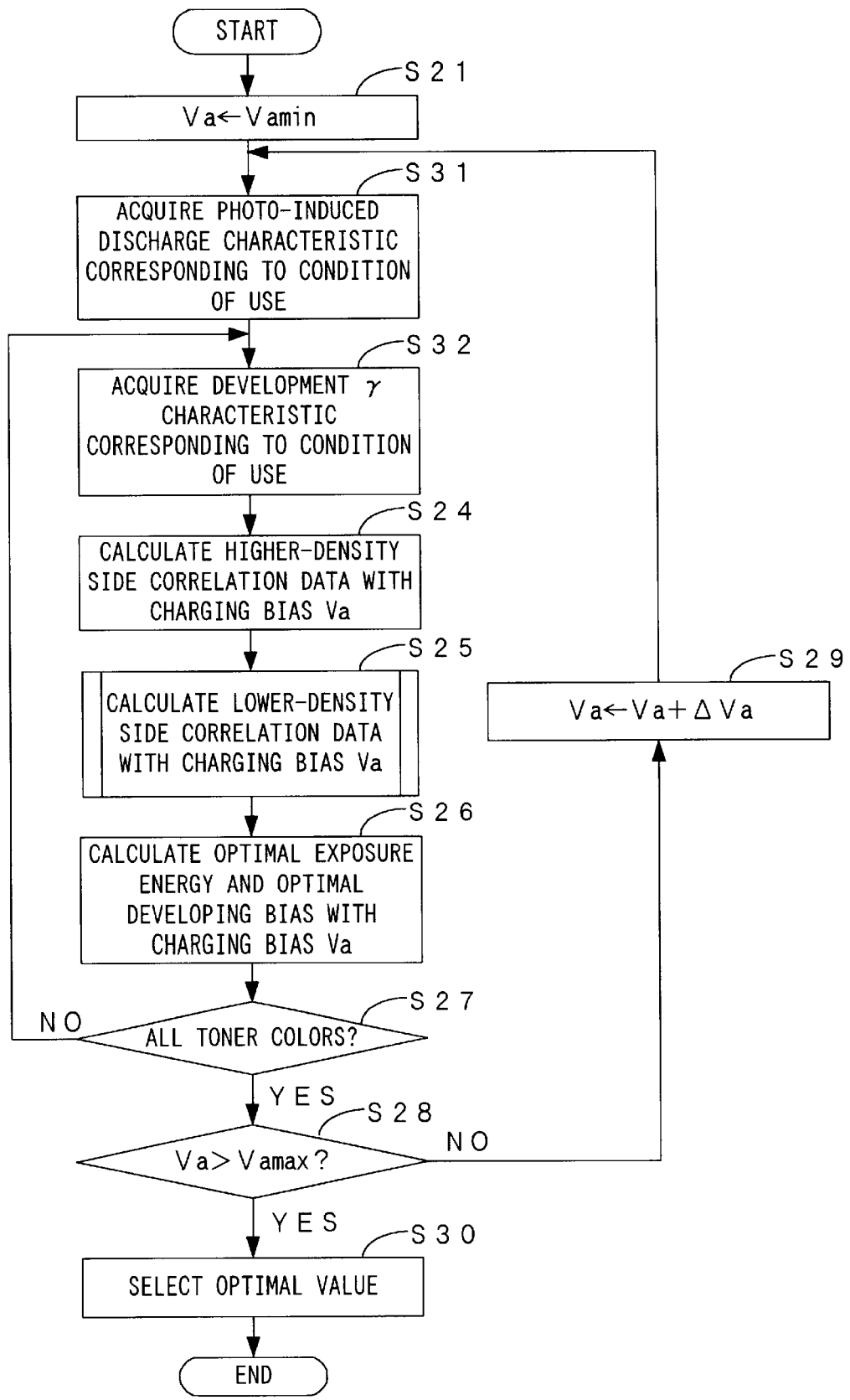
FIG. 20 is a flow chart showing optimization of density adjustment factors according to the embodiment (C-2)

FIG. 20 is a flow chart showing optimization of density adjustment factors according to the embodiment (C-2). FIG. 21 is a schematic diagram showing operations according to the embodiment (C-2). In the embodiment (C-2), "temperature/humidity environment" and "film thickness of photosensitive member" are set as the condition of use, and an optimal condition for each condition of use (an optimal exposure energy and an optimal developing bias) are determined in accordance with the sequence shown in FIG. 20 and stored in the memory 127 as they are associated with the condition of use. In FIG. 21, the symbols; HH, NN and LL in the "temperature/humidity environment" column denote "higher-temperature, higher-humidity environment," "normal-temperature, normal-humidity environment" and "lower-temperature, lower-humidity environment."

According to the embodiment (C-2), first, assuming that the condition of use is the "HH" environment and that the film thickness of the photosensitive member 2 is t1, an optimal charging bias Va(H1), an optimal exposure energy E(H1) and an optimal developing, bias Vb(H1) are calculated in accordance with the sequence shown in FIG. 20 and stored in the memory 127 as they are associated with the condition of use.

First, the charging bias Va is set to a minimum value in a programmable range which can be set by the charging bias generation part 121, namely, a minimum charging bias Vamin (Step S21). Following this, via the operation part, an operator or someone appropriate provides the image forming apparatus with the photo-induced discharge characteristic of the photosensitive member 2 corresponding to the condition of use. The control unit 1 accordingly acquires the photo-induced discharge characteristic which will be temporarily stored in the memory 127 (Step S31). Further, via the operation part, with respect to a particular toner color, the operator provides the image forming apparatus with a development γ characteristic which corresponds to the condition of use. The control unit 1 accordingly acquires the development γ characteristic which will be temporarily stored in the memory 127 (Step S32).

Next, the CPU 124 of the control unit 1 reads the photo-induced discharge characteristic and the development γ characteristic from the memory 127. After calculating correlation data between the exposure energy E and the developing bias Vb for forming a toner image at a higher-density side target density as higher-density side correlation data (Step S24) and lower-density side correlation data between the exposure energy E and the developing bias Vb for forming a toner image at a lower-density side target density (Step S25) in a manner similar to that according to the second preferred embodiment (FIG. 10), a product set of the higher-density side correlation data and the lower-density side correlation data is calculated (Step S26).

As the optimal exposure energy and the optimal developing bias corresponding to the charging bias Va are calculated with respect to the particular toner color acquired at the step S32 are calculated, whether optimal exposure energies and optimal developing biases ware calculated with respect to all toner colors is judged at the step S27. While the judgment at the step S27 remains "NO," the processing at the steps S23 to S27 described above is repeated for the remaining toner colors, whereby the optimal exposure energies and the optimal developing biases at the charging bias Va are calculated with respect to the respective toner colors and stored in the memory 127.

On the other hand, when it is judged at the step S27 that optimal exposure energies and optimal developing biases at the charging bias Va are calculated with respect to all toner colors, whether the charging bias Va exceeds a maximum charging bias Vamax is judged at the next step S28. After incrementing the charging bias Va by a fine quantity ΔVa at the step S29 while the charging bias Va remains equal to or smaller than the maximum charging bias Vamax, the sequence returns to the step S22 and the steps S31, S32 and S24 to S27 are executed, whereby the optimal exposure energies and the optimal developing biases corresponding to the respective charging biases Va are calculated.

Of thus calculated optimal solutions, one fitting both the programmable range of exposure energy and the programmable range of developing bias is selected as an optimal value, and the optimal charging bias Va(H1), the optimal exposure energy E(H1) and the optimal developing bias Vb(H1) expressed by this optimal value are calculated and stored in the memory 127. This ensures that the optimal charging bias, the optimal exposure energy and the optimal developing bias remain within the programmable ranges.

Next, as to a situation that the film thickness of the photosensitive member 2 is t2 as well, the series of processing described above (FIG. 20) is executed so that optimal charging biases Va(H2), optimal exposure energies E(H2) and optimal developing biases Vb(H2) corresponding to the respective conditions of use are calculated and stored in the memory 127. This is performed for other conditions of use, and a data table is created in the memory 127 (See FIG. 21.).

The series of operations is carried out upon completion of assembly of the apparatus, for instance. As the apparatus is shipped from a plant and delivered to a user, the CPU 124 detects the condition in which the apparatus is used at appropriate timing (e.g., at the start-up of the apparatus or during a stand-by for printing) based on the film thickness of the photosensitive member. The CPU 124 may infer from temperature/humidity information which is detected by means of an output from a temperature/humidity sensor disposed within the apparatus and data such as a total operation time, the total number of printed sheets, etc. The CPU 124 reads an optimal condition which corresponds to the detection results from the data table (FIG. 21) in the memory 127, and sets this as an optimal charging bias, an optimal exposure energy and an optimal developing bias. Thus, in the embodiment (C-2), as the CPU 124 functions as "film thickness deriving means" and "optimization means" of the present invention, an image is formed always with an optimal charging bias, an optimal exposure energy and an optimal developing bias which correspond to the condition of use, and therefore, it is possible to further stabilize a toner image.

Although optimal exposure energies and optimal developing biases corresponding to various conditions of use which are assumed in advance are stored in the memory 127 as shown in FIG. 21 in the embodiment (C-2), a photo-induced discharge characteristic and a development γ characteristic in the respective conditions of use may be stored in the memory 127 instead of an optimal charging bias, an optimal exposure energy and an optimal developing bias. In the modified embodiment, the CPU 124 reads a photo-induced discharge characteristic and a development γ characteristic corresponding to the condition in which the apparatus is used are read at appropriate timing and an optimal charging bias, an optimal exposure energy and an optimal developing bias are calculated through similar processing flow to that shown in FIG. 20.

D. Fourth Preferred Embodiment

Figure 22:
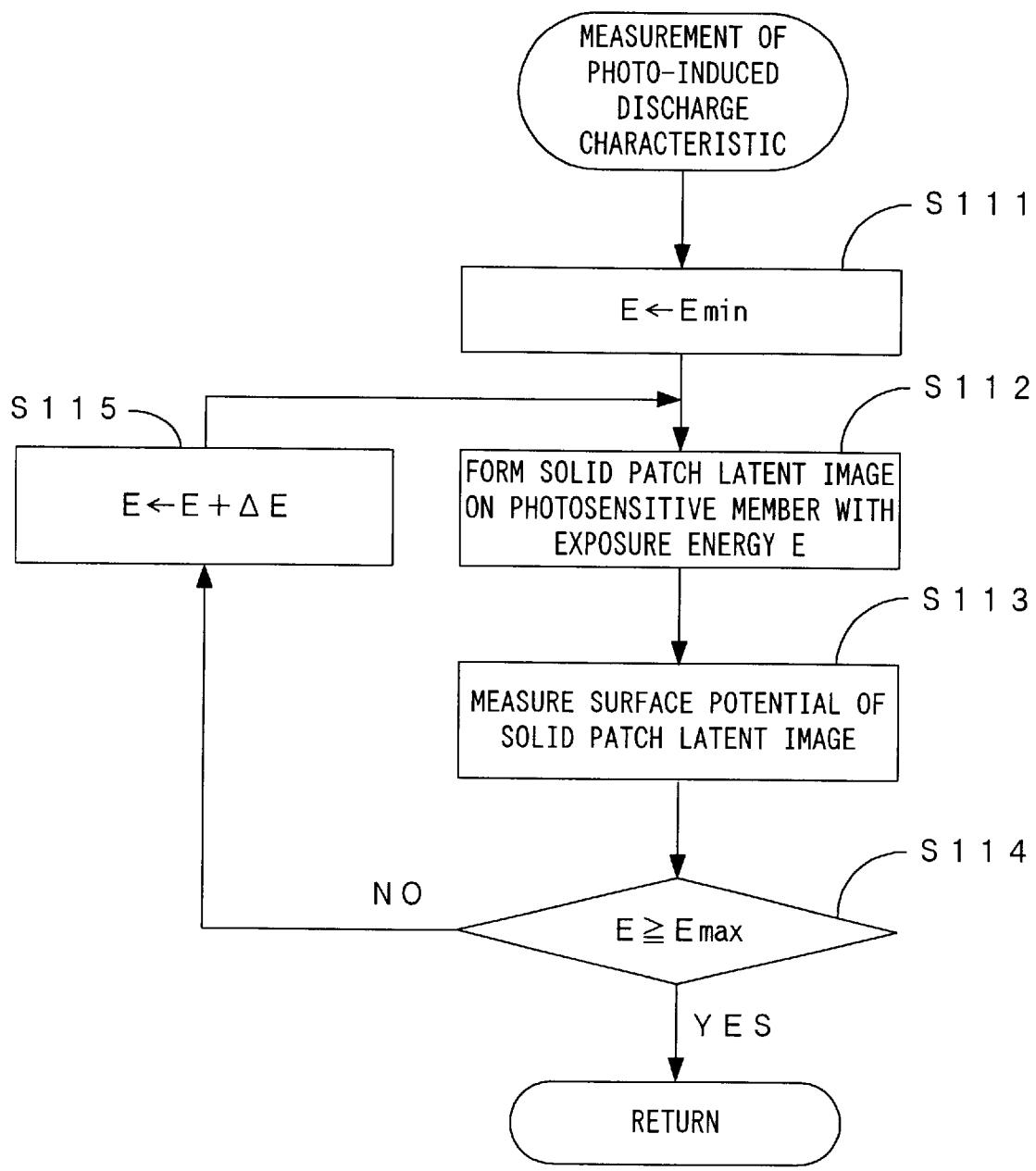
FIG. 22 is a flow chart showing measurement of photo-induced discharge characteristic which is executed in an image forming apparatus according to the fourth preferred embodiment of the present invention.

While the photo-induced discharge characteristic of the photosensitive member 2 is known in advance and an operator, via an operation part (not shown) such as a key board, enters a photo-induced discharge characteristic in the image forming apparatus (Steps S11, S21, S17, S31) in the first preferred embodiment shown in FIG. 3, the second preferred embodiment shown in FIG. 10 and the third preferred embodiment shown in FIGS. 18 and 20, the photo-induced discharge characteristic of the photosensitive member 2 may be actually measured by executing "measurement of photo-induced discharge characteristic" shown in FIG. 22 instead of this inputting processing. The mechanical and electrical structures of an image forming apparatus according to the fourth preferred embodiment are the same as those according to the first preferred embodiment, and operations of the apparatus as a whole are the same as those according to the first preferred embodiment to the third preferred embodiment except for that the photo-induced discharge characteristic of the photosensitive member 2 is actually measured while controlling the respective portions of the apparatus by the control unit 1. Hence, the "measurement of photo-induced discharge characteristic" which is a difference from the precedent preferred embodiments will mainly be described with reference to FIG. 22.

FIG. 22 is a flow chart showing measurement of photo-induced discharge characteristic which is executed in an image forming apparatus according to the fourth preferred embodiment of the present invention. In this measurement, first, the exposure energy E is set to a minimum exposure energy Emin (Step S111). After forming a solid patch latent image corresponding to a solid patch image on the photosensitive member 2 with this exposure energy E (Step S112), a surface potential measurement apparatus for measuring surface potential measures a surface potential of this solid patch latent image (Step S113), and the exposure energy E and the surface potential as they are associated with each other are stored in the memory 127.

As a surface potential of the photosensitive member 2 upon irradiation of the light beam L on the surface of the photosensitive member 2 with the exposure energy E is thus found, whether the exposure energy E exceeds a maximum exposure energy Emax is judged at the step S114. After incrementing the exposure energy E by a fine quantity ΔE at the step S115 while the judgment remains "NO," i.e., while the exposure energy E remains equal to or smaller than the maximum exposure energy Emax, the sequence returns to the step S112 and the steps S112 and S113 are executed, whereby surface potentials of the photosensitive member 2 upon irradiation of the light beam L on the surface of the photosensitive member 2 with the respective exposure energies E are obtained and stored in the memory 127.

Through the series of processing (Step S111 to Step S115), a photo-induced discharge characteristic as that denoted at the solid line in FIGS. 4 and 5 is obtained. After the photo-induced discharge characteristic is thus obtained, in a manner similar to those in the first preferred embodiment and the second preferred embodiment, an optimal exposure energy and an optimal developing bias are calculated.

As described above, according to the fourth preferred embodiment, it is possible to accurately yield the photo-induced discharge characteristic of the photosensitive member 2. The fourth preferred embodiment, as compared with the first preferred embodiment and the second preferred embodiment in particular, attains the following effect. That is, although the premise in the first preferred embodiment and the second preferred embodiment is that the photo-induced discharge characteristic of the photosensitive member 2 is known, even though a plurality of photosensitive members are manufactured in compliance with the same standard, there are differences between the individual photosensitive members. The respective photosensitive members 2 are generally different in terms of photo-induced discharge characteristic, rather than always sharing the identical photo-induced discharge characteristic. The level of fatigue and deterioration of the photosensitive member, in particular, is dependent upon the condition of use, and the photo-induced discharge characteristic changes in accordance with the fatigue or deterioration level. While it is possible to store the photo-induced discharge characteristic of the photosensitive member in the memory considering this fatigue or deterioration level as well, this approach merely increases the quantity of data to be stored and therefore is unrealistic. Hence, with the photo-induced discharge characteristic of the photosensitive member 2 actually measured as in the fourth preferred embodiment, it is possible to accurately yield the photo-induced discharge characteristic of the photosensitive member 2 in response to the condition of use without affected by individual differences among the photosensitive members. An optimal exposure energy and an optimal developing bias which are calculated based on the actually measured photo-induced discharge characteristic, therefore, are more accurate than those calculated according to the first preferred embodiment and the second preferred embodiment. As a result, it is possible to form a toner image more stably.

While the fourth preferred embodiment requires to form a solid patch latent image on the photosensitive member 2 for the purpose of actually measuring the photo-induced discharge characteristic, this may not be limited to a solid patch latent image. A higher-density image which is close to a solid patch latent image, e.g., a latent image whose area ratio is approximately 80% or more may be formed on the photosensitive member 2 and a surface potential of this latent image may be measured.

Further although a surface potential of the photosensitive member 2 is measured with a surface potential measurement apparatus in the fourth preferred embodiment described above, a sensor 2a for measurement of surface potential may be disposed along the outer circumferential surface of the photosensitive member 2 in the image forming apparatus in advance as shown in FIG. 1. In this case, arranging a sensor in the vicinity of a developing position is more preferable, as this allows to measure a surface potential of the photosensitive member 2 during development.

E. Fifth Preferred Embodiment

In the first preferred embodiment shown in FIG. 3, the second preferred embodiment shown in FIG. 10 and the third preferred embodiment shown in FIGS. 18 and 20, a development γ characteristic corresponding to the respective toner colors are known in advance and an operator, via an operation part (not shown) such as a key board, enters the development γ characteristic in the image forming apparatus (Steps S12, S22, S18, S32). An operation "measurement of development γ characteristic" shown in FIG. 23 may be executed instead of this inputting processing to thereby actually measure the development γ characteristic. The mechanical and electrical structures of an image forming apparatus according to the fifth preferred embodiment are the same as those according to the first preferred embodiment, and operations of the apparatus as a whole are the same as those according to the first preferred embodiment to the third preferred embodiment except for that the development γ characteristic is actually measured while controlling the respective portions of the apparatus by the control unit 1. Hence, the "measurement of development γ characteristic" which is a difference from the precedent preferred embodiments will mainly be described with reference to FIG. 23.

Figure 23:
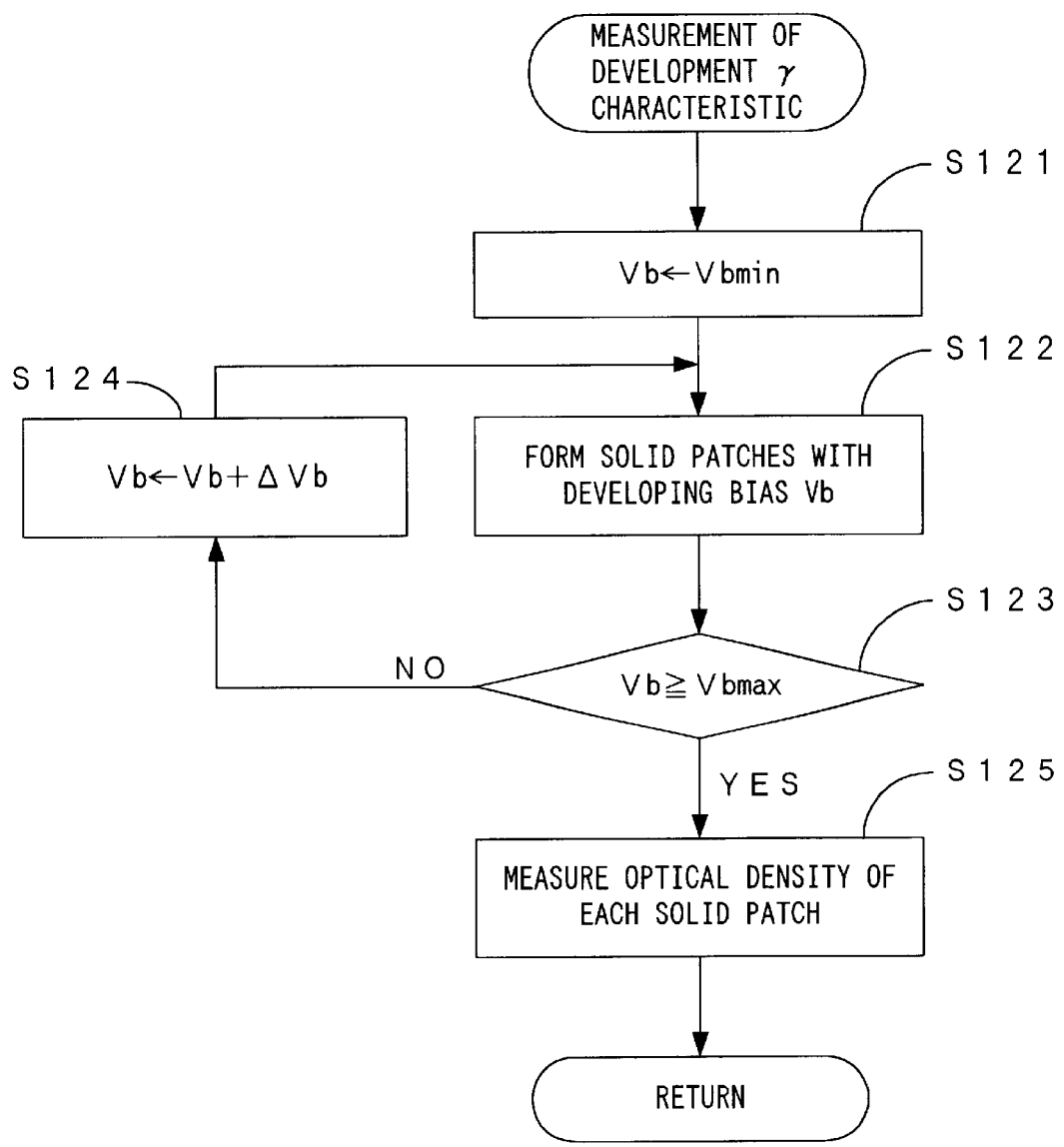
FIG. 23 is a flow chart showing measurement of development γ characteristic which is executed in an image forming apparatus according to the fifth preferred embodiment of the present invention.

FIG. 23 is a flow chart showing measurement of development γ characteristic which is executed in an image forming apparatus according to the fifth preferred embodiment of the present invention. In this measurement, first, the developing bias Vb is set to a minimum developing bias Vbmin (Step S121). After forming a solid patch latent image on the photosensitive member 2 with a predetermined exposure energy E, the solid patch latent image is developed with toner at the developing bias Vb, a solid patch image is formed, and the solid patch image is primarily transferred onto the intermediate transfer belt 71 (Step S122).

Whether the developing bias Vb exceeds a maximum developing bias Vbmax is judged at the next step S123. After incrementing the developing bias Vb by a fine quantity ΔVb at the step S124 while the judgment remains "NO," i.e., while the developing bias Vb remains equal to or smaller than the maximum developing bias Vbmax, the sequence returns to the step S122 and the steps S122 and S123 are executed, whereby solid patch images are formed with the respective developing biases Vb and these solid patch images are primarily transferred onto the intermediate transfer belt 71.

On the other hand, when it is judged "YES" at the Step S123, the sequence proceeds to the step S125 to thereby calculate the optical densities of the plurality of solid patch images formed side by side on the intermediate transfer belt 71 based on a signal outputted from the patch sensor PS and store the optical densities as they are associated with the developing biases in the memory 127.

A development γ characteristic is obtained with respect to a particular toner color in this manner. After the development γ characteristic is thus obtained, an optimal exposure energy and an optimal developing bias are calculated based on the development γ characteristic and the photo-induced discharge characteristic of the photosensitive member 2 in a manner similar to those in the first preferred embodiment and the like, or an optimal charging bias, an optimal exposure energy and an optimal developing bias are calculated based on the development γ characteristic and the photo-induced discharge characteristic of the photosensitive member 2 in a manner similar to those in the second preferred embodiment and the like.

As described above, according to the fifth preferred embodiment, it is possible to accurately obtain a development γ characteristic. The fifth preferred embodiment, as compared with the first preferred embodiment through the fourth preferred embodiment in particular, attains the following effect. That is, although the premise in the first preferred embodiment through the fourth preferred embodiment is that a development γ characteristic is known in advance, even though a plurality of developers are manufactured in compliance with the same standard, there are differences between the individual developers as in the case of the photosensitive members. The respective developers are generally different in terms of development γ characteristic, rather than always-sharing the identical development γ characteristic. The level of fatigue and deterioration (the condition of residual toner and a surface condition of a developer roller in particular among members forming the developers) of the developers, in particular, is dependent upon the condition of use, and the development γ characteristic changes in accordance with the fatigue or deterioration level. Hence, with the development γ characteristic of the photosensitive member 2 actually measured as in the fifth preferred embodiment, it is possible to accurately yield the development γ characteristic of the developers in response to the condition of use without affected by individual differences among the developers. An optimal exposure energy and an optimal developing bias which are calculated based on the actually measured development γ characteristic, therefore, are more accurate than those calculated according to the first preferred embodiment to the fourth preferred embodiment. As a result, it is possible to form a toner image more stably.

Although the fifth preferred embodiment requires to form solid patch images for the purpose of actually measuring the development γ characteristic, this may not be limited to solid patch images. High-density images which are close to solid patch images, e.g., an image whose area ratio is approximately 80% or more may be formed to measure the optical densities of the respective higher-density images.

In addition, although the fifth preferred embodiment described above requires to form a plurality of solid images side by side on the intermediate transfer belt 71 which functions as "image carrier" of the present invention and has the patch sensor PS measure the optical densities of the respective patch images all at once, the optical density of a patch image may be measured every time the patch image is primarily transferred onto the intermediate transfer belt 71, or patch images may be divided into a few blocks and each block as a whole may be measured, or further alternatively, a sensor for reading density which is different from the patch sensor PS may be disposed as "density measuring means" of the present invention along the outer circumferential surface of the photosensitive member 2 and this sensor may measure the optical densities of patch images which are formed on the photosensitive member 2.

Further, the "measurement of development γ characteristic" described in detail above is applicable to the fourth preferred embodiment as well, and when actually applied, it is possible to form a toner image more stably by calculating higher-density side correlation data and lower-density side correlation data based on actually measured photo-induced discharge characteristic and development γ characteristic.

F. Sixth Preferred Embodiment

While lower-density side correlation data and higher-density side correlation data between an exposure energy and a developing bias based on the photo-induced discharge characteristic of the photosensitive member 2 and the development γ characteristic of the developers in the first, the third and the fifth preferred embodiments described above, the lower-density side correlation data and the higher-density side correlation data may be calculated by means of so-called patch sensing method as in a sixth preferred embodiment which will be described below. Since the mechanical and electrical structures of an image forming apparatus according to the sixth preferred embodiment are the same as those according to the first preferred embodiment, these structures will be denoted at the same reference symbols as those used for the first preferred embodiment and will not be described again.

Figure 24:
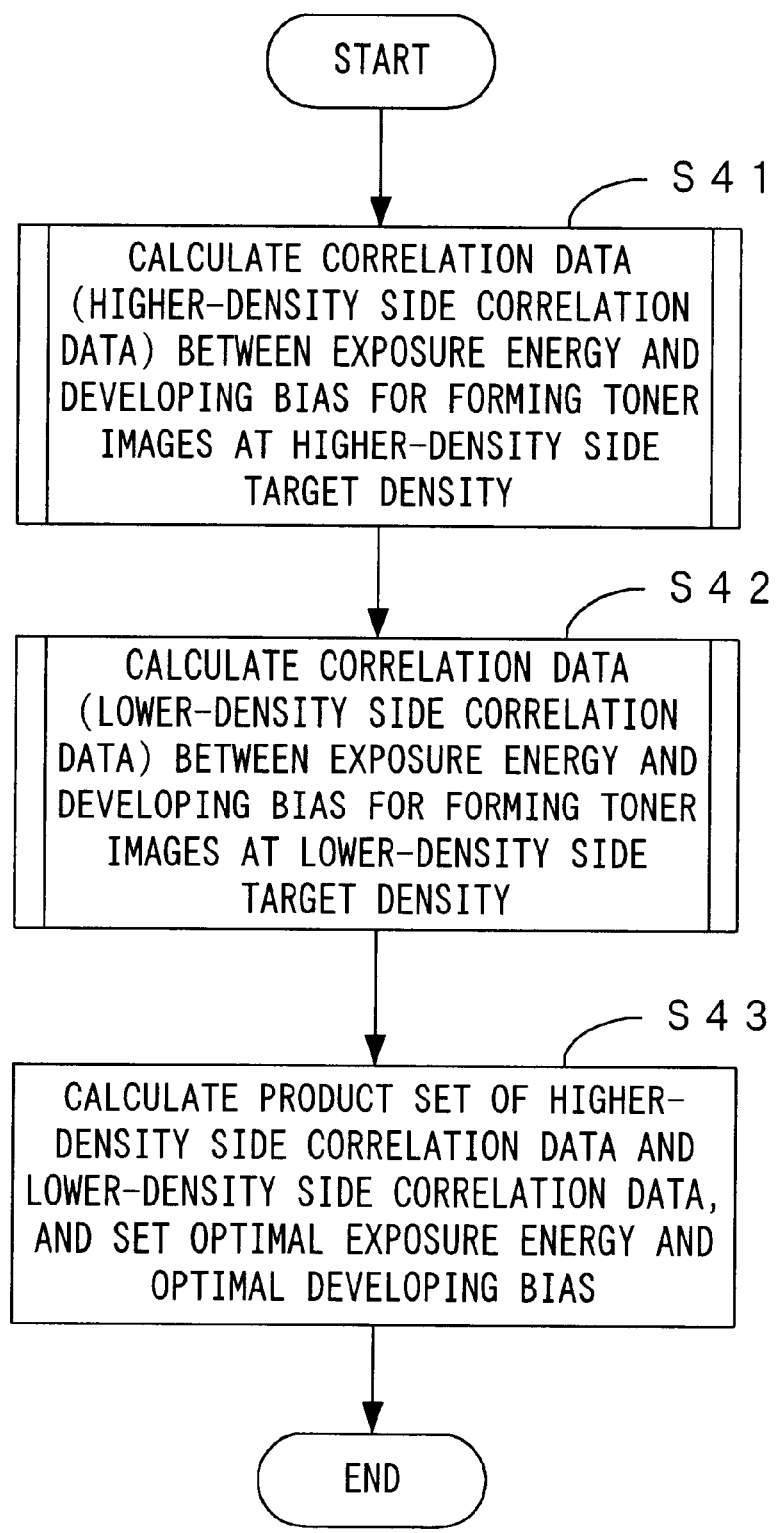
FIG. 24 is a flow chart showing optimization of density adjustment factors in the image forming apparatus according to the sixth preferred embodiment of the present invention.

FIG. 24 is a flow chart showing optimization of density adjustment factors in the image forming apparatus according to the sixth preferred embodiment of the present invention. FIGS. 25A to 25C are schematic diagrams showing the sequence of obtaining an optimal exposure energy and an optimal developing bias in the sixth preferred embodiment. In the sixth preferred embodiment, first, correlation data between the exposure energy E and the developing bias Vb for forming a toner image at a higher-density side target density (OD=1.2) by patch sensing, method are calculated as higher-density side correlation data (Step S41). More specifically, the higher-density side correlation data are calculated while the control unit 1 controls the respective portions of the apparatus in accordance with the sequence shown in the flow chart in FIG. 26.

Figure 26:
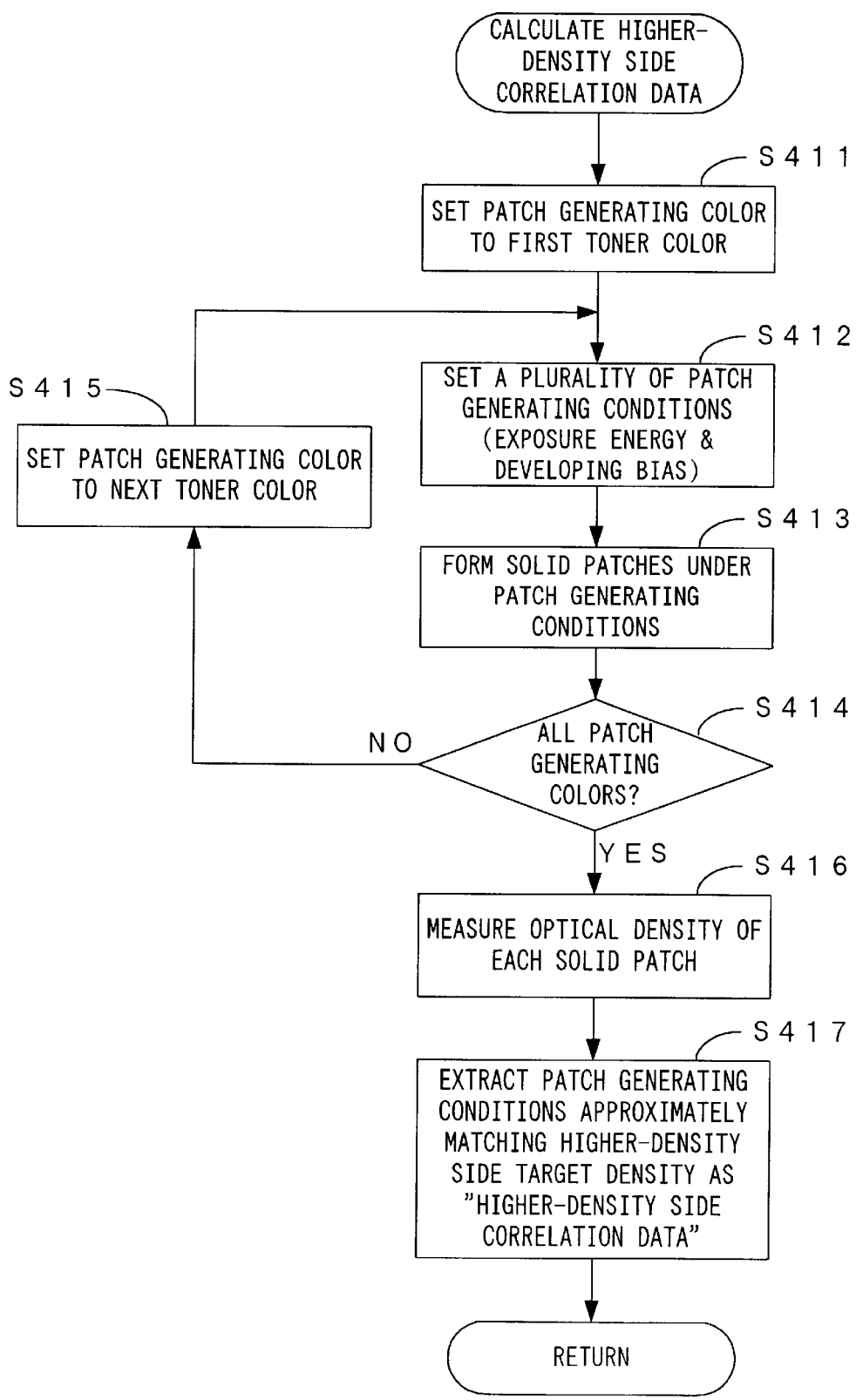
FIG. 26 is a flow chart showing the sequence of deriving the higher-density side correlation data in the sixth preferred embodiment.

FIG. 26 is a flow chart showing the sequence of deriving the higher-density side correlation data in the sixth preferred embodiment. First, the color in which patch images are to be formed is set to the first color, for example, black (Step S411). While a charging bias is set to an initial value which is stored in the memory 127 in advance, a plurality of patch generating conditions are set (Step S412). In this embodiment, the exposure energy E is changed to E1, E2, . . . , Em, and the developing bias Vb is changed to Vb(1), Vb(2), . . . , Vb(n).

Solid patch images (higher-density patch images) are formed one after another on the photosensitive member 2 in such patch generating conditions, during which each patch image is primarily transferred onto the outer circumferential surface of the intermediate transfer belt 71 (Step S413). Although solid patch images are formed in the sixth preferred embodiment, this may not be limited to solid patch images. High-density images which are close to solid patch images, e.g., an image whose area ratio is approximately 80% or more may be formed.

At the next step S414, whether patch images are formed in all toner colors or not is judged. While the judgment remains "NO," the patch generating color is set to the next color (Step S415) and the steps S412 and S413 are repeated, whereby solid patch images in the other toner colors, namely, cyan (C), magenta (M) and yellow (Y) are further formed on the outer circumferential surface of the intermediate transfer belt 71.

Conversely, if it is judged "YES" at the step S414, the patch sensor PS measures the optical densities of the respective patch images (Step S416). Although the sixth preferred embodiment requires to measure the optical densities of the patch images at once after creating the solid patch images in all patch generating colors, the optical densities of solid patch images may be measured after forming the respective solid patch images in each patch generating color, or further alternatively, solid patch images may be divided into a few blocks and each block as a whole may be measured. This similarly applies to processing of deriving lower-density side correlation data which will be described later.

Following this, at the step S417, patch generating conditions matching with the higher-density side target density (OD=1.2) are extracted as "higher-density side correlation data." For example, as shown in FIG. 25A, when solid patch images generated under patch generating conditions (E1, Vb(2)), (E2, Vb(3)), . . . among the solid patch images generated under the respective patch generating conditions (E, Vb) match with the higher-density side target density, these conditions (E1, Vb(2)), (E2, Vb(3)), . . . are determined the higher-density side correlation data.

After calculating the higher-density side correlation data in this manner (Step S41), correlation data between the exposure energy E and the developing bias Vb for forming a toner image at a lower-density side target density (OD=0.2) by patch sensing method are calculated as lower-density side correlation data (Step S42). More specifically, the lower-density side correlation data are calculated while the control unit 1 controls the respective portions of the apparatus in accordance with the sequence shown in the flow chart in FIG. 27.

Figure 27:
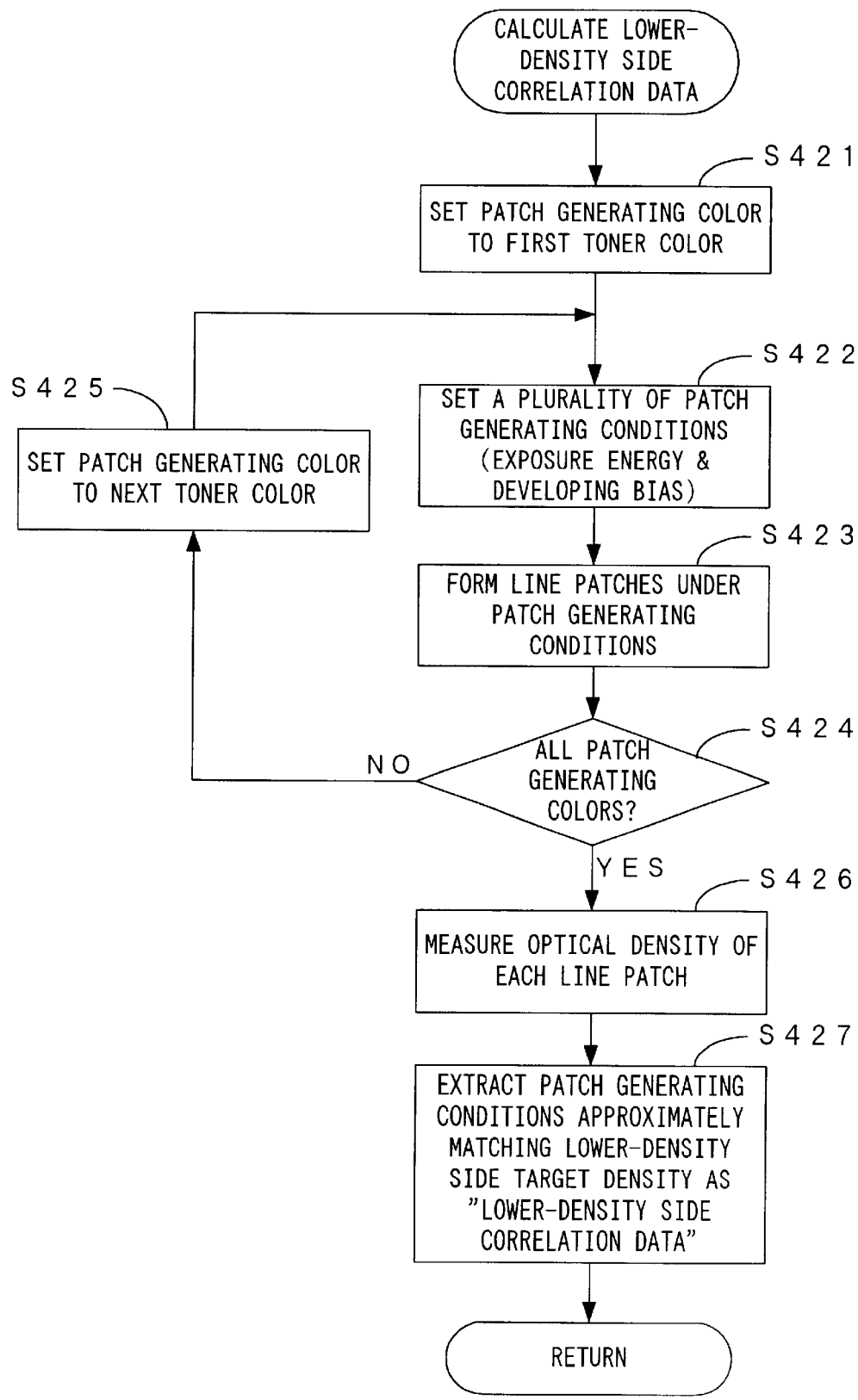
FIG. 27 is a flow chart showing the sequence of deriving the lower-density side correlation data in the sixth preferred embodiment.

FIG. 27 is a flow chart showing the sequence of deriving the lower-density side correlation data in the sixth preferred embodiment. First, the color in which patch images are to be formed is set to the first color, for example, black (K) (Step S421). While the charging bias is set to an initial value which is stored in the memory 127 in advance, a plurality of patch generating conditions are set (Step S422). Similarly to derivation of the higher-density side correlation data, the exposure energy E is changed to E1, E2, . . . , Em, and the developing bias Vb is changed to Vb(1), Vb(2), . . . , Vb(n).

Figure 7:
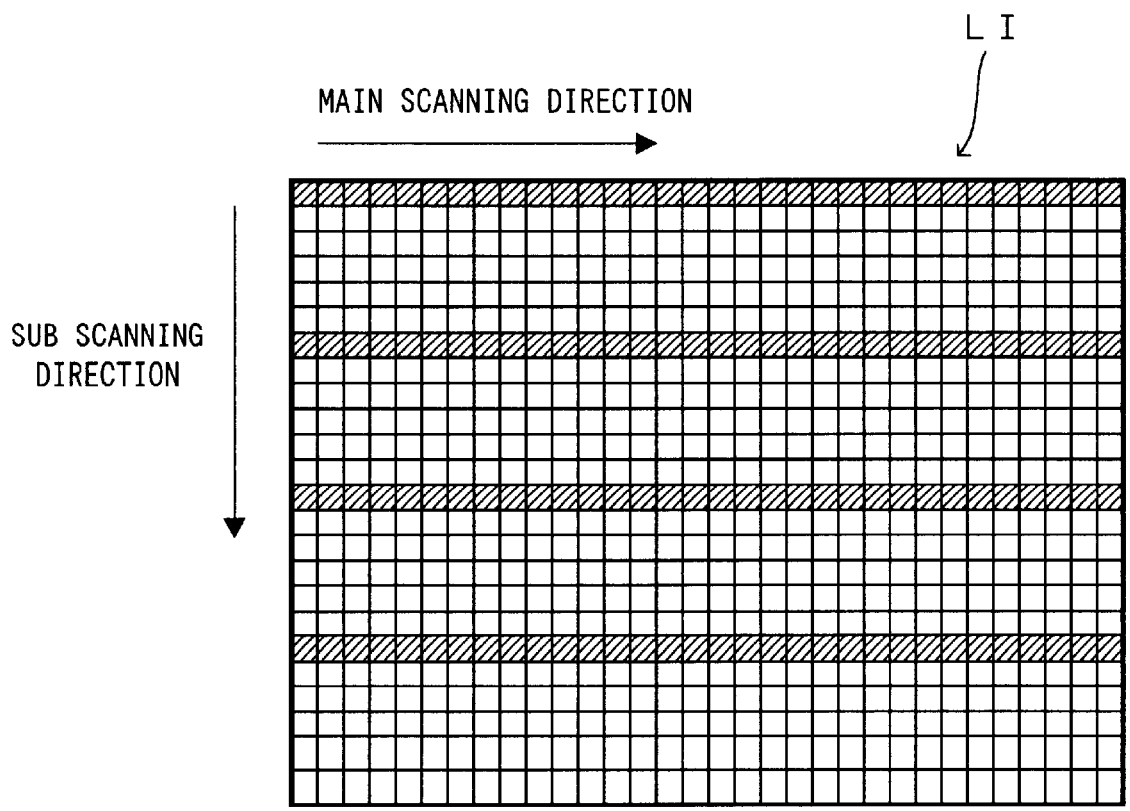
FIG. 7 is a drawing showing a second patch image.
Figure 8:
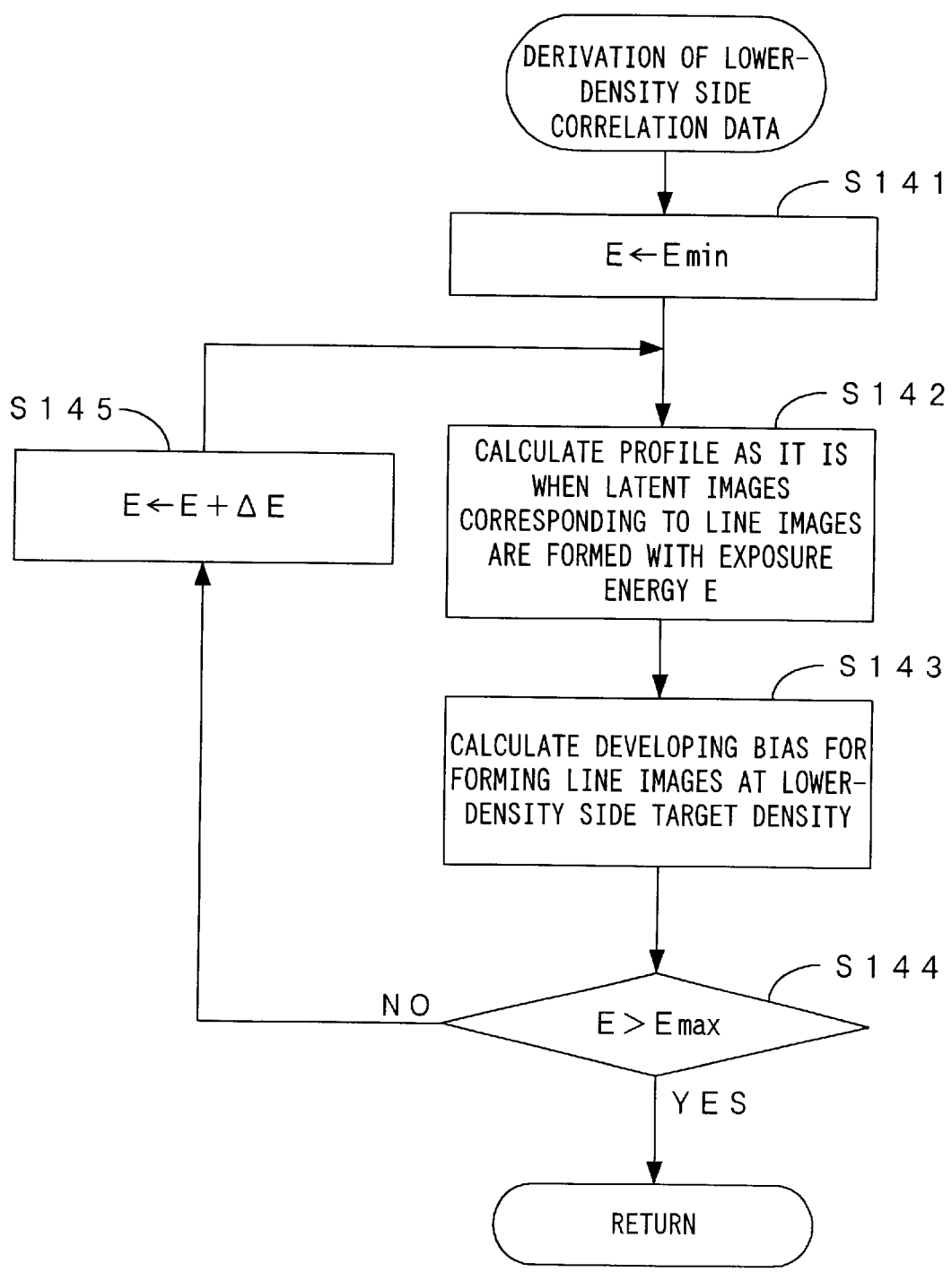
FIG. 8 is a flow chart showing calculation of lower-density side correlation data.

While serially forming 1-on-5-off line patch images LI as that shown in FIG. 7 on the photosensitive member 2 under these patch generating conditions as "lower-density patch images (second toner images)" of the present invention, each patch image is primarily transferred onto the outer circumferential surface of the intermediate transfer belt 71 (Step S423). Although 1-on-5-off line patch images LI are formed as lower-density images in the sixth preferred embodiment, this may not be limited to line patch images. Instead, various types of half-tone images may be used as patch images. However, when patch images LI are used as lower-density images, the following effects are obtainable. Preferred embodiments described later similarly achieve these effects.

Among conventional approaches, Japanese Patent Application Unexamined Gazette No. H9-50155 for instance, for the purpose of adjustment of the image densities of line images, requires that patch images which are obtained by outputting pairs of 3-dot lines are used and a patch image sensor reads the patch images to thereby detect the line width. The power of laser is controlled based on thus detected line width, so that an exposure volume is adjusted so as to obtain a desired line width and an ideal line image is obtained. However, since a line image is basically formed by a 1-dot line which is drawn with one laser bears, a controlled line width of a multi-dot line as that proposed in conventional techniques is not necessarily sufficient adjustment of a line image. In contrast, according to the sixth preferred embodiment, toner images, formed by a plurality of 1-dot lines which are spaced apart from each other are what are formed as line patch images, as shown in FIG. 7. The optical densities of thus formed line patch images are measured and adjusted to the lower-density side target density as described later, and therefore, it is possible to stabilize the image densities of line images which are formed by 1-dot lines.

There is another advantageous effect because of a fact that the line patch images are 1-on-5-off images. The light beam L generally has a light intensity distribution of the Gaussian type. In many cases therefore, a design spot diameter is generally adjusted such that the diameter of a spot whose light intensity is approximately 50% of a maximum light intensity corresponds to a design resolution, in which case the design spot diameter is exceeded by an effective exposure spot diameter corresponding to $1/e^2$ which is effective as an exposure energy. Because of this, if line intervals between adjacent 1-dot lines are small, there is a problem that adjacent effective exposure spots interfere with each other and this interference changes surface potentials between the lines. This thickens the width of the lines which are intended as 1-dot lines. In contrast, such a problem is overcome when adjacent 1-dot lines are spaced apart by intervals equivalent to five lines as in the sixth preferred embodiment. In other words, it is possible to form isolated 1-dot line groups without influenced by adjacent lines. Although the intervals may be of course six or more lines, such can lead to a problem with respect to the measuring sensitivity of the patch sensor PS, since it becomes necessary, to reduce the lower-density side target density as the number of off-lines increases. Hence, 1-on-5-off images used as line patch images in the sixth preferred embodiment, considering these factors as a whole, are the most effective patch images.

An increase in lower-density side target density aiming at a better measuring sensitivity of the patch sensor is desirable in that a so-called lattice pattern of 1-on-5-off in the horizontal direction and 1-on-5-off in the vertical direction, for instance, forms isolated 1-dot line groups. It is needless to mention that the intervals may be of course six or more lines in any one of the horizontal direction and the vertical direction in this lattice pattern as well.

At the next step S424, whether patch images are formed in all toner colors or not is judged. While the judgment remains "NO," the patch generating color is set to the next color (Step S425) and the steps S422 and S423 are repeated, whereby line patch images in the other toner colors, namely, cyan (C), magenta (M) and yellow (Y) are further formed on the outer circumferential surface of the intermediate transfer belt 71.

Conversely, if it is judged "YES" at the step S424, the patch sensor PS measures the optical densities of the respective patch images (Step S426).

Following this, at the step S427, patch generating conditions matching with the lower-density side target density (OD=0.2) are extracted as "lower-density side correlation data." For example, as shown in FIG. 25B, when solid patch images generated under the respective patch generating conditions (E1, Vb(2)), (E2, Vb(3)), . . . among lie solid patch images generated under the respective patch generating conditions (E, Vb) match with the lower-density side target density, these conditions (E1, Vb(2)), (E2, Vb(3)), . . . are determined the lower-density side correlation data.

After calculating the higher-density side correlation data and the lower-density side correlation data in this manner, a product set of the two is calculated (Step S43). If the higher-density side correlation data and the lower-density side correlation data are calculated as shown in FIGS. 25A and 25B, respectively, the product set of the higher-density side correlation data and the lower-density side correlation data is correlation data (E2, Vb(3)) (FIG. 25C). Therefore, the exposure energy E2 and the developing bias Vb(3) are set respectively as an optimal exposure energy and an optimal developing bias and stored in the memory 127. Although the foregoing has described an example that correlation data belonging to the product set are only the correlation data (E2, Vb(3)), if there are a plurality pieces of correlation data, one piece of correlation data belonging to the product set may be selected and the exposure energy and the developing bias constituting the correlation data may be set respectively as an optimal exposure energy and an optimal developing bias.

As described above, according to the sixth preferred embodiment, it is possible to adjust the image densities of toner images to the higher-density side target density (OD= 1.2) and the lower-density side target density (OD=0.2) with respect to the respective toner colors and stably form images in a wide density range as in the first preferred embodiment. Further, since the exposure energy and the developing bias are used as the density adjustment factors for adjustment of the densities of toner images, it is possible to optimize the exposure energy and the developing bias by calculating a product set of the lower-density side correlation data and the higher-density side correlation data as described above. The sixth preferred embodiment, as compared with the first, the third and the fifth preferred embodiments, attains the following effects.

First, while it is necessary to calculate the photo-induced discharge characteristic of the photosensitive member 2 and the development γ characteristic of the developers in these preferred embodiments, it is not necessary to calculate these characteristics and therefore optimization of toner images is easier in the sixth preferred embodiment. Another advantage is that it is not necessary for the memory or the memory area to store data which correspond to the condition of the apparatus. Further, since the photo-induced discharge characteristic, the development γ characteristic and the like change in accordance with the operating state of the apparatus, a temperature/humidity environment, etc. as described earlier, optimization on a regular basis is desirable. Since so-called patch sensing method realizes optimization of the exposure energy and the developing bias in the sixth preferred embodiment, it is possible to flexibly deal with the operating state of the apparatus, a temperature/ humidity environment, etc. The timing for the optimization of the exposure energy and the developing bias described above may be upon turning on of a power source of the apparatus, upon arrival of a cumulative count value representing the total number of prints, etc.

Although only such data matching with the target densities on the higher-density side and the lower-density side are used as correlation data in the sixth preferred embodiment, data which are approximately the same as the target densities, such as data which are only a few % different from the target densities, may also be acceptable. A further alternative is to derive a function of the higher-density side correlation data as that denoted at the dotted-and-dashed line in FIG. 4 for instance out of the plurality pieces of correlation data (E1, Vb(2)), (E2, Vb(3)), . . . which are obtained at the step S41, derive a function of the lower-density side correlation data as that denoted at the double-dotted-and-dashed line in FIG. 5 for instance out of the plurality pieces of correlation data (E1, Vb(1)), (E2, Vb(3)), . . . which are obtained at the step S42, calculate a product set based on these two functions and set an optimal exposure energy and an optimal developing bias from the result of the calculation.

G. Seventh Preferred Embodiment

By the way, while the first, the second and the sixth preferred embodiments require to fix the charging bias and optimize the exposure energy and the developing bias to thereby adjust the image densities of toner images, there is a limitation on a programmable range in which the exposure power control part 123 can modify and set the exposure energy and a programmable range in which the developing bias generation part 126 can modify and set the developing bias. Because of this, the optimal exposure energy calculated as described above may be sometimes deviated from the programmable range of exposure energy, or the optimal developing bias calculated as described above may be sometimes deviated from the programmable range of developing bias. Noting this, according to the seventh preferred embodiment, the charging bias applied to the charging unit 3 from the charging bias generation part 121 is modified and set in a manner described below, so that an optimal exposure energy and an optimal developing bias stay within the programmable ranges.

Figure 28:
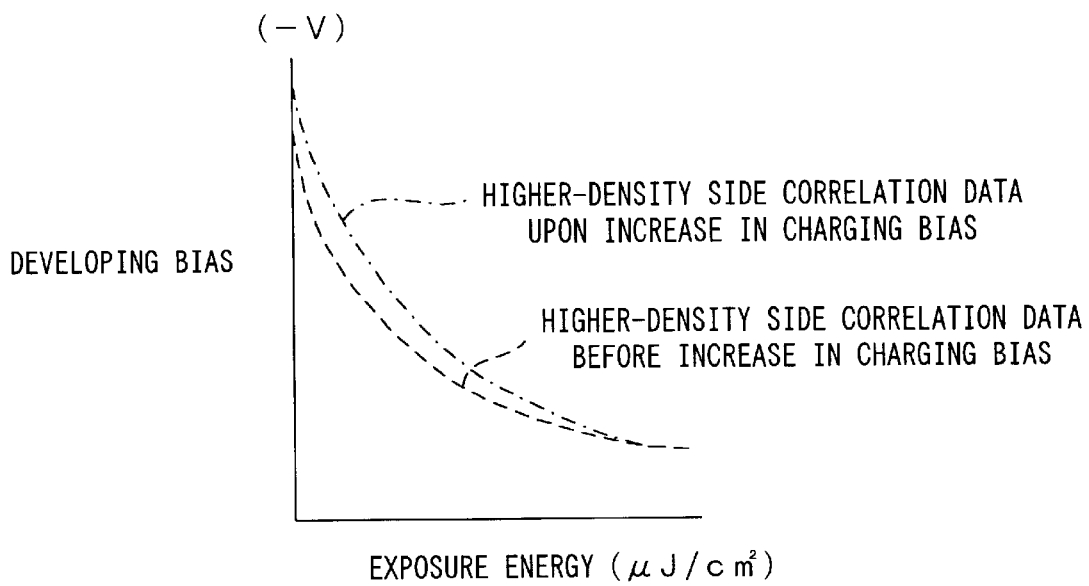
FIG. 28 is a graph showing a change in higher-density side correlation data with charging bias change.
Figure 29:
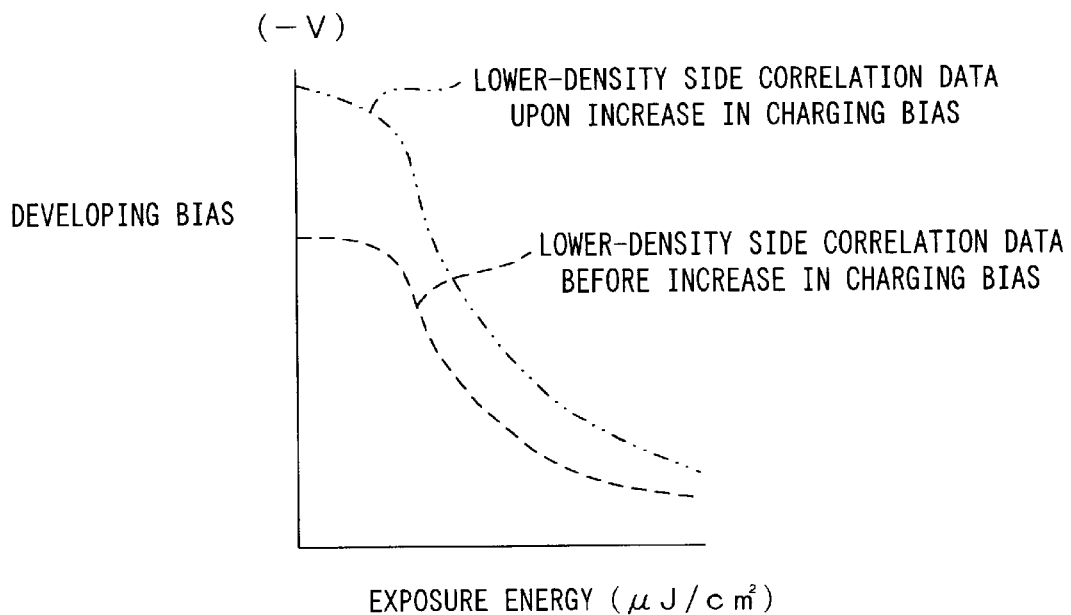
FIG. 29 is a graph showing a change in lower-density side correlation data with charging bias change.
Figure 30:
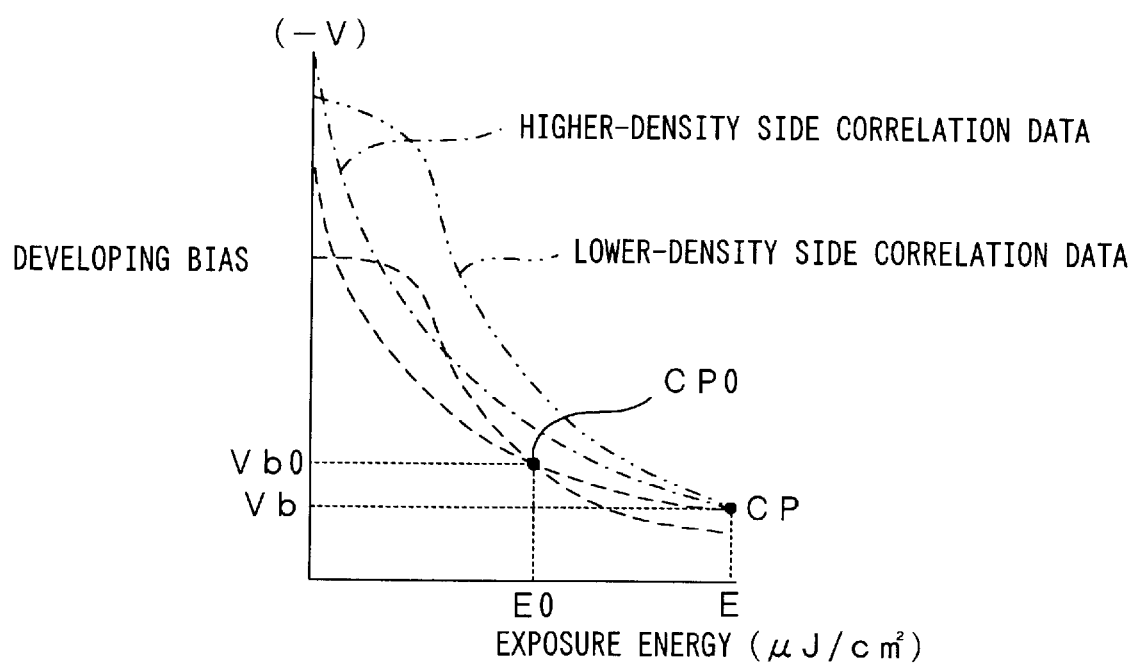
FIG. 30 is a graph showing shift of a product set of lower-density side correlation data and higher-density side correlation data with charging bias change.

As the charging bias is increased, for instance, the photo-induced discharge characteristic of the photosensitive member 2 shifts toward the larger-side as denoted at the dotted line in FIG. 4 or 5 for example. However, the amount of the shift changes in accordance with the exposure energy, i.e., remains relatively large on the lower-energy side (the left-hand side in FIGS. 4 and 5), decreases as the exposure energy increases and becomes almost zero on the higher-energy side (the right-hand side in FIGS. 4 and 5). Further, the change in photo-induced discharge characteristic due to the increased charging bias changes the higher-density side correlation data from the dotted curve to the dotted-and-dashed curve as shown in FIG. 28, and changes the lower-density side correlation data from the dotted curve to the double-dotted-and-dashed curve as shown in FIG. 29. Hence, as shown in FIG. 30, a product set of the higher-density side correlation data and the lower-density side correlation data shifts from a product set CP0 (E0, Vb0) as it is before the charging bias increases to a product set CP (E, Vb) as it is upon increase in charging bias. Of course, when the charging bias is decreased, the lower-density side correlation data, the higher-density side correlation data and the product set all shift in the opposite direction to that corresponding to an increase in charging bias. Changing and setting the charging bias in this manner makes it possible to change an optimal exposure energy and an optimal developing bias.

Therefore, in an image forming apparatus according to the seventh preferred embodiment, if the optimal exposure energy and the optimal developing bias obtained in the first, the third and the sixth preferred embodiments are not within the programmable ranges, after modifying and setting the charging bias, the optimal exposure energy and the optimal developing bias are optimized with the charging bias. This ensures that the optimal exposure energy and the optimal developing, bias remain within the programmable ranges. While the charging bias may be freely modified and set when the charging bias is to be modified and set, if it is possible to confirm the sizes of deviations from the programmable ranges, the charging bias can be set in accordance with the deviations. Noting this, the charging bias is modified and set after confirming the conditions of deviations in the image forming apparatus according to the seventh preferred embodiment. Now, the seventh preferred embodiment will be described with reference to FIGS. 31, 32A and 32B.

Figure 31:
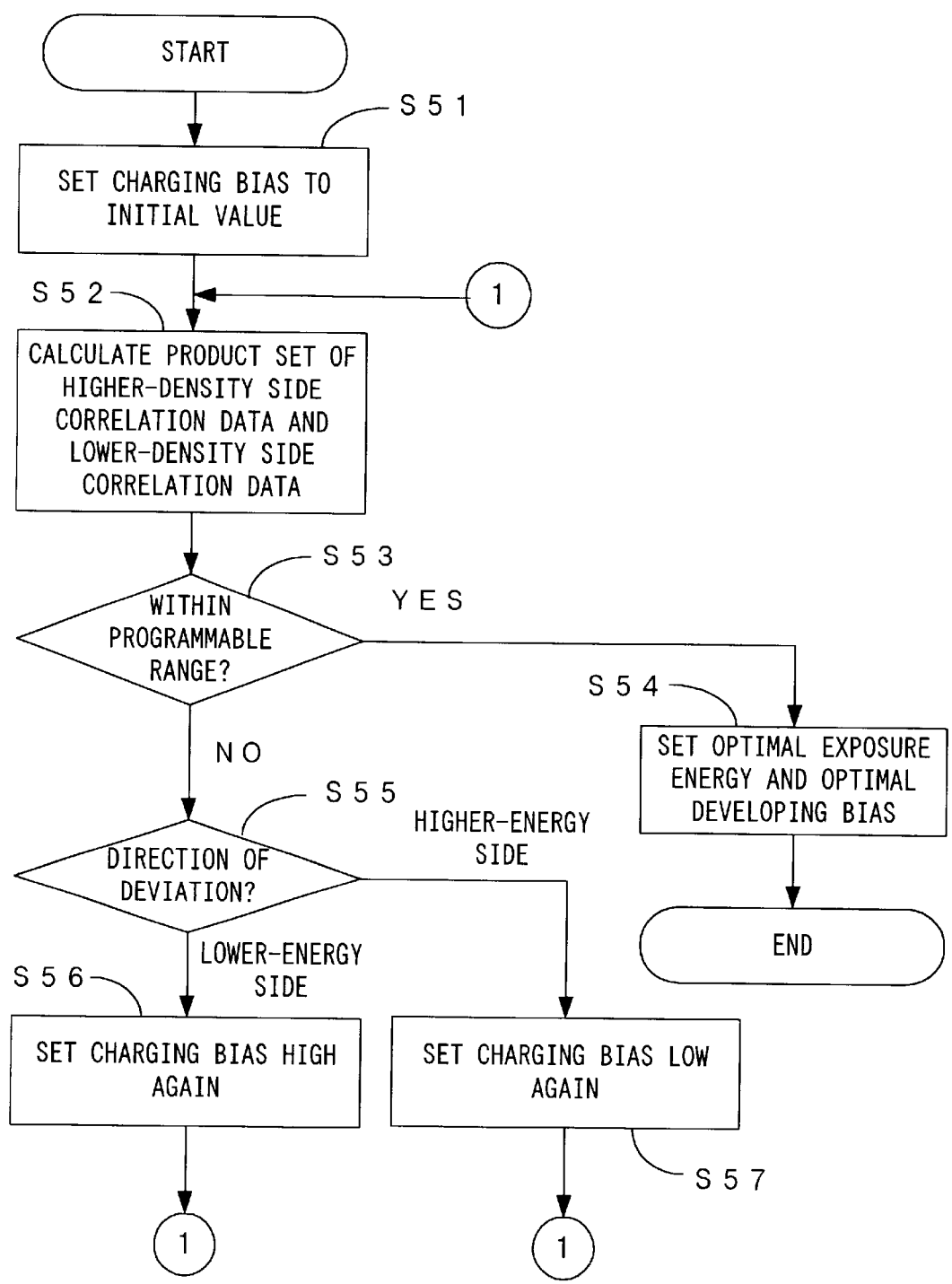
FIG. 31 is a flow chart showing optimization of density adjustment factors in the image forming apparatus according to the seventh preferred embodiment of the present invention.
Figure 32A:
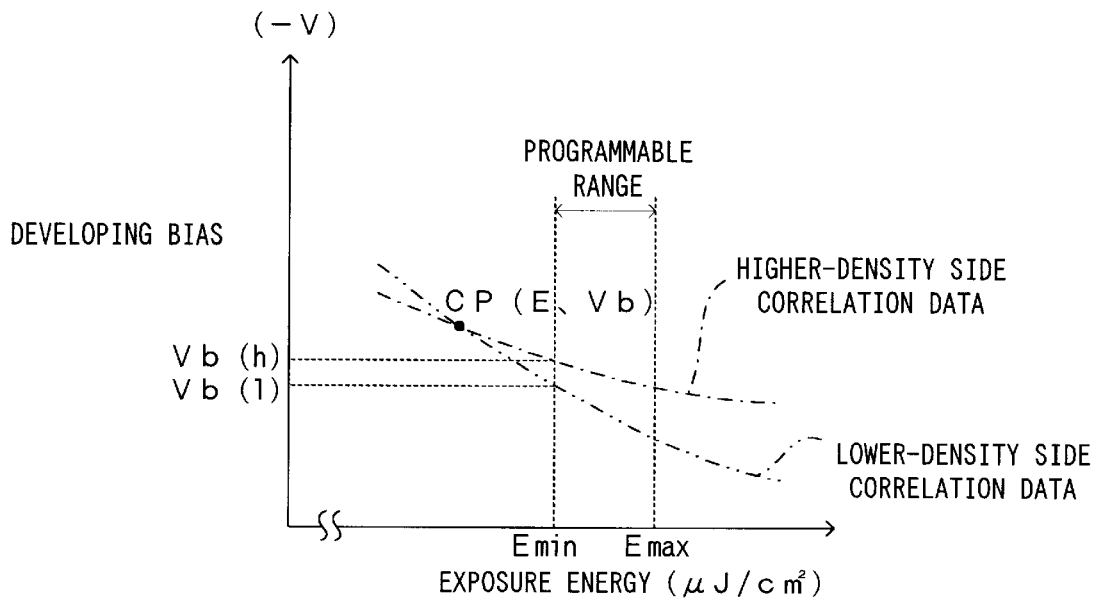
FIGS. 32A and 32B are schematic diagrams showing a relationship between product sets and the programmable ranges.
Figure 32B:
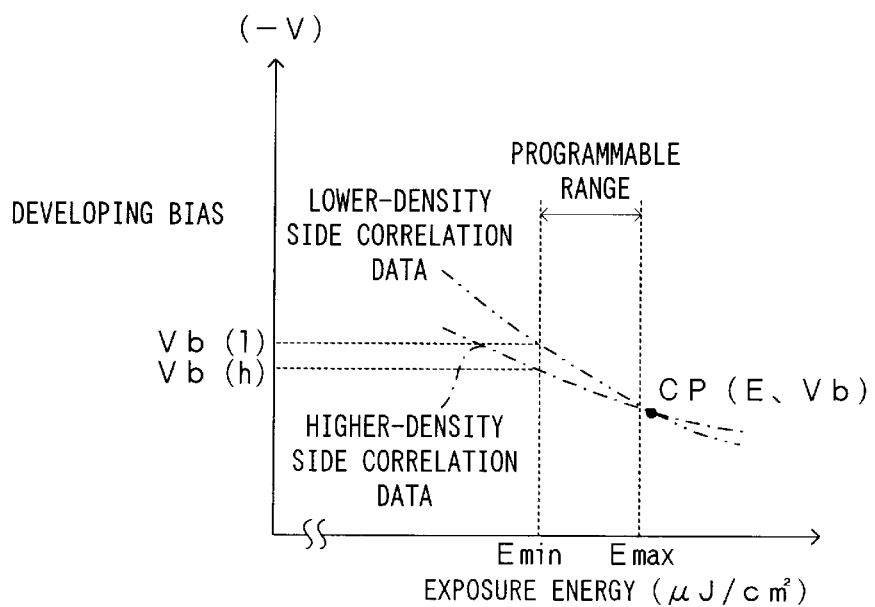

FIG. 31 is a flow chart showing optimization of density adjustment factors in the image forming apparatus according to the seventh preferred embodiment of the present invention. FIGS. 32A and 32B are schematic diagrams showing a relationship between product sets and the programmable ranges. For easy understanding of the present invention, it is assumed that only the exposure energy can be changed and set within the predetermined programmable range (Emin to Emax) and the developing bias can be changed in a wider range than the quantity of a deviation of an optimal developing bias.

In the image forming apparatus according to the seventh preferred embodiment, a product set is calculated in a manner similar to those in the first, the third and the sixth preferred embodiments. That its, after setting the charging bias to an initial value which is stored in the memory 127 in advance (Step S51), the higher-density side correlation data and the lower-density side correlation data are calculated and a product ;set of these is calculated (Step S52), and the exposure energy E and the developing bias Vb belonging to the product set are identified.

Whether the exposure energy E calculated at the step S52 is within the energy range (Emin to Emax) which can be changed by the exposure power control part 123 is judged at the step S53. When the exposure energy E is within the range, in a manner similar to those in the first, the third and the sixth preferred embodiments, the exposure energy E and the developing bias Vb above are set as an optimal exposure energy and an optimal developing bias (Step S54).

On the other hand, when it is judged that the exposure energy E calculated at the step S52 is deviated from the energy range (Emin to Emax) which can be changed by the exposure power control part 123, the sequence proceeds to the step S55 and the direction of the deviation is determined. That is, whether the exposure energy E is deviated toward the lower-energy side below the lower limit value Emin of the programmable range as shown in FIG. 32A or toward the higher-energy side beyond the upper limit value Emax of the programmable range as shown in FIG. 32B is judged.

More specifically, the CPU 124 of the control unit 1 calculates the developing biases Vb(h) and Vb(l) corresponding to the lower limit value Emin respectively for the higher-density side correlation data and the lower-density side correlation data. The judgments are made as follows:

When Vb(h)>Vb(l), the deviation is toward the lower-energy side (FIG. 32A); and

When Vb(h)<Vb(l), the deviation is toward the higher-energy side (FIG. 32B).

A specific judgment method is not limited to the method used in this embodiment. Instead, the developing biases corresponding to the upper limit value Emax may be calculated respectively for the higher-density side correlation data and the lower-density side correlation data, and the direction of the deviation may be determined based on which one is larger than the other.

When it is judged at the step S55 that the deviation is toward the lower-energy side, the sequence proceeds to the step S56 and the charging bias is set once again high, the sequence thereafter returns to the step S52 to thereby execute optimization the exposure energy and the developing bias once again. Conversely, when it is judged at the step S55 that the deviation is toward the higher-energy side, the sequence proceeds to the step S57 and the charging bias is set once again low, the sequence thereafter returns to the step S52 to thereby execute optimization of the exposure energy and the developing bias once again.

As described above, according to the seventh preferred embodiment, even when the energy range (Emin to Emax) which can be changed by the exposure power control part 123 is relatively narrow, with the charging bias changed and set once again if necessary, the optimal exposure energy is ensured to remain within the programmable range above, and therefore, the exposure energy and the developing bias are optimized without fail. Further, even if the exposure energy calculated at the step S52 escapes from the programmable range, as the direction of the deviation is determined and the charging bias is decreased or increased in accordance with the direction of the deviation, it is possible to ensure that the optimal exposure energy stays within the programmable range above through a fewer processing steps and to optimize the exposure energy and the developing bias efficiently in a short period of time.

Although the foregoing has described the seventh preferred embodiment assuming that there is no danger the developing bias will go beyond the programmable range, even if the developing bias calculated at the step S52 exceeds the programmable range of developing bias, the charging bias may be changed and set once again in accordance with the direction of the deviation.

H. Eighth Preferred Embodiment

While the second through the fifth preferred embodiments described above require to calculate lower-density side correlation data and higher-density side correlation data regarding a charging bias, an exposure energy and a developing bias based on the photo-induced discharge characteristic of the photosensitive member 2 and the development γ characteristic of the developers, the lower-density side correlation data and the higher-density side correlation data may be calculated by means of so-called patch sensing method as in an eighth preferred embodiment which will be described below. Since the mechanical and electrical structures of an image forming apparatus according to the eighth preferred embodiment are the same as those according to the first preferred embodiment, these structures will be denoted at the same reference symbols as those used for the first preferred embodiment and will not be described again.

FIG. 33 is a flow chart showing optimization of density adjustment factors in an image forming apparatus according to the eighth preferred embodiment of the present invention. FIG. 34 is a schematic diagram showing the sequence of obtaining an optimal charging bias, an optimal exposure energy and an optimal developing bias in the eighth preferred embodiment. In the eighth preferred embodiment, first, correlation data between the charging bias Va, the exposure energy E and the developing bias Vb for forming a toner image at a higher-density sides target density (OD= 1.2) by patch sensing method are calculated as higher-density side correlation data (Step S61). More specifically, the higher-density side correlation data are calculated while the control unit 1 controls the respective portions of the apparatus in accordance with the sequence shown in the flow chart in FIG. 35.

Figure 35:
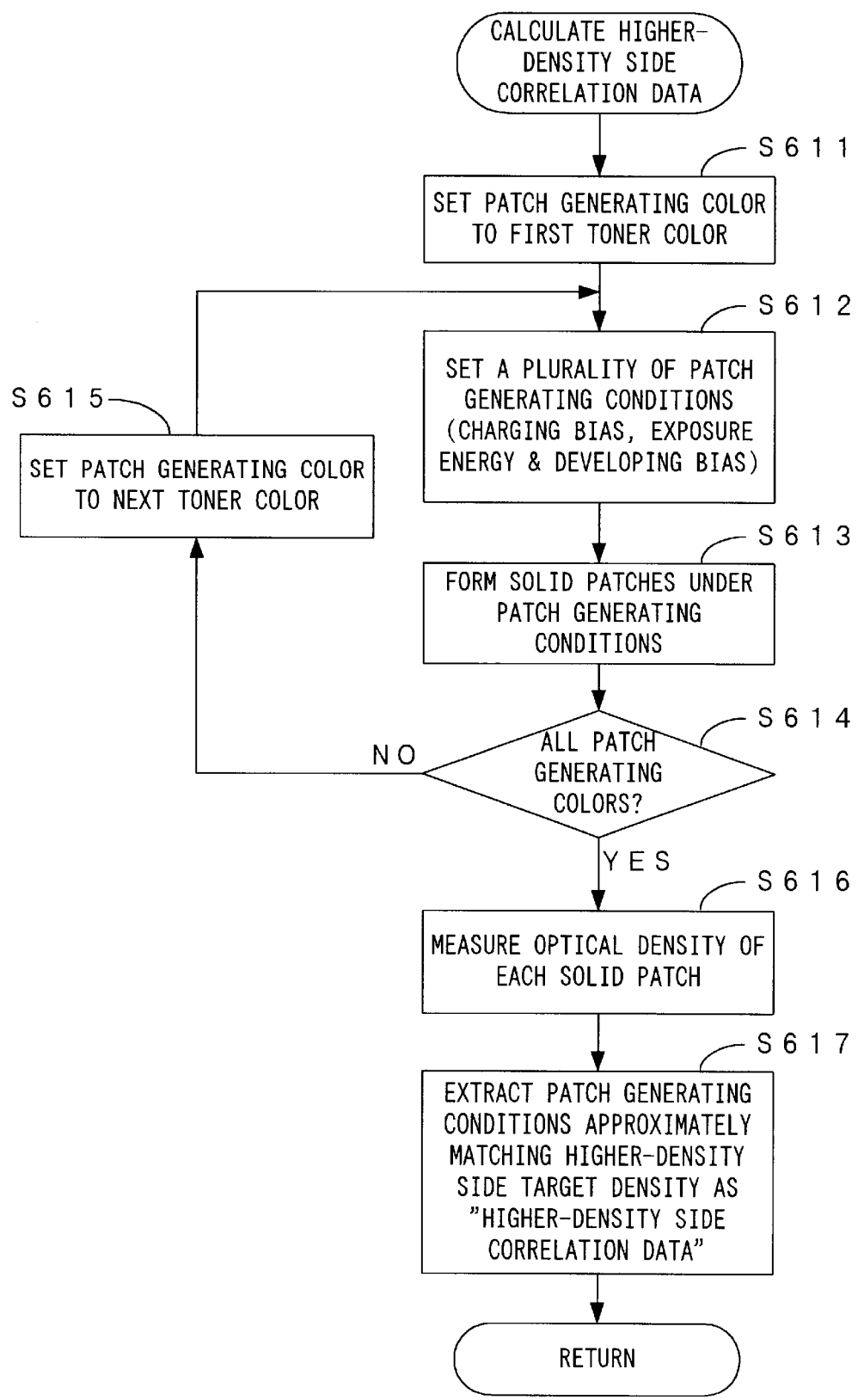
FIG. 35 is a flow chart showing the sequence of deriving the higher-density side correlation data in the eighth preferred embodiment.

FIG. 35 is a flow chart showing the sequence of deriving the higher-density side correlation data in the eighth preferred embodiment. First, the color in which patch images are to be formed is set to the first color, for example, black (Step S611). While the charging bias is set to an initial value which is stored in the memory 127 in advance, a plurality of patch generating conditions are set (Step S612). In this embodiment, the charging bias Va is changed to Va(1), Va(2), . . . , Va(k), the exposure energy E is changed to E1, E2, . . . , Em, and the developing bias Vb is changed to Vb(1), Vb(2), . . . , Vb(n).

Solid patch images (higher-density patch images) are formed one after another on the photosensitive member 2 under such patch generating conditions, during which each patch image is primarily transferred onto the outer circumferential surface of the intermediate transfer belt 71 (Step S613). Although solid patch images are formed in the eighth preferred embodiment, this may not be limited to solid patch images. High-density images which are close to solid patch images, e.g., an image whose area ratio is approximately 80% or more may be formed.

At the next step S614, whether patch images are formed in all toner colors or not is judged. While the judgment remains "NO," the patch generating color is set to the next color (Step S615) and the steps S612 and S613 are repeated, whereby solid patch images in the other toner colors, namely, cyan (C), magenta (M) and yellow (Y) are further formed on the outer circumferential surface of the intermediate transfer belt 71.

Conversely, if it is judged "YES" at the step S614, the patch sensor PS measures the optical densities of the respective solid patch images (Step S616). Although the eighth preferred embodiment requires to measure the optical densities of the solid patch images, at once after creating the solid patch images in all patch generating colors, the optical densities of solid patch images may be measured after forming the respective solid patch images in each patch generating color, or further alternatively, solid patch images may be divided into a few blocks and each block as a whole may be measured. This similarly applies to processing of deriving lower-density side correlation data which will be described later.

Following this, at the step S617, patch generating conditions matching with the higher-density side target density (OD=1.2) are extracted as "higher-density side correlation data." For example, as shown in FIG. 34, when solid patch images generated under patch generating conditions (Va(1), E2, Vb(1)), (Va(2), E1, Vb(2)), . . . among the solid patch images generated under the respective patch generating conditions (Va, E, Vb) match with the higher-density side target density, these conditions (Va(1), E2, Vb(1)), (Va(2), E1, Vb(2)), . . . are determined the higher-density side correlation data.

After calculating the higher-density side correlation data in this manner (Step S61), correlation data among the charging bias Va, the exposure energy E and the developing bias Vb for forming a toner image at a lower-density side target density (OD=0.2) by patch sensing method are calculated as lower-density side correlation data (Step) S62). More specifically, the lower-density side correlation data are calculated while the control unit 1 controls the respective portions of the apparatus in accordance with the sequence shown in the flow chart in FIG. 36.

Figure 36:
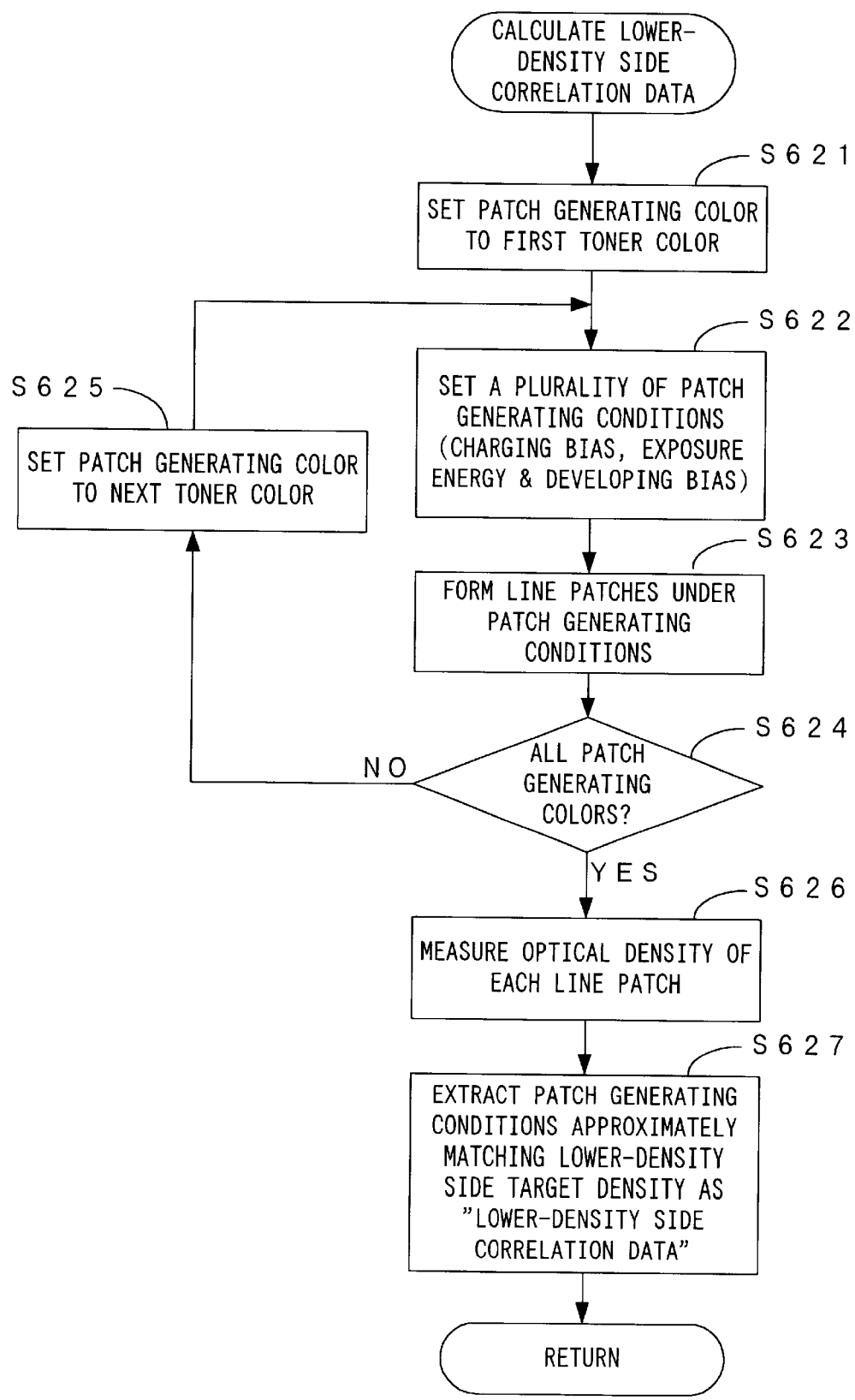
FIG. 36 is a flow chart showing the sequence of deriving the lower-density side correlation data in the eighth preferred embodiment.

FIG. 36 is a flow chart showing the sequence of deriving the lower-density side correlation data in the eighth preferred embodiment. First, the color in which patch images are to be formed is set to then first color, for example, black (K) (Step S621). While the charging bias is set to an initial value, a plurality of patch generating conditions are set (Step S622). Similarly to derivation of the higher-density side correlation data, the charging bias Va is changed to Va(1), Va(2), . . . , Va(k), the exposure energy E is changed to E1, E2, . . . , Em, and the developing bias Vb) is changed to Vb(1), Vb(2), . . . , Vb(n).

While serially forming 1-on-5-off line patch images LI as that shown in FIG. 7 on the photosensitive member 2 under these patch generating conditions as "lower-density patch images" of the present invention, each patch image is primarily transferred onto the outer circumferential surface of the intermediate transfer belt 71 (Step S623).

At the next step S624, whether patch images are formed in all toner colors or not is judged. While the judgment remains "NO," the patch generating color is set to the next color (Step S625) and the steps S622 and S623 are repeated, whereby line patch images in the other toner colors, namely, cyan (C), magenta (M) and yellow (Y) are further formed on the outer circumferential surface of the intermediate transfer belt 71.

Conversely, if it is judged "YES" at the step S624, the patch sensor PS measures the optical densities of the respective line patch images (Step S626).

Following this, at the step S627, patch generating conditions matching with the lower-density side target density (OD=0.2) are extracted as "lower-density side correlation data." For example, as shown in FIG. 34, when line patch images generated under patch generating conditions (Va(1), E2, Vb(2)), (Va(2), E1, Vb(1)), . . . among, the line patch images generated under the respective patch generating conditions (Va, E, Vb) match with the lower-density side target density, these conditions (Va(1), E2, Vb(2)), (Va(2), E1, Vb(1)), . . . are determined the lower-density side correlation data.

After calculating the higher-density side correlation data and the lower-density side correlation data in this manner, a product set of the two is calculated (Step S63). If the higher-density side correlation data and the lower-density side correlation data are respectively calculated as shown in FIG. 34, the product set of the higher-density side correlation data and the lower-density side correlation data is correlation data (Va(2), E2, Vb(2)). The charging bias Va(2), the exposure energy E2 and the developing bias Vb(2) are set respectively as an optimal charging bias, an optimal exposure energy and an optimal developing bias and stored in the memory 127. Although the foregoing has described an example that correlation data belonging to the product set are only the correlation data (Va(2), E2, Vb(2)), if there are a plurality pieces of correlation data, one piece of correlation data belonging to the product set may be selected and the charging bias, the charging bias, the exposure energy and the developing bias constituting the correlation data may be set respectively as an optimal charging bias, an optimal exposure energy and an optimal developing bias.

As described above, according to the eighth preferred embodiment, it is possible to adjust the image densities of toner images to the lower-density side target density (OD= 0.2) and the higher-density side target density (OD=1.2) with respect to the respective toner colors and stably form images in a wide density range as in the second preferred embodiment. Further, in the eighth preferred embodiment, as the charging bias is used as the density adjustment factor for adjustment of the densities of toner images, the photo-induced discharge characteristic of the photosensitive member 2 changes in accordance with the value to which the charging bias is set, as described above. However, since the exposure energy and the developing bias are used as further density adjustment factors, it is possible to obtain an optimal solution needed to form a toner image at the lower-density side target density, namely, the lower-density side correlation data in a wide range and to obtain an optimal solution needed to form a toner image at the higher-density side target density, namely, the higher-density side correlation data in a wide range. Thus, the exposure energy and the developing bias are optimized in accordance with the charging bias while considering a change in photo-induced discharge characteristic of the photosensitive member 2 in accordance with the charging bias, and therefore, it is possible to form toner images at the respective target densities. In addition, for control of the image densities of toner images to two target densities, one being a high density and the other being a low density, a product set of the lower-density side correlation data and the higher-density side correlation data may be simply calculated so that the charging bias, the exposure energy and the developing bias are optimized as described above. Thus, according to the eighth preferred embodiment, it is possible to stabilize the image density of a toner image in a wide density range in an easy and reliable manner. The eighth preferred embodiment, as compared with the second to the fifth preferred embodiments, further attains the following effects.

First, while it is necessary to calculate the photo-induced discharge characteristic of the photosensitive member 2 and the development $\gamma$ characteristic of the developers in these preceding embodiments, it is not necessary to calculate these characteristics in advance and therefore optimization of toner images is easier in the eighth preferred embodiment. Another advantage is that it is not necessary for the memory to store data which correspond to the condition in which the apparatus is used. Further, since the photo-induced discharge characteristic, the development $\gamma$ characteristic and the like change in accordance with the operating state of the apparatus, a temperature/humidity environment, etc., as described earlier, optimization on a regular basis is desirable. Since so-called patch sensing method realizes optimization of the charging bias, the exposure energy and the developing bias in the eighth preferred embodiment, it is possible to flexibly deal with the operating state of the apparatus, a temperature/humidity environment, etc. The timing for the optimization of the charging bias, the exposure energy and the developing bias described above may be upon turning on of a power source of the apparatus, upon arrival of a cumulative count value representing the total number of prints, etc.

Although only such data matching with the target densities on the higher-density side and the lower-density side are used as correlation data in the eighth preferred embodiment, data which are approximately the same as the target densities, such as data which are only a few % different from the target densities, may also be acceptable. A further alternative is to derive a function of the higher-density side correlation data out of the plurality pieces of correlation data (Va(1), E2, Vb(1)), (Va(2), E1, Vb(2)), . . . which are obtained at the step S61, derive a function of the lower-density side correlation data out of the plurality pieces of correlation data (Va(1), E2, Vb(2)), (Va(2), E1, Vb(1)), . . . which are obtained at the step S62, calculate a product set based on these two functions and set an optimal charging bias, an optimal exposure energy and an optimal developing bias from the result of the calculation.

I. Ninth Preferred Embodiment

By the way, although the charging bias is varied within the programmable range and optimal solutions CP of exposure energies and developing biases at the respective charging biases are calculated in the second to the fifth preferred embodiments and the eighth preferred embodiment described above, there is a limitation on a programmable range in which the exposure power control part 123 can modify and set the exposure energy and a programmable range in which the developing bias generation part 126 can modify and set the developing bias. Because of this, the optimal exposure energy calculated as described above may be sometimes deviated from the programmable range of exposure energy, or the optimal developing bias calculated as described above may be sometimes deviated from the programmable range of developing bias. Noting this, according to a ninth preferred embodiment, a method of setting charging bias is improved as described below to thereby reduce processing steps and a processing time needed for optimization of a charging bias, an exposure energy and a developing bias.

As already described with reference to FIGS. 14 and 15, as the charging bias is increased, for instance, the photo-induced discharge characteristic of the photosensitive member 2 shifts toward the larger-side. However, the amount of the shift changes in accordance with the exposure energy, i.e., remains relatively large on the lower-energy side (the left-hand side in FIGS. 14 and 15), decreases as the exposure energy increases and becomes almost zero on the higher-energy side (the right-hand side in FIGS. 14 and 15). Further, the change in photo-induced discharge characteristic due to the increased charging bias changes the higher-density side correlation data and the lower-density side correlation data, and a product set of the higher-density side correlation data and the lower-density side correlation data shifts from a product set as it is before the charging bias to a product set as it is upon increase in charging bias as shown in FIG. 17, for example. Of course, when the charging bias is decreased, the lower-density side correlation data, the higher-density side correlation data and the product set all shift in the opposite direction to that corresponding to an increase in charging bias. Changing and setting the charging bias in this manner makes it possible to change an optimal solution CP (an optimal exposure energy and an optimal developing bias).

Noting this, in an image forming apparatus according to the ninth preferred embodiment, the charging bias Va is fixed, and when an optimal exposure energy or an optimal developing bias at the charging bias Va is deviated from a programmable range, after confirming the condition of the deviation and decreasing or increasing the charging bias in accordance with the condition of the deviation, an optimal solution (an optimal exposure energy and an optimal developing bias) at this charging bias is calculated. This makes it possible to ensure in a short period of time without fail that an optimal exposure energy and an optimal developing bias remain within programmable ranges. Now, the ninth preferred embodiment will be described in detail with reference to FIGS. 32A, 32B and 37.

Figure 37:
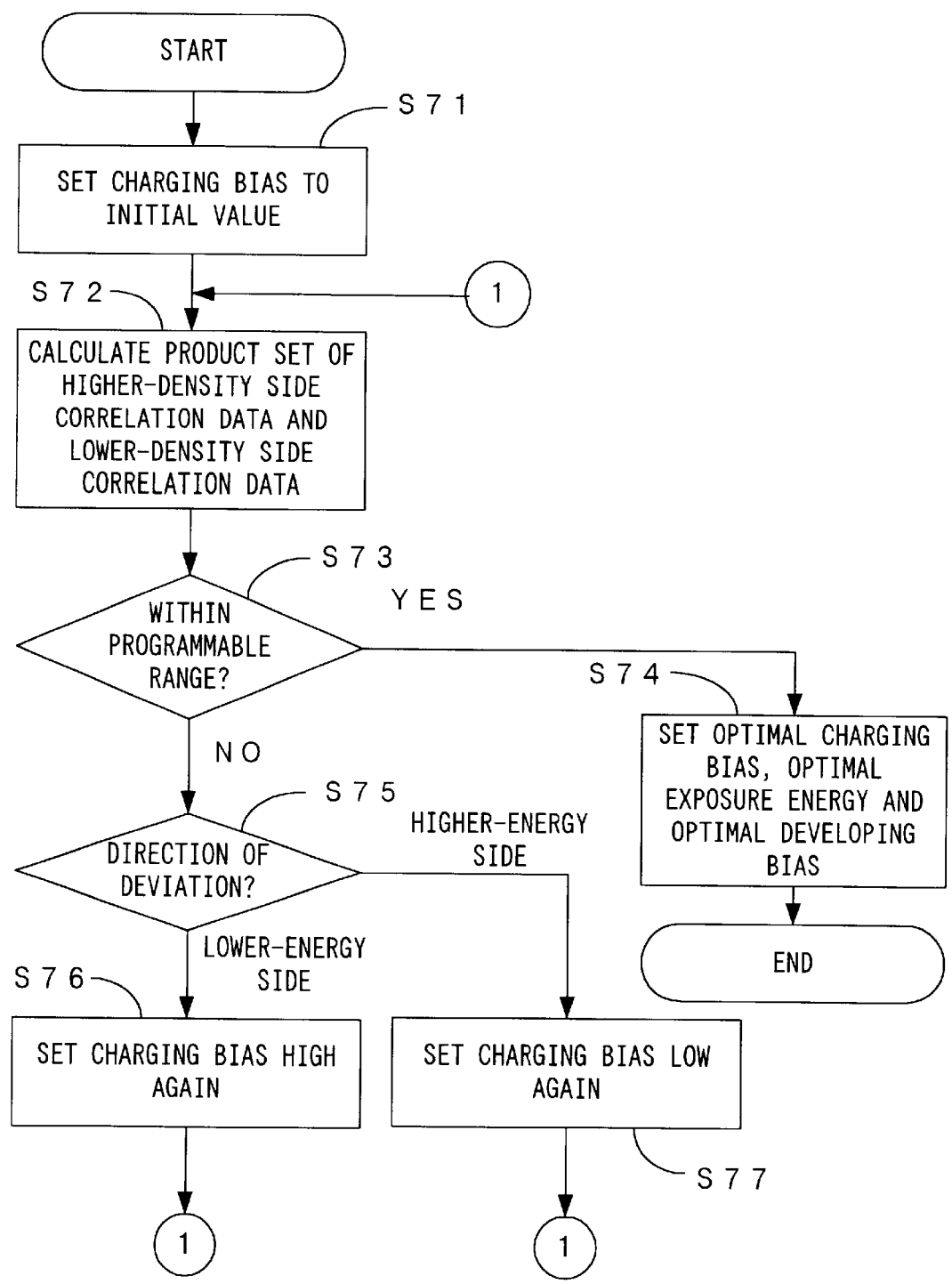
FIG. 37 is a flow chart showing optimization of density adjustment factors in the image forming apparatus according to the ninth preferred embodiment of the present invention.

FIG. 37 is a flow chart showing optimization of density adjustment factors in the image forming apparatus according to the ninth preferred embodiment of the present invention. For easy understanding of the present invention, it is assumed that only the exposure energy can be changed and set within a predetermined programmable range (El to Eh) and the developing bias can be changed in a wider range than the quantity of a deviation of an optimal developing bias.

In the image forming apparatus according to the ninth preferred embodiment, a product set is calculated as in the second to the fifth preferred embodiments and the eighth preferred embodiment described above. That is, after setting the charging bias Va to an initial value which is set and stored in the memory 127 in advance (Step S71), the higher-density side correlation data and the lower-density side correlation data at this charging bias Va are calculated and a product set of these correlation data is calculated (Step S72), and the exposure energy E and the developing bias Vb belonging to the product set are identified.

Whether the exposure energy E calculated at the step S72 stays within the energy range (El to Eh) which can be changed by the exposure power control part 123 is judged. If the exposure energy E is found to be within the range, as in the second to the fifth preferred embodiments and the eighth preferred embodiment described above, the charging bias Va, the exposure energy E and the developing bias Vb above are set as an optimal charging bias, an optimal exposure energy and an optimal developing bias (Step S74).

Conversely, if the exposure energy E calculated at the step S72 is deviated from the energy range (E1 to Eh) which can be changed by the exposure power control part 123, the sequence proceeds to the step S75 and the direction of the deviation is determined. That is, whether the exposure energy E is deviated toward the lower-energy side below the lower limit value El of the programmable range as shown in FIG. 32A or toward the higher-energy side beyond the upper limit value Eh of the programmable range as shown in FIG. 32B is judged.

More specifically, the CPU 124 of the control unit 1 calculates the developing biases Vb(h) and Vb(l) corresponding to the lower limit value E1 respectively for the higher-density side correlation data and the lower-density side correlation data. The judgments are made as follows:

When Vb(h)>Vb(l), the deviation is toward the lower-energy side (FIG. 32A); and

When Vb(h)<Vb(l), the deviation is toward the higher-energy side (FIG. 32B).

A specific judgment method is not limited to the method used in this embodiment. Instead, the developing biases corresponding to the upper limit value Eh may be calculated respectively for the higher-density side correlation data and the lower-density side correlation data, and the direction of the deviation may be determined based on which one is larger than the other.

When it is judged at the step S75 that the deviation is toward the lower-energy side, the sequence proceeds to the step S76 and the charging bias is set once again high, and the sequence thereafter returns to the step S72 to thereby execute optimization of the exposure energy and the developing bias once again. Conversely, when it is judged at the step S75 that the deviation is toward the higher-energy side, the sequence proceeds to the step S77 and the charging bias is set once again low, and the sequence thereafter returns to the step S72 to thereby execute optimization of the exposure energy and the developing bias once again.

As described above, according to the ninth preferred embodiment, even when the energy range (El to Eh) which can be changed by the exposure power control part 123 is relatively narrow, with the charging bias changed and set once again in accordance with a necessity, the optimal exposure energy is ensured to remain within the programmable range above, and therefore, the charging bias, the exposure energy and the developing bias are optimized without fail. Further, even if the exposure energy calculated at the step S72 escapes from the programmable range, as the direction of the deviation is determined and the charging bias is decreased or increased in accordance with the direction of the deviation, it is possible to ensure that the optimal exposure energy stays within the programmable range above through a fewer processing steps and to optimize the charging bias, the exposure energy and the developing bias efficiently in a short period of time.

Although the foregoing has described the ninth preferred embodiment assuming that there is no danger the developing bias will go beyond the programmable range, even if the developing bias calculated at the step S72 exceeds the programmable range of developing bias, the charging bias may be changed and set once again in accordance with the direction of the deviation.

J. Tenth Preferred Embodiment

As already described earlier, a change in film thickness of a photosensitive member changes an optimal value of a density adjustment factor. Noting this, the inventor of the present invention studied in detail how a density adjustment factor varies as the film thickness of a photosensitive member changes and specific control methods of suppressing a variation in image density of a toner image regardless of a change in film thickness. What was studied is, as described earlier, where a photosensitive member is formed by a conductive base material, an under coat layer, a carrier generation layer and a carrier transport layer, a surface of the photosensitive member is charged with charging members applied with a DC bias contacting the surface of the photosensitive member, and developers applied with a developing bias containing a DC component performs development with toner.

Figure 38:
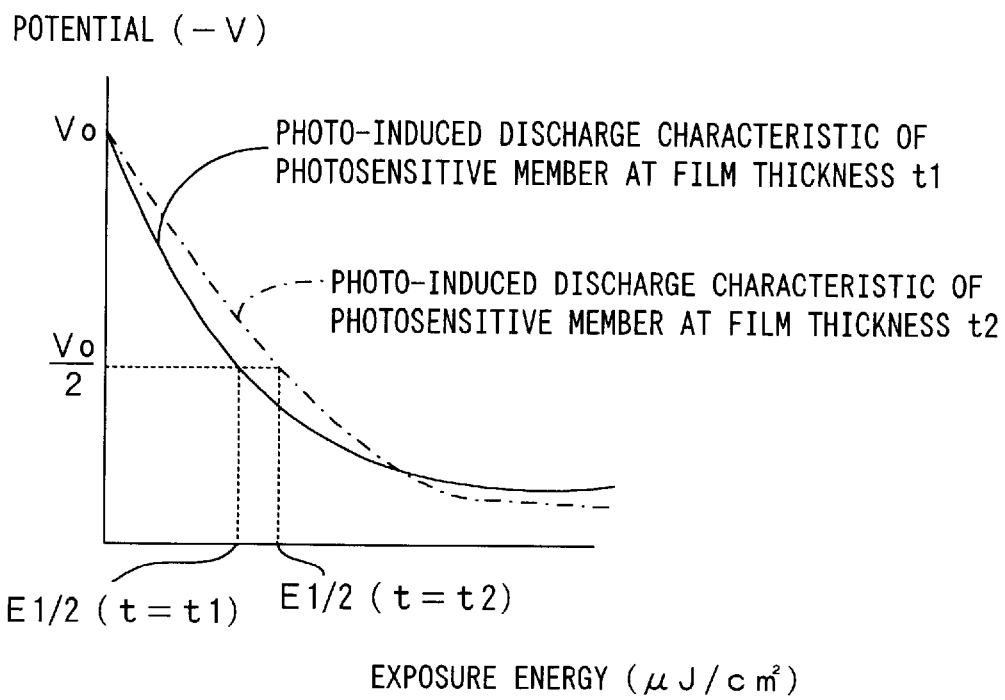
FIG. 38 is a graph showing a change in photo-induced discharge characteristic of a photosensitive member in accordance with a decrease in film thickness of the photosensitive member.

FIG. 38 is a graph showing a change in photo-induced discharge characteristic of a photosensitive member in accordance with a decrease in film thickness of the photosensitive member. In FIG. 38, the horizontal axis denotes the exposure energy E of the light beam while the vertical axis denotes an electric potential. While the solid line in FIG. 38 expresses a photo-induced discharge characteristic of the photosensitive member as it is when the film thickness is t1, the dotted-and-dashed line in FIG. 38 expresses a photo-induced discharge characteristic of the photosensitive member as it is when the film thickness is t2 (<t1). As FIG. 38 clearly shows, the photo-induced discharge characteristic of the photosensitive member changes as the film thickness decreases. Assuming that the exposure energy is E and the electric potential of the photosensitive member irradiated with the light beam is Vcon, in a region where the exposure energy is relatively low, |Von| is lower at the film thickness of t1 than at the film thickness of t2. Conversely, in a region where the exposure energy is relatively high, the opposite relationship is observed (In other words, |Von| is larger at the film thickness of t1 than at the film thickness of t2.). In general, the exposure energy is set to be two to five times, more preferably three to four times as large as a half decay exposure energy E1/2 (which is an exposure energy necessary to lower the electric potential of the photosensitive member from a initial potential to half the initial potential) of the photosensitive member.

Figure 39:
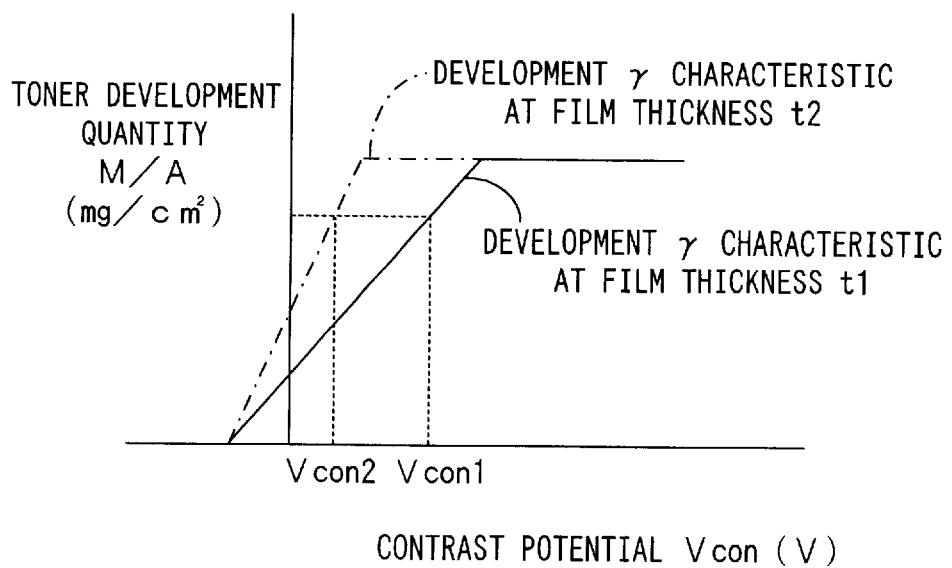
FIG. 39 is a graph showing a change in developmental γ characteristic in accordance with a decrease in film thickness of the photosensitive member.

FIG. 39 is a graph showing a change in development γ characteristic in accordance with a decrease in film thickness of the photosensitive member. In FIG. 39, the horizontal axis denotes the contrast potential Vcon while the vertical axis denotes a toner development quantity M/A on the photosensitive member. Assuming that a developing bias is Vb, the contrast potential Vcon satisfies Vcon=|Vb|−|Von|. The solid line in FIG. 39 expresses a development γ characteristic as it is when the film thickness is t1, whereas the dotted-and-dashed line in FIG. 39 expresses a development γ characteristic as it is when the film thickness is t2 (<t1). Regardless of the film thickness t of the photosensitive member, the toner development quantity M/A starts rising at a certain Von level, increases in proportion to an increase, in Vcon, and stays constant as Von becomes a certain level or higher. This proportionality factor (the gradient of the linear curve) is dependent upon the film thickness t of the photosensitive member and becomes larger as the film thickness decreases. On the other hand, the M/A quantity saturated with a Vcon value at the start of rising is not dependent upon the film thickness t.

Figure 40:
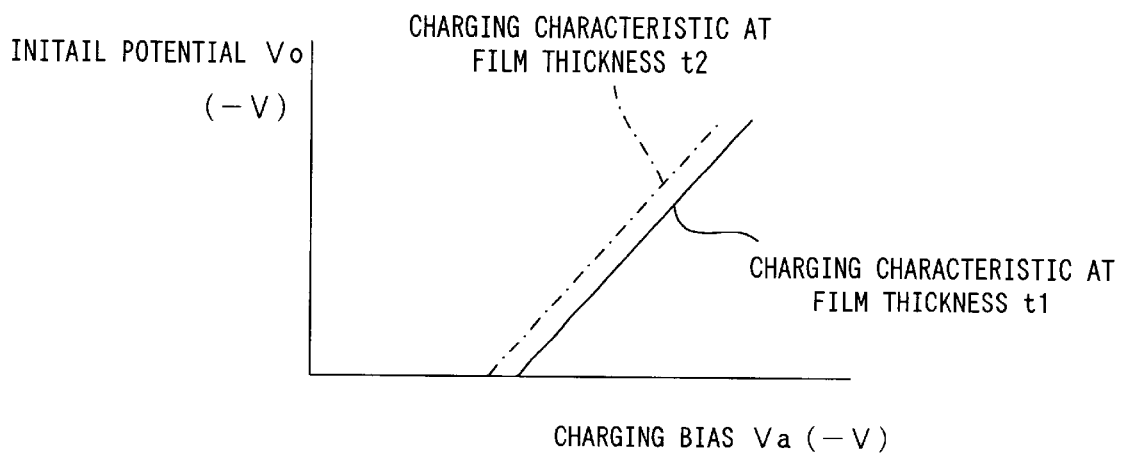
FIG. 40 is a graph showing a change in charging characteristic in accordance with a decrease in film thickness of the photosensitive member.

FIG. 40 is a graph showing a change in charging characteristic in accordance with a decrease in film thickness of the photosensitive member. In FIG. 40, the horizontal axis denotes an applied DC bias value (charging bias Va) upon a charging member, while the vertical axis denotes a charging potential (initial potential Vo) of the photosensitive member. The solid line in FIG. 40 expresses a charging characteristic as it is when the film thickness is t1, whereas the dotted-and-dashed line in FIG. 40 expresses a charging characteristic as it is when the film thickness is t2 (<t1). The absolute value of the initial potential Vo starts rising at a certain Va level, and is expressed as a linear curve whose gradient is 1 after that. Va upon the rise of this linear curve is dependent upon the film thickness, and the absolute value of Va is smaller if the film thickness is lighter. On the other hand, the gradient of the linear curve is not dependent upon the film thickness t. In other words, where Va is fixed, the absolute value of the initial potential monotonously increases as the film thickness becomes lighter. Va upon the rise is called "charging start voltage" which is approximately 570 V when the film thickness of the photosensitive member is 24 μm and a specific dielectric constant of a photosensitive layer is 3.3 at 23° C. and 50% RH.

As described above, as the film thickness of the photosensitive member changes, the initial potential Vo of the photosensitive member, the exposed area potential Von and the development γ characteristic change. Hence, image densities change unless a density adjustment factor is appropriately adjusted.

Noting this, a specific method of suppressing a variation in image density will be discussed and described below. The following will assume that a target image density is 1.2 on a paper and the toner development quantity M/A on the photosensitive member for achieving this density is M/A (1.2). From FIG. 39, it is found that a contrast potential which is needed to attain M(1.2) is Vcon1 at the film thickness of t1 but Vcon2 at the film thickness of t2.

(1) Where the Exposure Energy is Used as a Density Adjustment Factor

The following will discuss where the exposure energy is used as a density adjustment factor while a developing bias and a charging bias are fixed.

Figure 41:
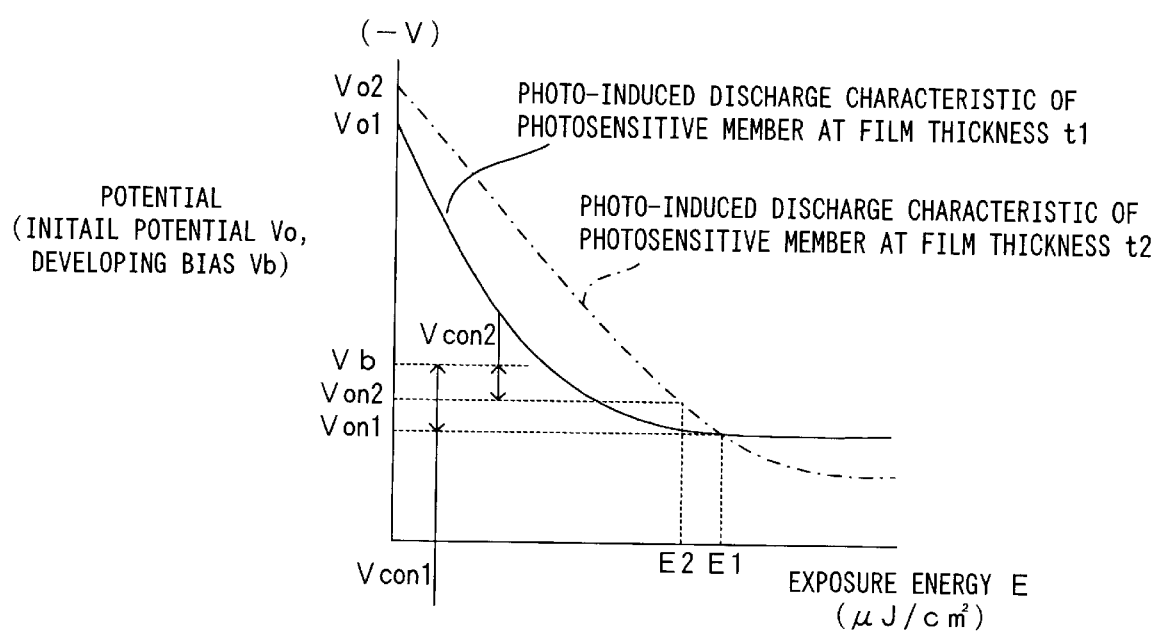
FIGS. 41 to 43 are graphs showing a change in charging characteristic in accordance with a change in film thickness of the photosensitive member and in initial potential.

With the charging bias fixed, the initial potential Vo of the photosensitive member changes in accordance with the film thickness t. It is assumed that Vo at different time when the charging bias is Va has values Vo1 and Vo2. A photo-induced discharge characteristic of the photosensitive member at the initial potential Vo2 and the film thickness t2 needs be rewritten by moving the y-segment of photo-induced discharge characteristic at the film thickness t2 in FIG. 38 to Vo2. FIG. 41 shows this. From a photo-induced discharge characteristic at the film thickness t1, it is seen that the value E which is three times as large as E1/2 expressed by this characteristic is an exposure energy E1 at the film thickness t1 (See FIG. 41.). In response, Von at the film thickness t1 is determined Von1. On the other hand, from the development γ characteristic in FIG. 39, Vcon providing M(1.2) is determined Vcon1. The Von1 and Vcon1 determine the developing bias Vb (FIG. 41).

Next, a change in film thickness to the film thickness t2 will be described. Upon the change, Vcon providing M(1.2) is determined Von2, as seen in FIG. 39. Further, from FIG. 41, it is seen that this Vcon2 and Vb determined earlier (Vb is fixed.) determine an exposure energy E2 which provides necessary Von2. This E2 has a tendency of E2<E1.

With the exposure energy E decreased in accordance with a decrease in film thickness t of the photosensitive member in this manner, it is possible to stabilize an image density.

(2) Where the Developing Bias is Used as a Density Adjustment Factor

The following will discuss where the developing bias is used as a density adjustment factor while an exposure energy and a charging bias are fixed.

Figure 42:
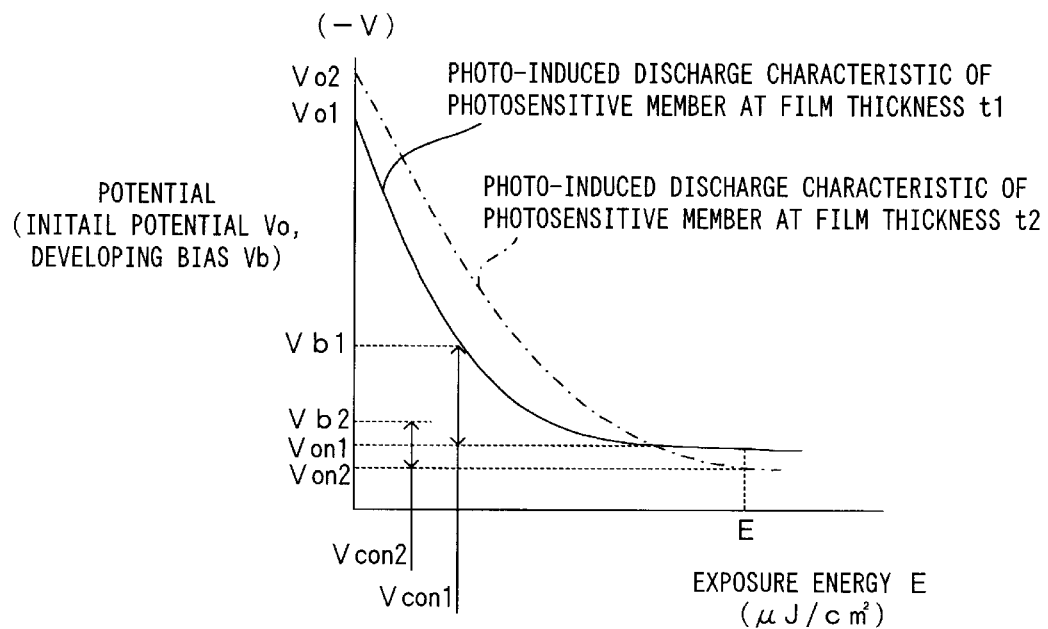

FIG. 42 shows a photo-induced discharge characteristic of a photosensitive member. The photo-induced discharge characteristic shown in FIG. 42 is the same as that shown in FIG. 41. It is assumed that an energy which is three times as large as E1/2 of the photosensitive member at the film thickness t2 is an exposure energy E. As this E is determined, Von at the film thickness t1 is found to be Von1 and Von at the film thickness t2 is found to be Von2. Meanwhile, from FIG. 39, the contrast potential Vcon is found to be Vcon1 and Vcon 2. From these values, developing biases at the respective film thickness values are determined Vb1 and Vb2 as shown in FIG. 42 (Vb1 is determined from the relationship Vcon1=|Vb1|−|Von1|.). This Vb2 has a tendency of |Vb2|<|Vb1|.

With the absolute value of the developing bias Vb decreased in accordance with a decrease in film thickness t of the photosensitive member in this manner, it is possible to stabilize an image density.

(3) Where the Charging Bias is Used as a Density Adjustment Factor

The following will discuss where a charging bias is used as a density adjustment factor while an exposure energy and a developing bias are fixed.

Figure 43:
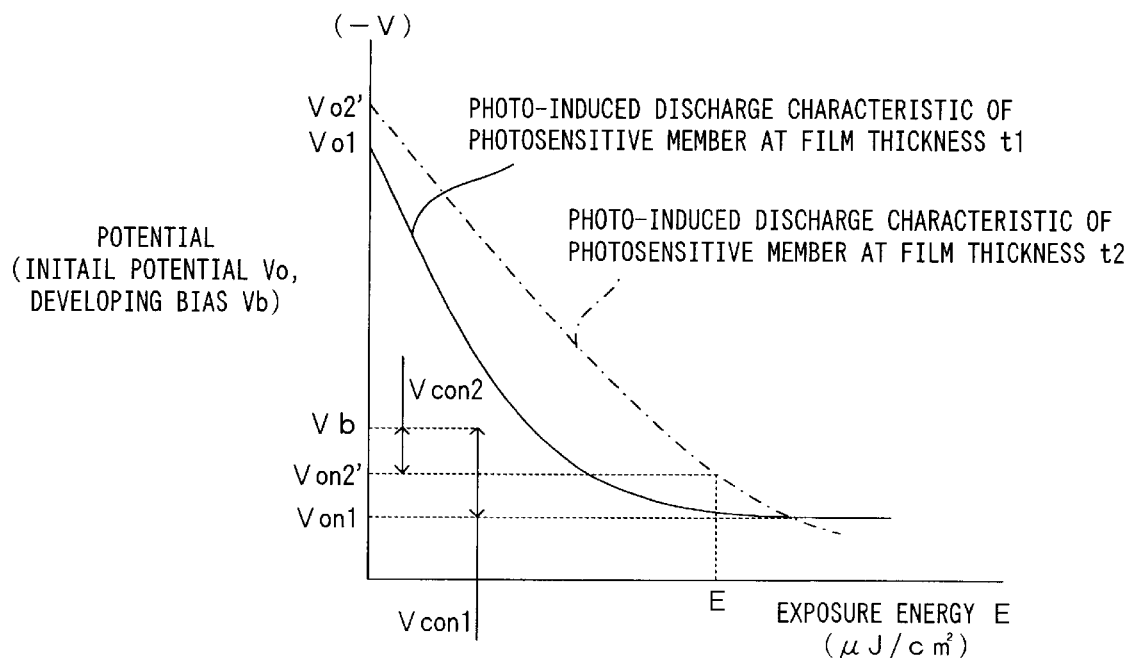

FIG. 43 shows a photo-induced discharge characteristic of a photosensitive member. A value which is three times as large as E1/2 at the film thickness t1 is an exposure energy E. As this E is determined, Von1 at the film thickness t1 is determined. From FIG. 39, Vcon1 is found. From these, the developing bias Vb is determined. From Vcon2 at the film thickness t2 (FIG. 39) and Vb determined earlier, Vo2' which provides necessary Von2 is determined. Since Vo is dependent upon Va, determining Vo2' is determining a charging bias Va2 at the film thickness t2. Assuming that Va which provides Vo1 at the film thickness t1 is Va1, this Va2 has a tendency of $|Va2|>|Va1|$.

Thus, with the charging bias Va changed in accordance with a decrease in film thickness t of the photosensitive member in this manner, it is possible to stabilize an image density.

The foregoing has discussed the examples which use charging means with which the absolute value of a charging potential increases as the photosensitive member becomes lighter. Now, the following will describe examples which use charging means with which a charging potential does not change if the photosensitive member becomes lighter, or contact-type charging means which applies a charging bias which is obtained by superposing over a DC voltage an AC voltage which has a peak-to-peak voltage which is twice as large as a discharging start voltage or larger for instance, or so-called scorotron charging means. In this case as well, since the exposed area potential Von of the photosensitive member and the development γ characteristic change as the film thickness of the photosensitive member changes, image densities change unless a density adjustment factor is appropriately adjusted.

Noting this, a specific method of suppressing a variation in image density will be discussed.

(4) Where the Exposure Energy is Used as a Density Adjustment Factor

The following will discuss where the exposure energy is used as a density adjustment factor while a developing bias and a charging bias are fixed. A charging bias for scorotron can be considered as an applied bias upon a so-called grid.

Figure 44:
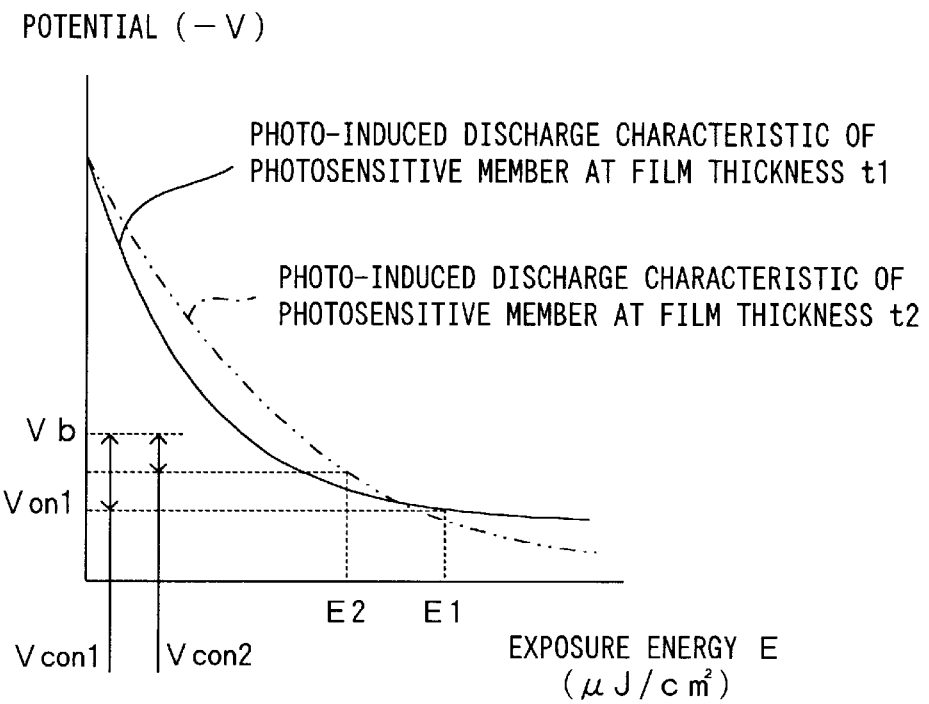
FIGS. 44 and 45 are graphs showing a change in charging characteristic in accordance with a change in film thickness of the photosensitive member.

As described earlier, since the exposed area potential Von of the photosensitive member is constant regardless the film thickness of the photosensitive member, as a photo-induced discharge characteristic of the photosensitive member, that shown in FIG. 38 may be used. From the photo-induced discharge characteristic at the film thickness t1, a value which is three times as large as E1/2 at the film thickness t1 is set as an exposure energy E at the film thickness t1 (See FIG. 44). In response, Von at the film thickness t1 is determined Von1. Meanwhile, from the development γ characteristic shown in FIG. 39, Vcon providing M(1.2) is determined Vcon1. From Von1 and Vcon1, the developing bias Vb is determined (FIG. 44).

Next, a change in film thickness to the film thickness t2 will be described. Upon the change, Vcon providing M(1.2) is determined Von2, as seen in FIG. 39. Further, from FIG. 44, it is seen that this Vcon2 and Vb set earlier (Vb is fixed.) determine an exposure energy E2 which provides necessary Von2. This E2 has a tendency of E2<E1.

Thus, with the exposure energy E decreased in accordance with a decrease in film thickness t of the photosensitive member in this manner, it is possible to stabilize an image density.

(5) Where the Developing Bias is Used as a Density Adjustment Factor

The following will discuss where the developing bias is used as a density adjustment factor while an exposure energy and a charging bias are fixed.

Figure 45:
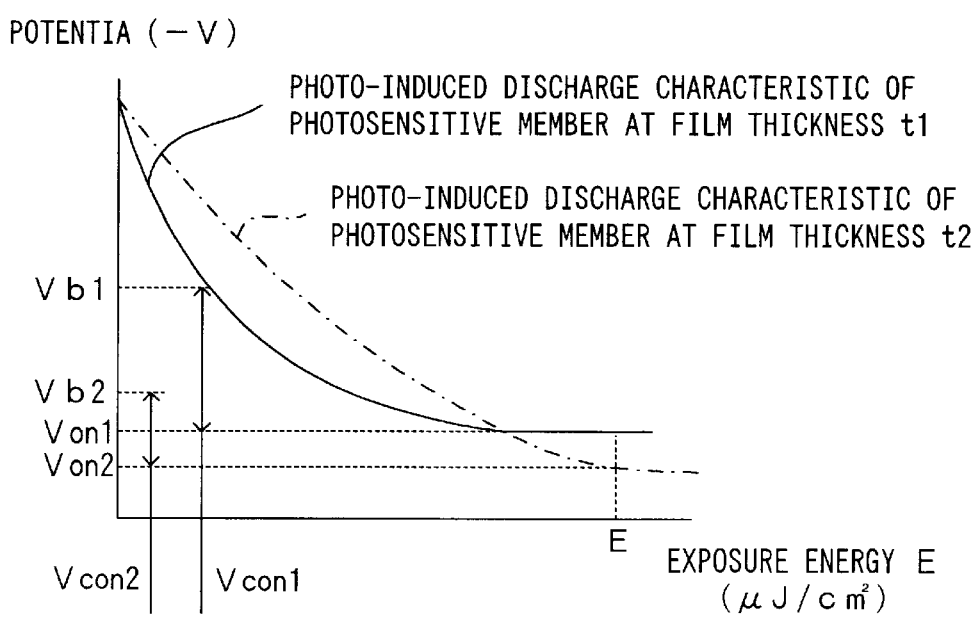

FIG. 45 shows a photo-induced discharge characteristic of a photosensitive member. The photo-induced discharge characteristic shown in FIG. 45 is the same as that shown in FIG. 38. It is assumed that an energy which is three times as large as E1/2 of the photosensitive member at the film thickness t2 is an exposure energy E. As this E is determined, Von at the film thickness to is found to be Von1 and Von at the film thickness t2 is found to be Von2. Meanwhile, from FIG. 39, the contrast potential Vcon is found to be Vcon1 and Vcon 2. From these values, developing biases at the respective film thickness values are determined Vb1 and Vb2 as shown in FIG. 45 (Vb1 is determined from the relationship Vcon1=|Vb1|·|Von1|.). This Vb2 has a tendency of $|Vb2|<|Vb1|$.

With the absolute value of the developing bias Vb decreased in accordance with a decrease in film thickness t of the photosensitive member in this manner, it is possible to stabilize an image density.

(6) Where the Charging Bias is Used as a Density Adjustment Factor

The following will discuss where the charging bias is used as a density adjustment factor while an exposure energy and a developing bias are fixed. As described above under (3), $|Vo1|<|Vo2|$ holds as the film thickness decreases. Since Vo is dependent upon Va, determining Vo2' is determining a charging bias Va2 at the film thickness t2. Assuming that Va which provides Vo1 at the film thickness t1 is Va1, this Va2 has a tendency of $|Va2|>|Va1|$.

Thus, with the charging bias Va changed in accordance with a decrease in film thickness t of the photosensitive member in this manner, it is possible to stabilize an image density.

Although (1) to (6) above are examples that an exposure energy, a developing bias and a charging bias are adjusted independently of each other as a density adjustment factor, adjustment combining these may be performed for stabilizing image densities.

Now, examples of combination will be described as specific embodiments (the tenth through the twelfth preferred embodiments). Mechanical and electrical structures according to these preferred embodiments are the same as those according to the first preferred embodiment, and therefore, will not be described again. Instead, control of image densities will be mainly described.

Figure 46:
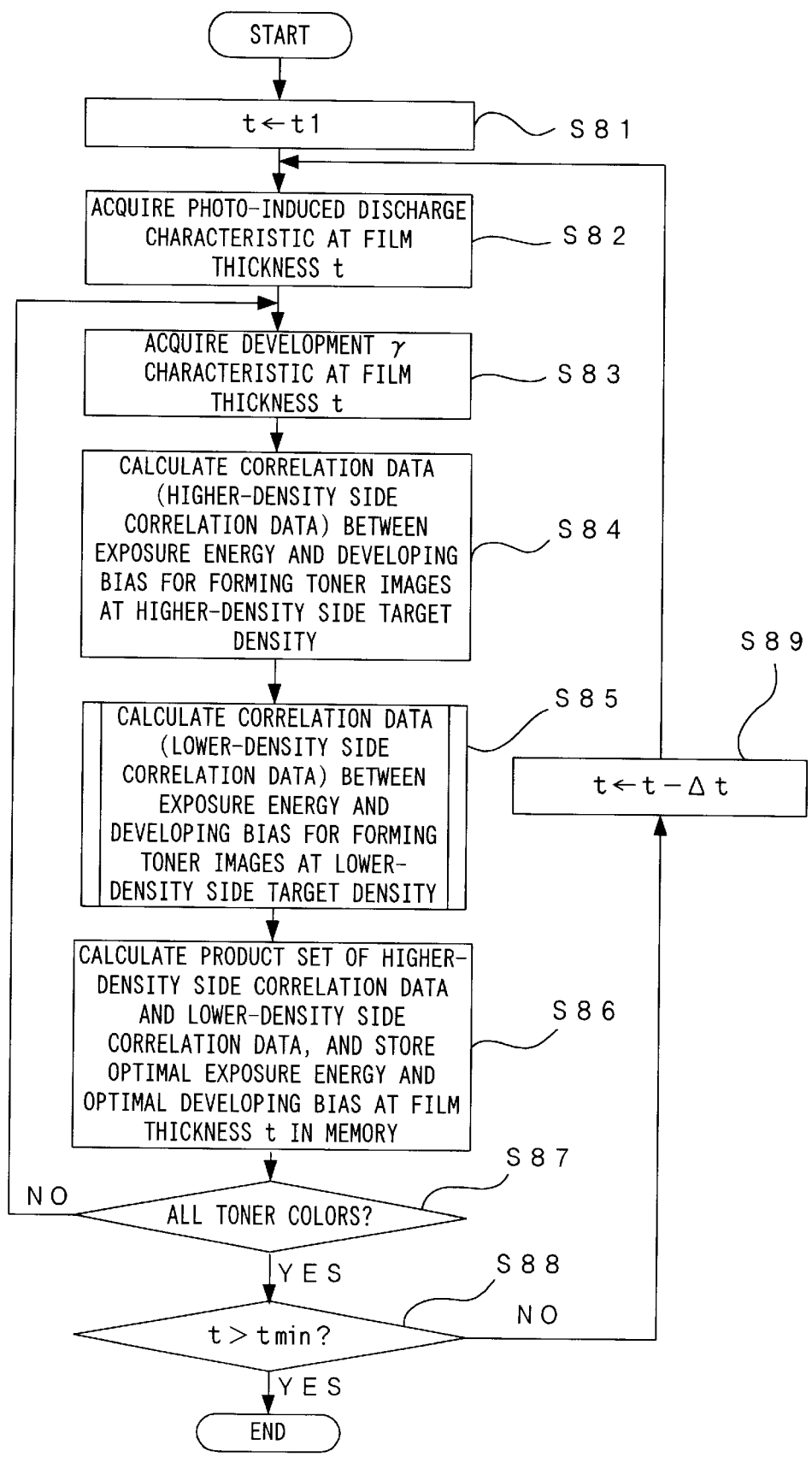
FIG. 46 is a flow chart showing optimization of density adjustment factors according to the tenth preferred embodiment.

This image forming apparatus is for controlling the image densities of toner images by controlling the exposure energy of the light beam and the developing bias as density adjustment factors, and requires that the control unit 1 calculates film-thickness-equivalent values (the exposure energy E and the developing bias Vb) corresponding to various values of the film thickness of the photosensitive member in accordance with the flow chart in FIG. 46 at appropriate timing, e.g., upon completion of assembly of the apparatus, prior to shipment from a plant or during maintenance of the apparatus, and that the film-thickness-equivalent values are stored in the memory 127. At proper timing, e.g., every time the power source of the apparatus is turned on for example, the film thickness of the photosensitive member 2 is calculated, a film-thickness-equivalent value corresponding to this film thickness is read from the memory 127, the film-thickness-equivalent value is set as an optimal exposure energy and an optimal developing bias, and the image densities of toner images are controlled. Thus, in this embodiment, the CPU 124 functions as "film thickness deriving means" and "optimization means" of the present invention.

FIG. 46 is a flow chart showing optimization of density adjustment factors according to the tenth preferred embodiment. The CPU 124 sets the film thickness t of the photosensitive member 2 to an initial film thickness value t1 of the photosensitive member 2 (Step S81). Via an operation part (not shown) such as a key board, an operator or someone appropriate provides the image forming apparatus with a photo-induced discharge characteristic of the photosensitive member 2 corresponding to the film thickness t. The control unit 1 accordingly acquires the photo-induced discharge characteristic which will be temporarily stored in the memory 127 (Step S82). Further, via the operation part, with respect to a particular toner color, the operator provides the image forming apparatus with a development γ characteristic which corresponds to the film thickness t. The control unit 1 accordingly acquires the development γ characteristic which will be temporarily stored in the memory 127 (Step S83).

Next, the CPU 124 of the control unit 1 reads the photo-induced discharge characteristic and the development γ characteristic from the memory 127, and calculates correlation data between the exposure energy E and the developing bias Vb for forming a toner image at a higher-density side target density as higher-density side correlation data (Step S84). In this embodiment, an "optical density (OD)= 1.2" is set as the higher-density side target density, and the developing bias Vb which is necessary to make a solid image formed at each exposure energy have an optical density (OD) of 1.2 is calculated. In short, as FIG. 47 shows, the photosensitive member 2 charged by the charging unit 3 has a initial potential of Vo, and when a latent image corresponding to a solid image is formed as the light beam L is irradiated with the exposure energy E upon the photosensitive member 2, a surface potential in the portion bearing the latent image is an exposed area potential Von.

On the other hand, to obtain a toner image at the higher-density side target density, it is necessary to have toner adhere in a predetermined quantity M(1.2) to the surface of the photosensitive member 2 (The correlation between target densities and adhering toner quantities is already known.). Hence, a contrast potential Vcon (=|(the developing bias)− (the exposed area potential of the photosensitive member 2)|) corresponding to the toner adhesion quantity M(1.2) can be calculated based on a development γ characteristic as that shown in FIG. 39.

Figure 47:
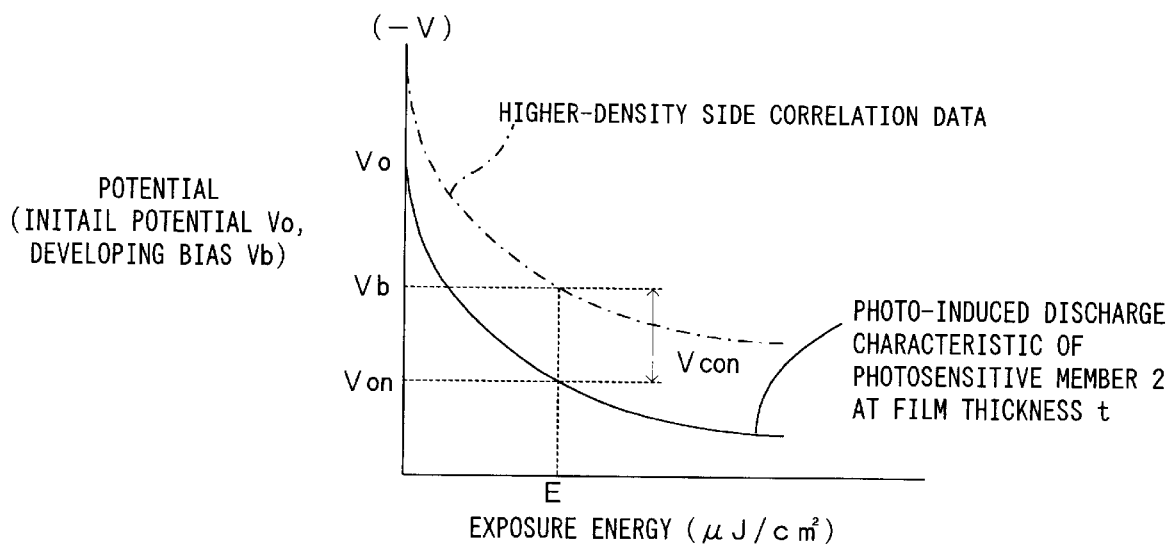

Hence, as denoted at the dotted-and-dashed line in FIG. 47, with the exposure energy E and the developing bias Vb set such that a difference between the exposed area potential Von and the developing bias Vb is the contrast potential Vcon, it is possible to form a toner image, at the higher-density side target density. Noting this, according to this embodiment, the CPU 124 calculates the correlation data denoted at the dotted-and-dashed line in FIG. 47.

At the next step S85, correlation data between the exposure energy E and the developing bias Vb for forming a toner image at a lower-density side target density (lower-density side correlation data) fare calculated. This embodiment requires to set an "optical density (OD)=0.2" as the lower-density side target density, and to calculate the developing bias Vb which is necessary to make a 1-on-5-off line image LI as that shown in FIG. 7 formed with each exposure energy have an optical density (OD) of 0.2. Specific operations for calculation are the same as those at the step S14 according to the first preferred embodiment, and therefore, will not be described again.

Figure 48:
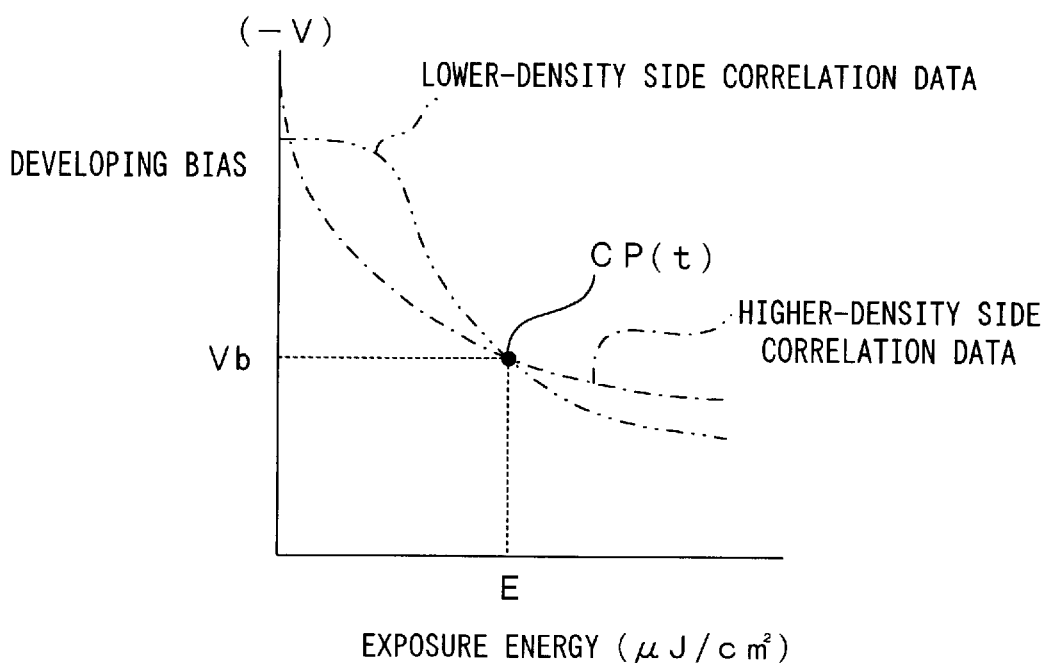

At the next step S86, a product set of the higher-density side correlation data obtained at the Step S84 and the lower-density side correlation data obtained at the step S85 is calculated. More particularly, as shown in FIG. 48, an intersection CP(t) of the dotted-and-dashed line which represents the higher-density side correlation data and the double-dotted-and-dotted-and-dashed line which represents the lower-density side correlation data is identified, the exposure energy E and the developing bias Vb corresponding to the intersection CP(t) are set as the film-thickness-equivalent values (an optimal exposure energy and an optimal developing bias) at the film thickness t and stored in the memory 127.

As the optimal exposure energy and the optimal developing bias corresponding to the film thickness t are calculated with respect to the particular toner color acquired at the step S83, whether optimal exposure energies and optimal developing biases are calculated with respect to all toner colors is judged at the step S87. While the judgment at the step S87 remains "NO," the processing at the steps S83 to S86 described above is repeated for the remaining toner colors, whereby the film-thickness-equivalent values (the optimal exposure energies and the optimal developing biases) at the film thickness t for the respective toner colors are calculated and stored in the memory 127.

At the next step S88, whether the film thickness t is smaller than an allowable minimum film thickness value tmin is judged. After decrementing the film thickness t by a fine quantity Δt at the step S89 while the film thickness t remains equal to or larger than the allowable minimum film thickness value tmin, the sequence returns to the step S82 and the steps S82 and S87 are executed, whereby the film-thickness-equivalent values at the respective film thickness values t are calculated and stored in the memory 127.

As such optimization is executed, in the image forming apparatus having such a structure described above, as shown in FIG. 49 for example, the film-thickness-equivalent values (the optimal exposure energies and the optimal developing biases) which correspond to film thickness values t1 through t5 and are expressed by intersections CP(t1) to CP(t5) are stored in the memory 127.

As the apparatus is shipped from a plant and delivered to a user, at appropriate timing (e.g., at the start-up of the apparatus or during a stand-by for printing), the CPU 124 presumes the film thickness t of the photosensitive member from data such as a cumulative number of rotations of the photosensitive member 2, a total operation time, the total number of printed sheets, etc. The CPU 124 reads out the film-thickness-equivalent values which correspond to this film thickness t from the data table (FIG. 21) in the memory 127, and sets this as an optimal charging bias and an optimal exposure energy.

In general, the quantity of grinding of a photosensitive member is in proportion to the number of rotations of the photosensitive member. Noting this, this embodiment requires to store in the memory 127 in advance the grinding quantity of the photosensitive member 2 per rotation and to presume the film thickness t from this data and data regarding the cumulative number of rotations of the new photosensitive member 2 since the very first use of the photosensitive member.

As described above, in the image forming apparatus according to the tenth preferred embodiment, since the exposure energy of the light beam and the developing bias, which are the density adjustment factors, are set respectively to an optimal exposure energy and an optimal developing bias which correspond to the film thickness of the photosensitive member 2, even when the film thickness of the photosensitive member 2 changes, it is possible to perform the processing of forming images always under an optimal condition. In other words, with the density adjustment factors modified and set in accordance with a change in film thickness, it is possible to stabilize the image densities of toner images which are formed on the photosensitive member 2.

Further, according to the tenth preferred embodiment, as the image densities of toner images in the respective toner colors are adjusted to the lower-density side target density (OD=0.2) and the higher-density side target density (OD= 1.2), an image is formed stably in a wide density range.

Although the tenth preferred embodiment requires to store the film-thickness-equivalent values at the film thickness value t of the photosensitive member in the memory 127 in advance, an alternative may be to store in the memory 127 a photo-induced discharge characteristic and a development γ characteristic at the respective film thickness values t instead of storing the film-thickness-equivalent values. In the modified embodiment, the CPU 124 reads out the photo-induced discharge characteristic and the development γ characteristic corresponding to the film thickness t at proper timing and calculate film-thickness-equivalent values (an optimal charging bias and an optimal exposure energy) in a similar processing flow to that shown in FIG. 46.

K. Eleventh Preferred Embodiment

Although the lower-density side correlation data and higher-density side correlation data are calculated based on a photo-induced discharge characteristic of the photosensitive member 2 and a development γ characteristic of the developers in the tenth preferred embodiment, the lower-density side correlation data and the higher-density side correlation data may be calculated by means of so-called patch sensing method as in an eleventh preferred embodiment which will be described below. The mechanical and electrical structures of an image forming apparatus according to the eleventh preferred embodiment are the same as those according to the first preferred embodiment.

Figure 50:
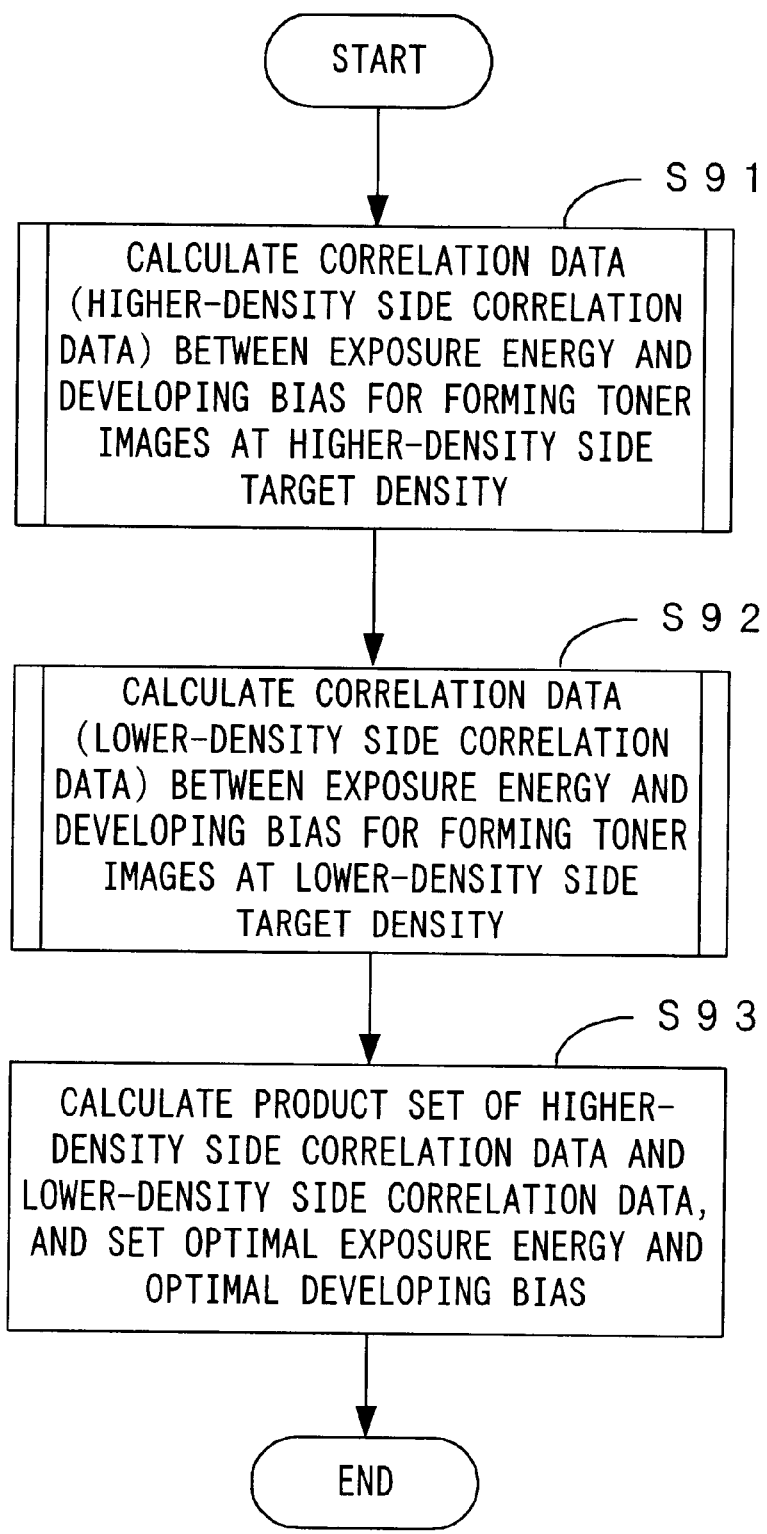
FIG. 50 is a flow chart showing optimization of density adjustment factors in an image forming apparatus according to the eleventh preferred embodiment.

FIG. 50 is a flow chart showing optimization of density adjustment factors in an image forming apparatus according to the eleventh preferred embodiment. FIGS. 51A to 51C are schematic diagrams, showing the sequence of obtaining an optimal exposure energy and an optimal developing bias in the eleventh preferred embodiment. In the eleventh preferred embodiment, first, correlation data between the exposure energy E and the developing bias Vb for forming a toner image at a higher-density side target density (OD=1.2) by patch sensing method are calculated as higher-density side correlation data (Step S91). More specifically, the higher-density side correlation data are calculated while the control unit 1 controls the respective portions of the apparatus in accordance with the sequence shown in the flow chart in FIG. 52.

Figure 52:
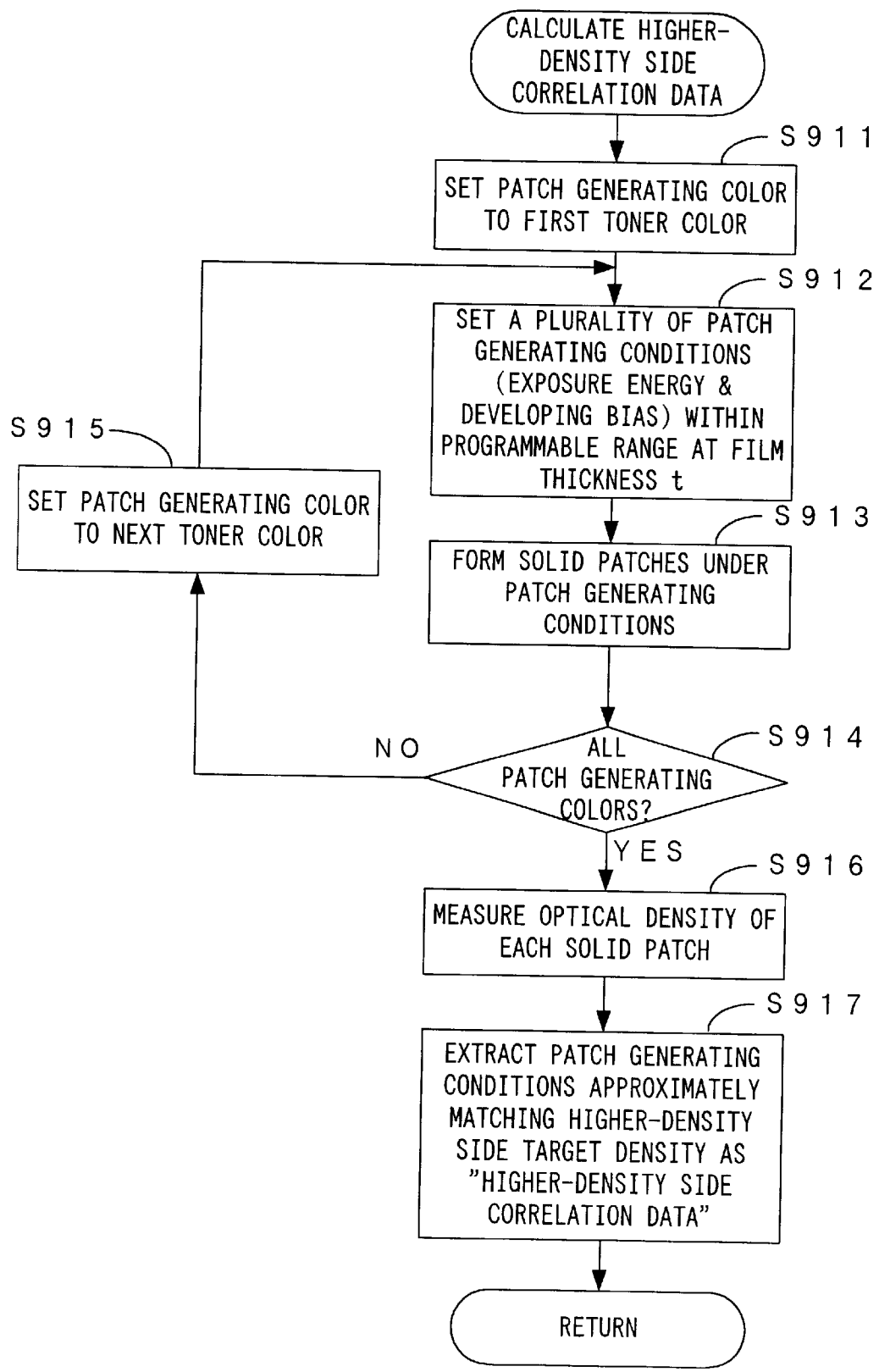
FIG. 52 is a flow chart showing the sequence of deriving the higher-density side correlation data in the eleventh preferred embodiment.

FIG. 52 is a flow chart showing the sequence of deriving the higher-density side correlation data in the eleventh preferred embodiment. First, the color in which patch images are to be formed is set to the first color, for example, black (Step S911). The film thickness t of the photosensitive member 2 is then presumed based on data such as a cumulative number of rotations of the photosensitive member 2, a total operation time, the total number of printed sheets, and a plurality of patch generating conditions are set within a programmable range corresponding to the film thickness t (Step S912). The reason the programmable range is modified and set in accordance with the film thickness t is as follows.

Figure 49:
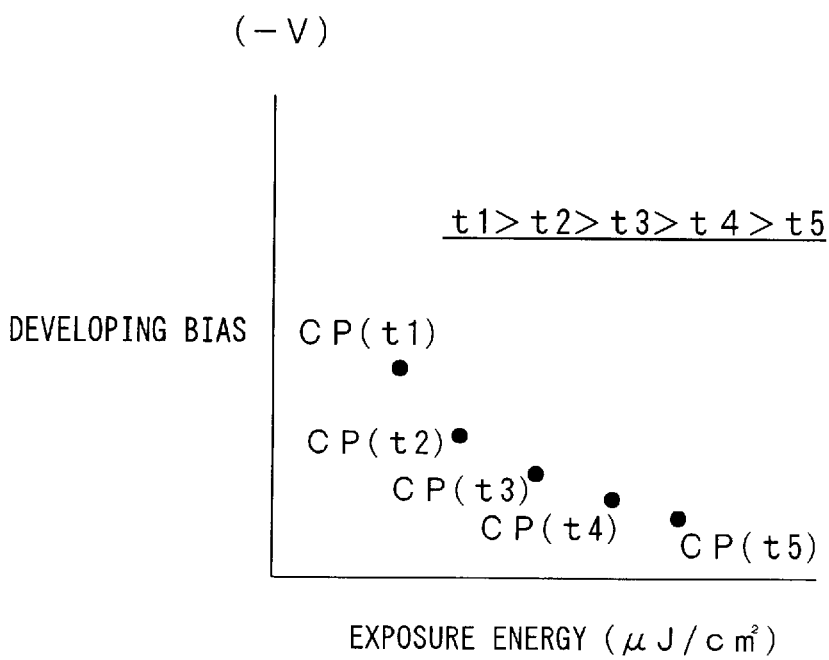
FIG. 49 is a graph showing a change in film-thickness-equivalent value with film thickness change.

As described above in detail in relation to the tenth preferred embodiment, in this type of image forming apparatus, an optimal value of a density adjustment factor changes as the film thickness t changes. For example, in the tenth preferred embodiment, as shown in FIG. 49, an optimal value of the exposure energy among the density adjustment factors gradually increases but an optimal value of the developing bias gradually decreases as the film thickness of the photosensitive member 2 decreases from t1 to t5. Hence, as already described, if the programmable range is narrow, an optimal value of the density adjustment factor (the exposure energy or the developing bias) may go beyond the programmable range in some cases because of a change in film thickness. This makes it impossible to derive an optimal value of the density adjustment factor, and hence, control the image densities of toner images to the target densities.

Although a solution may be to fixedly set in advance the programmable range so as to cover ranges in which these can vary, use of a wide programmable range leads to a problem that the frequency of changing a patch generating condition becomes long and the accuracy of deriving optimal values deteriorates or another problem that a reduction in frequency of change for a better derivation accuracy increases the number of patch generating conditions and an enormous amount of time is accordingly necessary to derive a density adjustment factor.

Figure 53:
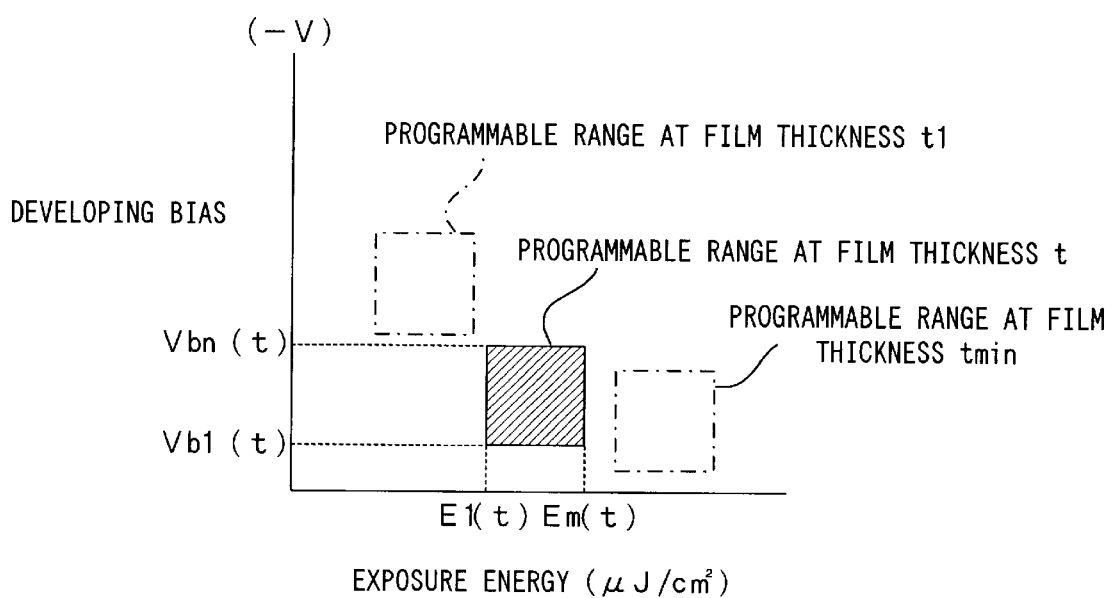
FIG. 53 is a schematic diagram showing a programmable range which is selected in accordance with film thickness in the eleventh preferred embodiment.

In contrast, according to the eleventh preferred embodiment, based on the tendency that an optimal exposure energy gradually increases but the absolute value of an optimal developing bias gradually decreases as the film thickness of the photosensitive member decreases, programmable ranges for a plurality of density adjustment factors in accordance with the film thickness of the photosensitive member 2 are set as shown in FIG. 53 and stored in the memory 127. Further, in accordance with the film thickness t of the photosensitive member, the programmable range E1(t) to Em(t) of exposure energy and the programmable range Vb1(t) to Vbn(t) of developing bias are selected and the exposure energy E is changed as E1(t), E2(t), ..., Em(t) within the programmable range and the developing bias Vb is changes as Vb1(t), Vb2(t), ..., Vbn(t) within the programmable range. This allows to obtain optimal values of the density adjustment factors precisely at a high accuracy in a short period of time.

Next, solid patch images (higher-density patch images) are formed one after another on the photosensitive member 2 in such patch generating conditions, during which each patch image is primarily transferred onto the outer circumferential surface of the intermediate transfer belt 71 (Step S913). Although solid patch images are formed in the eleventh preferred embodiment, this may not be limited to solid patch images. Higher-density images which are close to solid patch images, e.g., an image whose area ratio is approximately 80% or more may be formed.

At the next step S914, whether patch images are formed in all toner colors or not is judged. While the judgment remains "NO," the patch generating color is set to the next color (Step S915) and the steps S912 and S913 are repeated, whereby solid patch images in the other toner colors, namely, cyan (C), magenta (M) and yellow (Y) are further formed on the outer circumferential surface of the intermediate transfer belt 71.

Conversely, if it is judged "YES" at the step S914, the patch sensor measures the optical densities of the respective patch images (Step S916). Although the eleventh preferred embodiment requires to measure the optical densities of the solid patch images at once after creating the solid patch images in all patch generating colors, the optical densities of solid patch images may be measured after forming the respective solid patch images in each patch generating color, or further alternatively, solid patch images may be divided into a few blocks and each block as a whole may be measured. This similarly applies to processing of deriving lower-density side correlation data which will be described later.

Following this, at the step S917, patch generating conditions matching with the higher-density side target density (OD=1.2) are extracted as "higher-density side correlation data." For example, as shown in FIG. 51A, when solid patch images generated under the patch generating conditions (E1(t), Vb2(t)), (E2(t), Vb3(t)), . . . among the solid patch images generated under the respective patch generating conditions (E, Vb) match with the higher-density side target density, these conditions (E1(t), Vb2(t)), (E2(t), Vb3(t)), . . . are determined the higher-density side correlation data.

After calculating the higher-density side correlation data in this manner (Step S91), correlation data between the exposure energy E and the developing bias Vb for forming a toner image at the lower-density side target density (OD=0.2) by patch sensing method are calculated as lower-density side correlation data (Step S92). More specifically, the lower-density side correlation data are calculated while the control unit 1 controls the respective portions of the apparatus in accordance with the sequence shown in the flow chart in FIG. 54.

Figure 54:
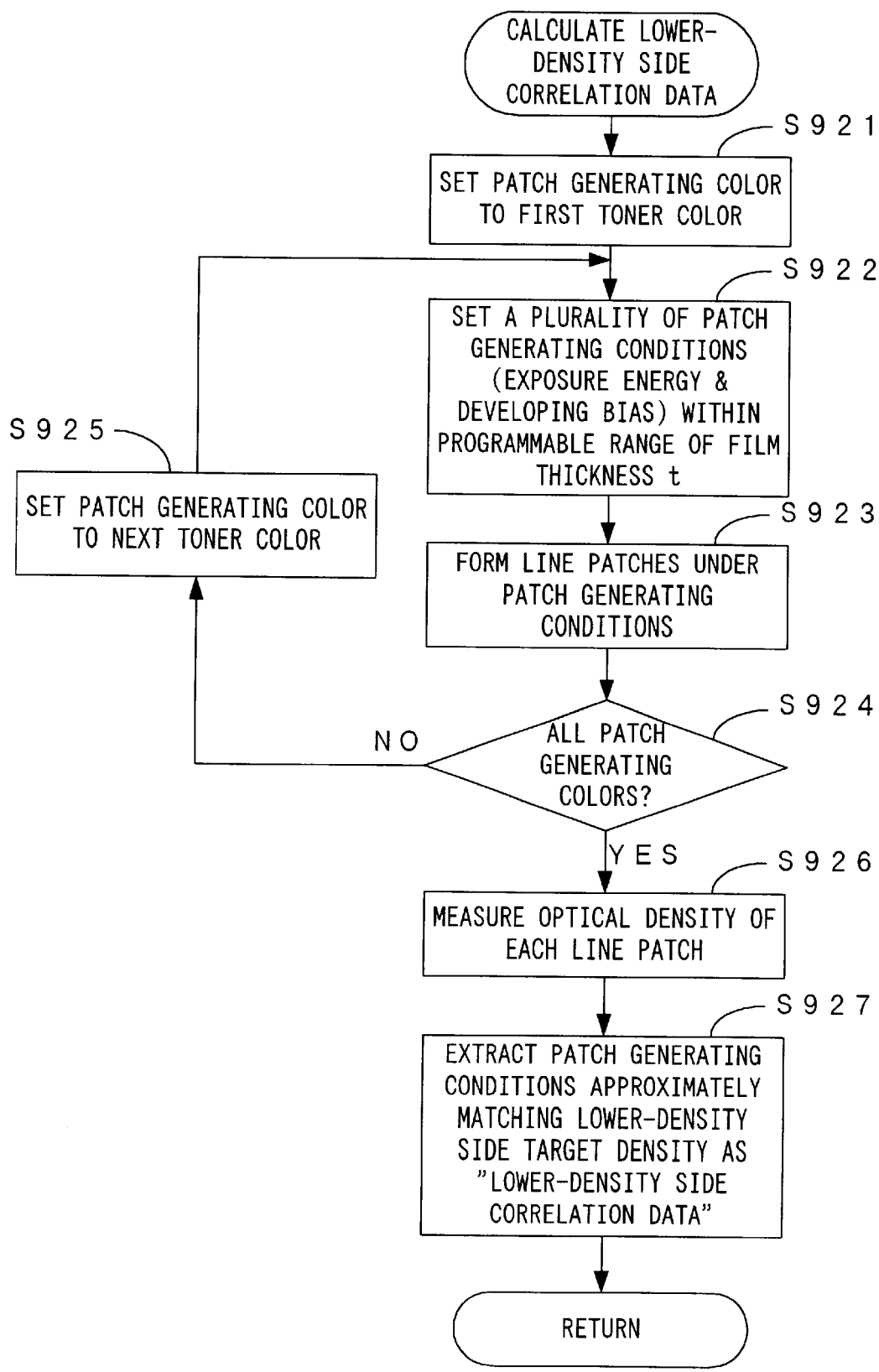
FIG. 54 is a flow chart showing the sequence of deriving the lower-density side correlation data in the eleventh preferred embodiment.

FIG. 54 is a flow chart showing the sequence of deriving the lower-density side correlation data in the eleventh preferred embodiment. First, the color in which patch images are to be formed is set to the first color, for example, black (K) (Step S921). A plurality of patch generating conditions are set within a programmable range corresponding to the film thickness t2 (Step S922). Similarly to derivation of the higher-density side correlation data, the programmable range E1(t) to Em(t) of exposure energy and the programmable range Vb1(t) to Vbn(t) of developing bias are selected in accordance with the film thickness t of the photosensitive member, and the exposure energy E is changed as E1(t), E2(t), . . . , Em(t) and the developing bias Vb is changed as Vb1(t), Vb2(t), . . . Vbn(t) within these programmable ranges.

While serially forming 1-on-5-off line patch images LI as that shown in FIG. 7 on the photosensitive member 2 under these patch generating conditions, each patch image is primarily transferred onto the outer circumferential surface of the intermediate transfer belt 71 (Step S923).

At the next step S924, whether patch images are formed in all toner colors or not is judged. While the judgment remains "NO," the patch generating color is set to the next color (Step S925) and the steps S922 and S923 are repeated, whereby line patch images in the other toner colors, namely, cyan (C), magenta (M) and yellow (Y) are further formed on the outer circumferential surface of the intermediate transfer belt 71.

Conversely, if it is judged "YES" at the step S924, the patch sensor measures the optical densities of the respective line patch images (Step S926).

Following this, at the step S927, patch generating conditions matching with the lower-density side target density (OD=0.2) are extracted as "lower-density side correlation data." For example, as shown in FIG. 51B, when line patch images generated under patch generating conditions (E1(t), Vb2(t)), (E2(t), Vb3(t)), . . . among the line patch images generated under the respective patch generating conditions (E, Vb) match with the lower-density side target density, these conditions (E1(t), Vb2(t)), (E2(t), Vb3(t)), . . . are determined the lower-density side correlation data.

After calculating the higher-density side correlation data and the lower-density side correlation data in this manner, a product set of the two is calculated (Step S93). If the higher-density side correlation data and the lower-density side correlation data are calculated respectively as shown in FIGS. 51A and 51B, the product set of the higher-density side correlation data and the lower-density side correlation data is correlation data (E2(t), Vb3(t)) (FIG. 51C). Therefore, the exposure energy E2(t) and the developing bias Vb3(t) are set respectively as an optimal exposure energy and an optimal developing bias and stored in the memory 127. Although the foregoing has described an example that correlation data belonging to the product set are only the correlation data (E2(t), Vb3(t)), if there are a plurality pieces of correlation data, one piece of correlation data belonging to the product set may be selected and the exposure energy and the developing bias constituting this correlation data may be set respectively as an optimal exposure energy and an optimal developing bias.

As described above, according to the eleventh preferred embodiment, as in the tenth preferred embodiment, since the exposure energy of the light beam and the developing bias, which are the density adjustment factors, are set respectively to an optimal exposure energy and an optimal developing bias which correspond to the film thickness of the photosensitive member 2, even when the film thickness of the photosensitive member 2 changes, it is possible to perform the processing of forming images always under an optimal condition. In other words, with the image densities of toner images in the respective toner colors are adjusted to the lower-density side target density (OD=0.2) and the higher-density side target density (OD=1.2), an image is formed stably in a wide density range.

Although the eleventh preferred embodiment requires to form lower-density patches after forming higher-density patches, patches mixing these may be formed and sensed.

Further, although a plurality of patch images are formed side by side on the intermediate transfer belt 71 which functions as "image carrier" of the present invention and has the patch sensor measure the optical densities of the respective patch images all at once according to the eleventh preferred embodiment, the optical density of a patch image may be measured every time the patch image is primarily transferred onto the intermediate transfer belt 71, or patch images may be divided into a few blocks and each block as a whole may be measured, or further alternatively, a sensor for reading density which is different from the patch sensor may be disposed as "density measuring means" of the present invention along the outer circumferential surface of the photosensitive member 2 and this sensor may measure the optical densities of patch images which are formed on the photosensitive member 2.

L. Twelfth Preferred Embodiment

An image forming apparatus according to a twelfth preferred embodiment is for controlling the image densities of toner images by controlling a charging bias and a developing bias as density adjustment factors. In the apparatus, after calculating an optimal developing bias for achieving a higher-density side target density by means of patch sensing method at appropriate timing, an optimal charging bias for achieving a lower-density side target density is calculated by means of patch sensing method. Thereafter, the charging bias and the developing bias are set to optimal values and the image densities of toner images are controlled. Since the mechanical and electrical structures of an image forming apparatus according to the twelfth preferred embodiment are the same as those according to the first preferred embodiment, these structures will be denoted at the same reference symbols as those used for the first preferred embodiment but will not be described again.

Figure 55:
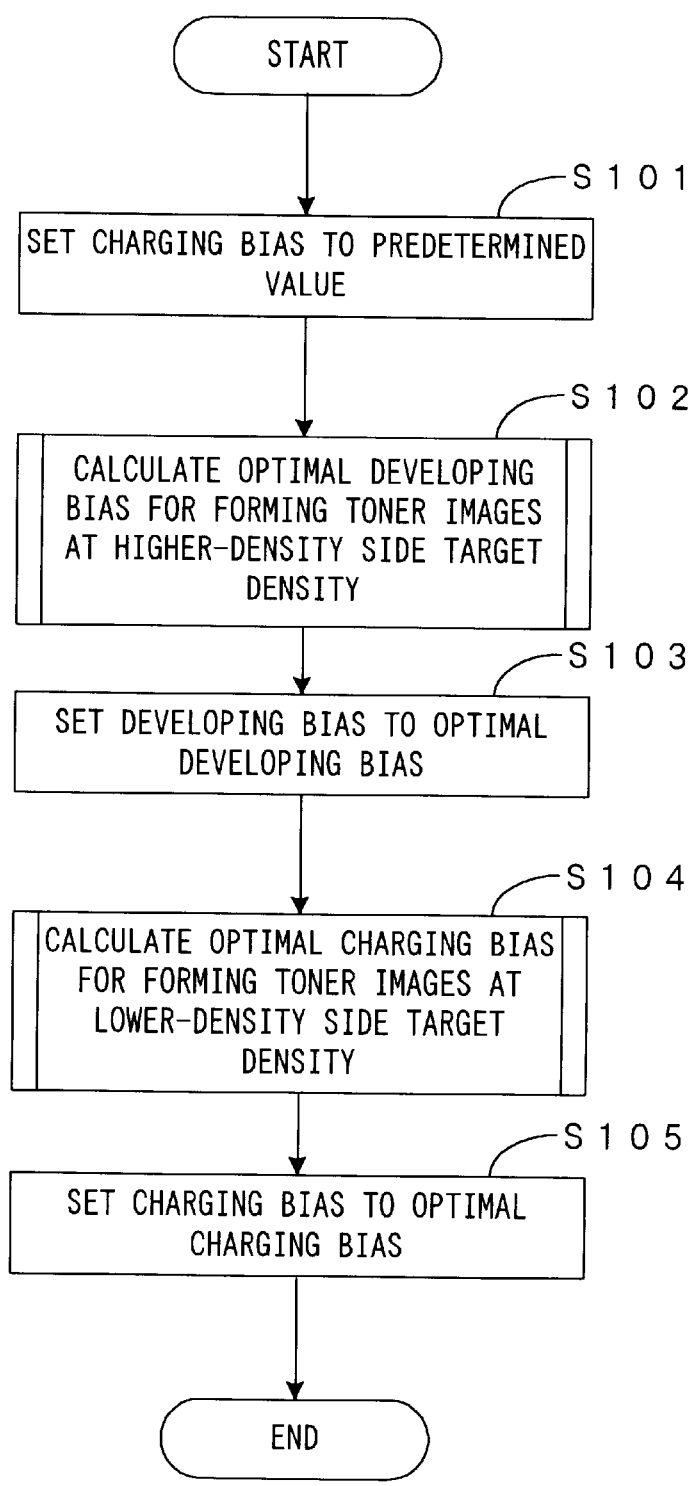
FIG. 55 is a flow chart showing optimization of density adjustment factors in the image forming apparatus according to the twelfth preferred embodiment of the present invention.

FIG. 55 is a flow chart showing optimization of density adjustment factors in the image forming apparatus according to the twelfth preferred embodiment of the present invention. In the twelfth preferred embodiment, first, after setting a charging bias to a predetermined value stored in the memory 127 in advance (Step S101), a developing bias for forming a toner image at a higher-density side target density (OD=1.2) by patch sensing method is calculated as an optimal developing bias (Step S102). More specifically, the optimal developing bias is calculated while the control unit 1 controls the respective portions of the apparatus in accordance with the sequence shown in the flow chart in FIG. 56.

Figure 56:
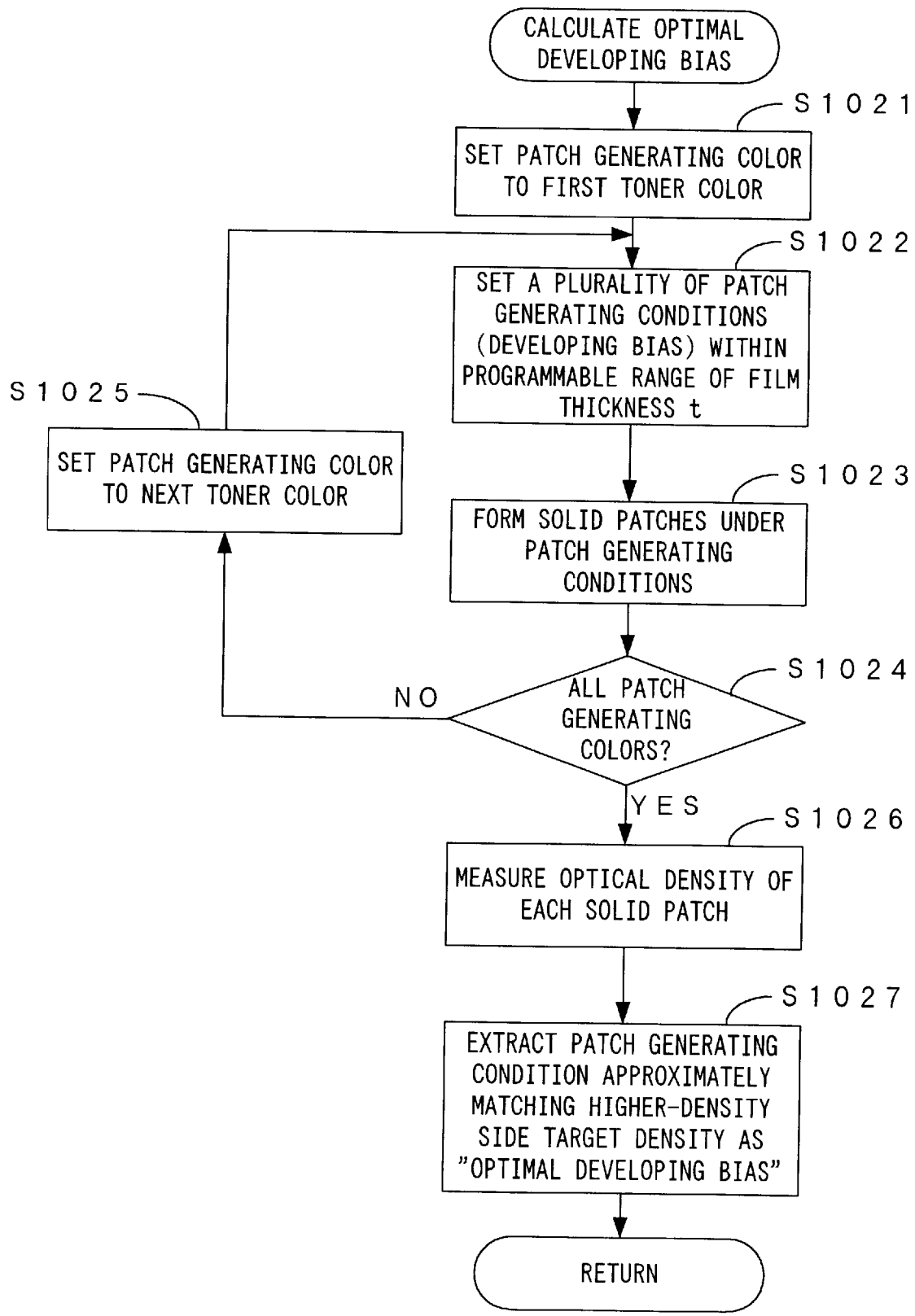
FIG. 56 is a flow chart showing the sequence of calculating an optimal developing bias according to the twelfth preferred embodiment.
Figure 57:
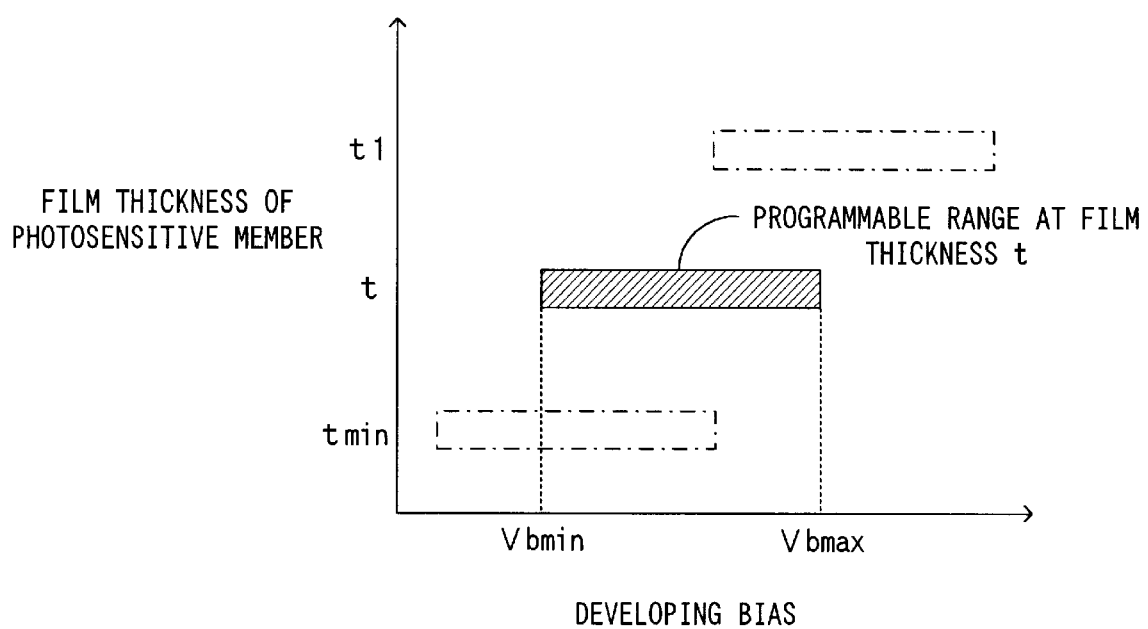
FIGS. 57 and 59 are schematic diagrams showing a programmable range which is selected in accordance with film thickness in the twelfth preferred embodiment.

FIG. 56 is a flow chart showing the sequence of calculating an optimal developing bias according to the twelfth preferred embodiment. First, the color in which patch images are to be formed is set to the first color, for example, black (Step S1021). The film thickness t of the photosensitive member 2 is then presumed based on data such as a cumulative number of rotations of the photosensitive member 2, a total operation time, the total number of printed sheets, and a plurality of patch generating conditions are set within a programmable range corresponding to the film thickness t (Step S1022). As described above in detail under the section "(2) Where the developing bias is used as a density adjustment factor," based on the tendency that the absolute value of an optimal developing bias gradually decreases as the film thickness of the photosensitive member decreases, a plurality of programmable ranges of developing bias corresponding to the film thickness of the photosensitive member 2 are set and stored in the memory 127 as shown in FIG. 57 for example in the twelfth preferred embodiment. The programmable range Vbmin to Vbmax of developing bias is thereafter selected in accordance with the film thickness t of the photosensitive member, and the developing bias Vb is changed within this programmable range. This allows to obtain an optimal value of the developing bias precisely at a high accuracy in a short period of time, for similar reasons to those in the second preferred embodiment.

Next, solid patch images (higher-density patch images) are formed one after another on the photosensitive member 2 under such patch generating conditions, during which each patch image is primarily transferred onto the outer circumferential surface of the intermediate transfer belt 71 (Step S1023). Although solid patch images are formed in the twelfth preferred embodiment, this may not be limited to solid patch images. High-density images which are close to solid patch images, e.g., an image whose area ratio is approximately 80% or more may be formed.

At the next step S1024, whether patch images are formed in all toner colors or not is judged. While the judgment remains "NO," the patch generating color is set to the next color (Step S102) and the steps S1022 and S1023 are repeated, whereby line patch images in the other toner colors, namely, cyan (C), magenta (M) and yellow (Y) are further formed on the outer circumferential surface of the intermediate transfer belt 71.

Conversely, if it is judged "YES" at the step S1024, the patch sensor measures the optical densities of the respective patch images (Step S1026). Although the twelfth preferred embodiment requires to measure the optical densities of the solid patch images at once after creating the solid patch images in all patch generating colors, the optical densities of solid patch images may be measured after forming the respective solid patch images in each patch generating color, or further alternatively, solid patch images may be divided into a few blocks and each block as a whole may be measured. This similarly applies to processing of calculating an optimal charging bias which will be described later.

Following this, at the step S1027, a patch generating condition matching with the higher-density side target density (OD=1.2) is extracted as "optimal developing bias" and stored in the memory 127.

Next, after setting the developing bias in the image forming apparatus to the optimal developing bias(Step S103), an optimal charging bias for forming a toner image at a lower-density side target density (OD=0.2) by patch sensing method is calculated (Step S104). More precisely, an optimal charging bias is calculated while the control unit 1 controls the respective portions of the apparatus in accordance with the sequence shown in the flow chart in FIG. 58.

Figure 58:
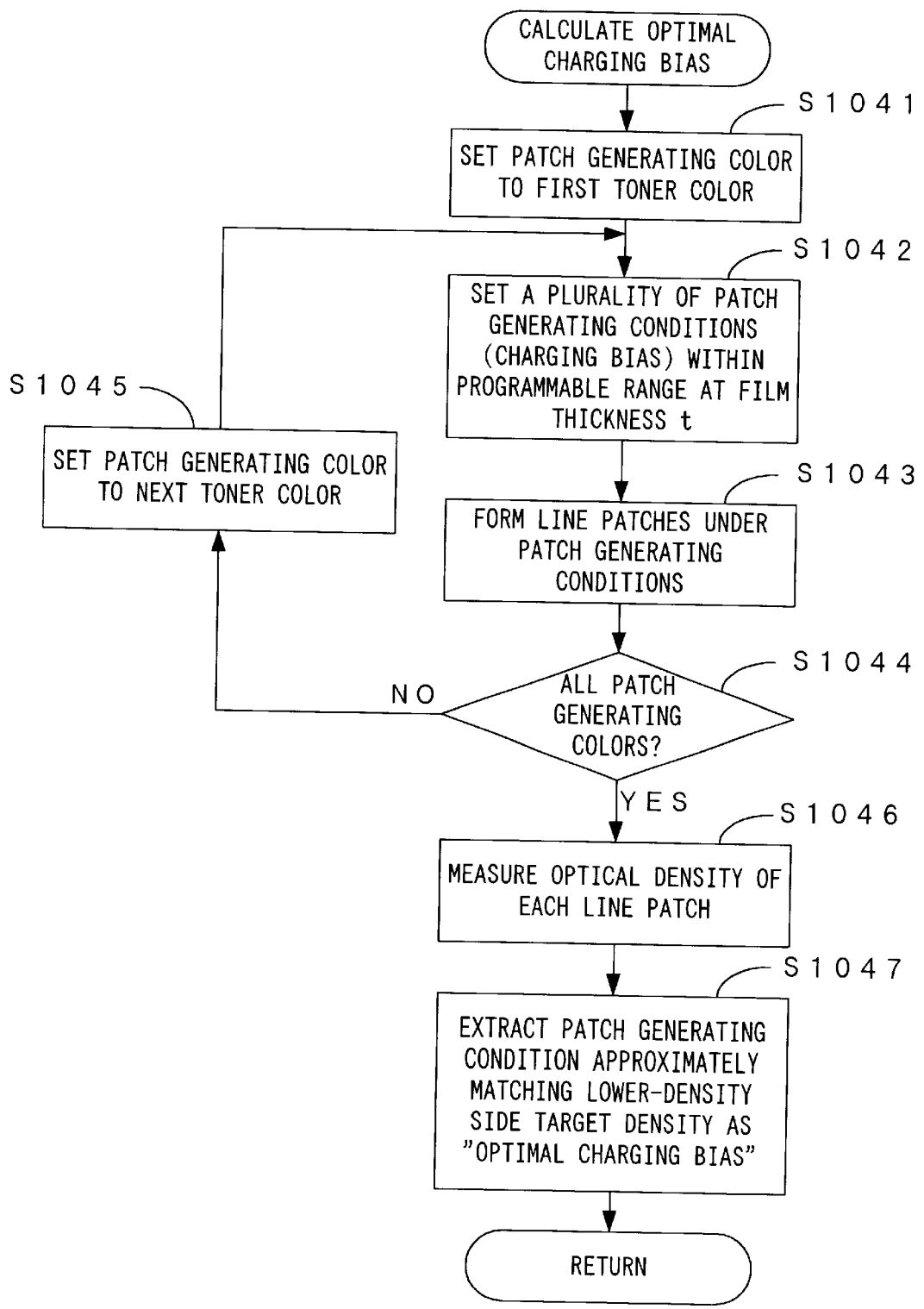
FIG. 58 is a flow chart showing the sequence of calculating an optimal charging bias according to the twelfth preferred embodiment.
Figure 59:
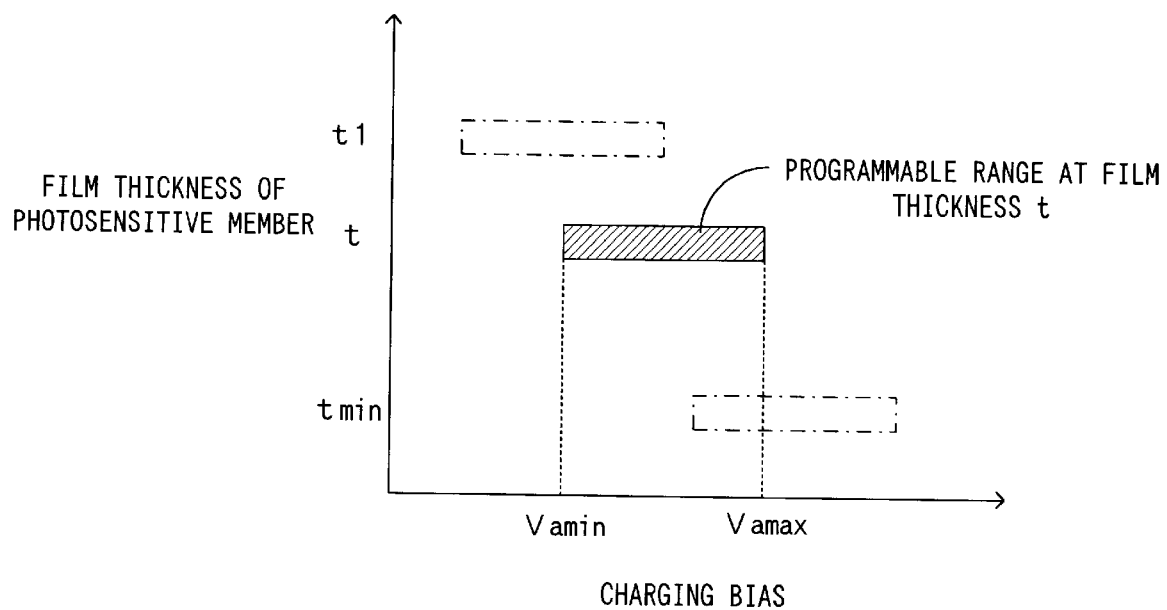

FIG. 58 is a flow chart showing the sequence of calculating an optimal charging bias according to the twelfth preferred embodiment. First, the color in which patch images are to be formed is set to the first color, for example, black (Step S1041). A plurality of patch generating conditions are set within a programmable range corresponding to the film thickness t of the photosensitive member 2 (Step S1042). In the twelfth preferred embodiment, based on the tendency that the absolute value of an optimal charging bias gradually decreases as the film thickness of the photosensitive member decreases, a plurality of programmable ranges of charging bias corresponding to the film thickness of the photosensitive member are set and stored in the memory 127 in advance as shown in FIG. 59, for instance. The programmable range Vamin to Vamax of charging bias is thereafter selected in accordance with the film thickness t of the photosensitive member, and the charging bias Va is changed within this programmable range. This allows to obtain the optimal value of the developing bias precisely at a high accuracy in a short period of time, for similar reasons to those in the second preferred embodiment.

Next, line patch images (lower-density patch images) are formed one after another on the photosensitive member 2 in such patch generating conditions, during which each patch image is primarily transferred onto the outer circumferential surface of the intermediate transfer belt 71 (Step S1043).

At the next step S1044, whether patch images are formed in all toner colors or not is judged. While the judgment remains "NO," the patch generating color is set to the next color (Step S1045) and the steps S1042 and S1043 are repeated, whereby line patch images in the other toner colors, namely, cyan (C), magenta (M) and yellow (Y) are further formed on the outer circumferential surface of the intermediate transfer belt 71.

Conversely, if it is judged "YES" at the step S1044, after the patch sensor measures the optical densities of the respective patch images (Step S1046), a patch generating condition matching with the lower-density side target density (OD=0.2) is extracted as "optimal charging bias" and stored in the memory 127.

Next, after setting the charging bias in the image forming apparatus to the optimal charging bias (Step S105), ordinary image forming processing is executed.

As described above, according to the twelfth preferred embodiment, since the charging bias and the developing bias, which are the density adjustment factors, are set respectively to an optimal charging bias and an optimal developing bias which correspond to the film thickness of the photosensitive member 2, even when the film thickness of the photosensitive member 2 changes, it is possible to perform the processing of forming images always under an optimal condition. Further, with the image densities of toner images in the respective toner colors are adjusted to the lower-density side target density (OD=0.2) and the higher-density side target density (OD=1.2), an image is formed stably in a wide density range.

In addition, while so-called patch sensing method is carried out to calculate optimal values of the density adjustment factors (the charging bias and the developing bias), since the programmable ranges are modified and set in accordance with the film thickness t of the photosensitive member 2 and the optimal conditions are set within the programmable ranges, it is possible to obtain optimal values of the density adjustment factors precisely at a high accuracy in a short period of time. Thus, in this embodiment, the CPU 124 functions as "film thickness deriving means," "programmable range setting means" and "optimization means" of the present invention.

Although the foregoing has described the tenth to the twelfth preferred embodiments in relation to an image forming apparatus using a photosensitive member is formed by a conductive base material, an under coat layer, a carrier generation layer and a carrier transport layer as examples, applications of the present invention are not limited to this. The present invention is generally applicable to image forming apparatuses in which a photo-induced discharge characteristic of a photosensitive member changes as the film thickness of the photosensitive member changes.

Further, while the CPU 124 serving as the film thickness deriving means presumes the film thickness t of the photosensitive member from data such as a cumulative number of rotations of the photosensitive member 2, a total operation time, the total number of printed sheets, in the preferred embodiment above, the film thickness deriving:, means of the present invention is not limited to this. Instead, the film thickness t of the photosensitive member 2 may be measured based on the value of a current which flows between the photosensitive member 2 and the charging unit 3 upon application of the charging bias, for example.

M. Thirteenth Preferred Embodiment

In an image forming apparatus according to a thirteenth preferred embodiment, optimization of density adjustment factor which will be described later is executed at appropriate timing, e.g., upon turning on of a power source of the apparatus, to thereby set optimal values of density adjustment factors in a normal mode and a first to a sixth user modes. Since the mechanical and electrical structures of an image forming apparatus according to the thirteenth preferred embodiment are the same as those according to the first preferred embodiment, these structures will be denoted at the same reference symbols as those used for the thirteenth preferred embodiment but will not be described again.

As herein termed, "density adjustment factors" means factors which influence the image densities of toner images which are formed on the photosensitive member 2. In this embodiment, an exposure energy of the light beam L and a developing bias are used as the density adjustment factors, and optimized to adjust the image densities of toner images in the respective toner colors.

While the image forming apparatus above is usually set to the "normal mode" and forms a toner image at a reference target density, as one of the first to the sixth user modes is selected in response to a user's demand, the apparatus forms a toner image at a user's target density which corresponds to the selected user mode.

In the thirteenth preferred embodiment, for the purpose of forming images with excellent gradation while adjusting the image densities of toner images to appropriate densities ranging from low densities to high densities, target densities are a lower-density side target density and a higher-density side target density. Specific examples of this are shown in the following table.

|  | HIGHER-DENSITY SIDE TARGET DENSITY (OPTICAL DENSITY OD) | LOWER-DENSITY SIDE TARGET DENSITY (OPTICAL DENSITY OD) |
| --- | --- | --- |
| NORMAL MODE | NORMAL (1.2) | NORMAL (0.2) |
| FIRST USER MODE | NORMAL (1.2) | RELATIVELY LIGHT (0.1) |
| SECOND USER MODE | RELATIVELY DARK (1.3) | NORMAL (0.2) |
| THIRD USER MODE | NORMAL (1.2) | RELATIVELY DARK (0.3) |
| FOURTH USER MODE | RELATIVELY LIGHT (0.8) | NORMAL (0.2) |
| FIFTH USER MODE | RELATIVELY DARK (1.3) | RELATIVELY DARK (0.3) |
| SIXTH USER MODE | RELATIVELY LIGHT (0.8) | RELATIVELY LIGHT (0.1) |

Figure 60:
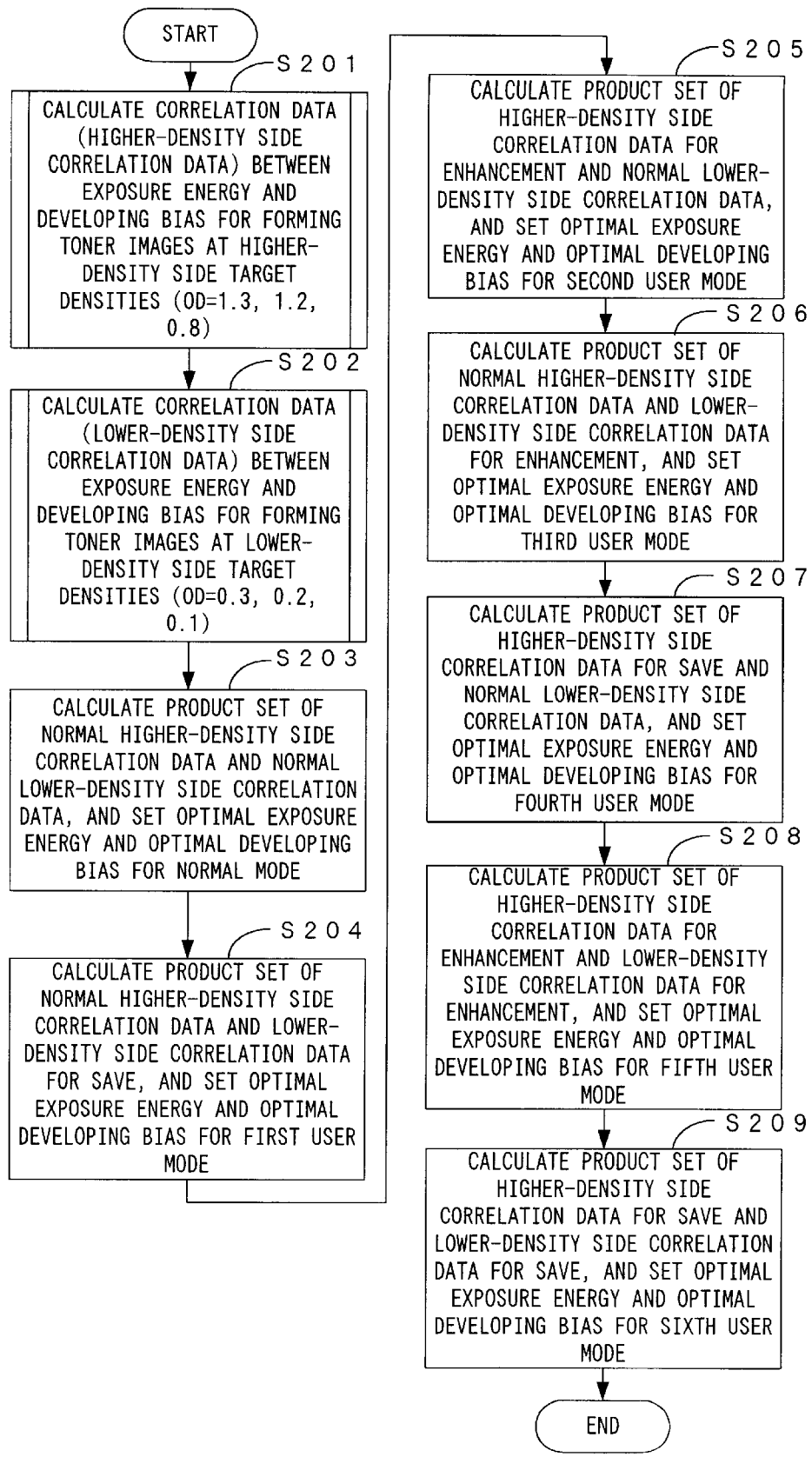
FIG. 60 is a flow chart showing optimization of density adjustment factors according to the thirteenth preferred embodiment.

FIG. 60 is a flow chart showing optimization of density adjustment factors according to the thirteenth preferred embodiment. In the thirteenth preferred embodiment, first, patch sensing method is performed to thereby calculate three types of high-density side correlation data:

(1) correlation data between the exposure energy E and the developing bias Vb for forming a toner image at a higher-density side target density (OD=1.3) as "higher-density side correlation data for enhancement";

(2) correlation data between the exposure energy E and the developing bias Vb for forming a toner image at a higher-density side target density (OD=1.2) as "normal higher-density side correlation data,"; and (3) correlation data between the exposure energy E and the developing bias Vb for forming a toner image at a higher-density side target density (OD=0.8) as "higher-density side correlation data for save" (Step S201).

Figure 61:
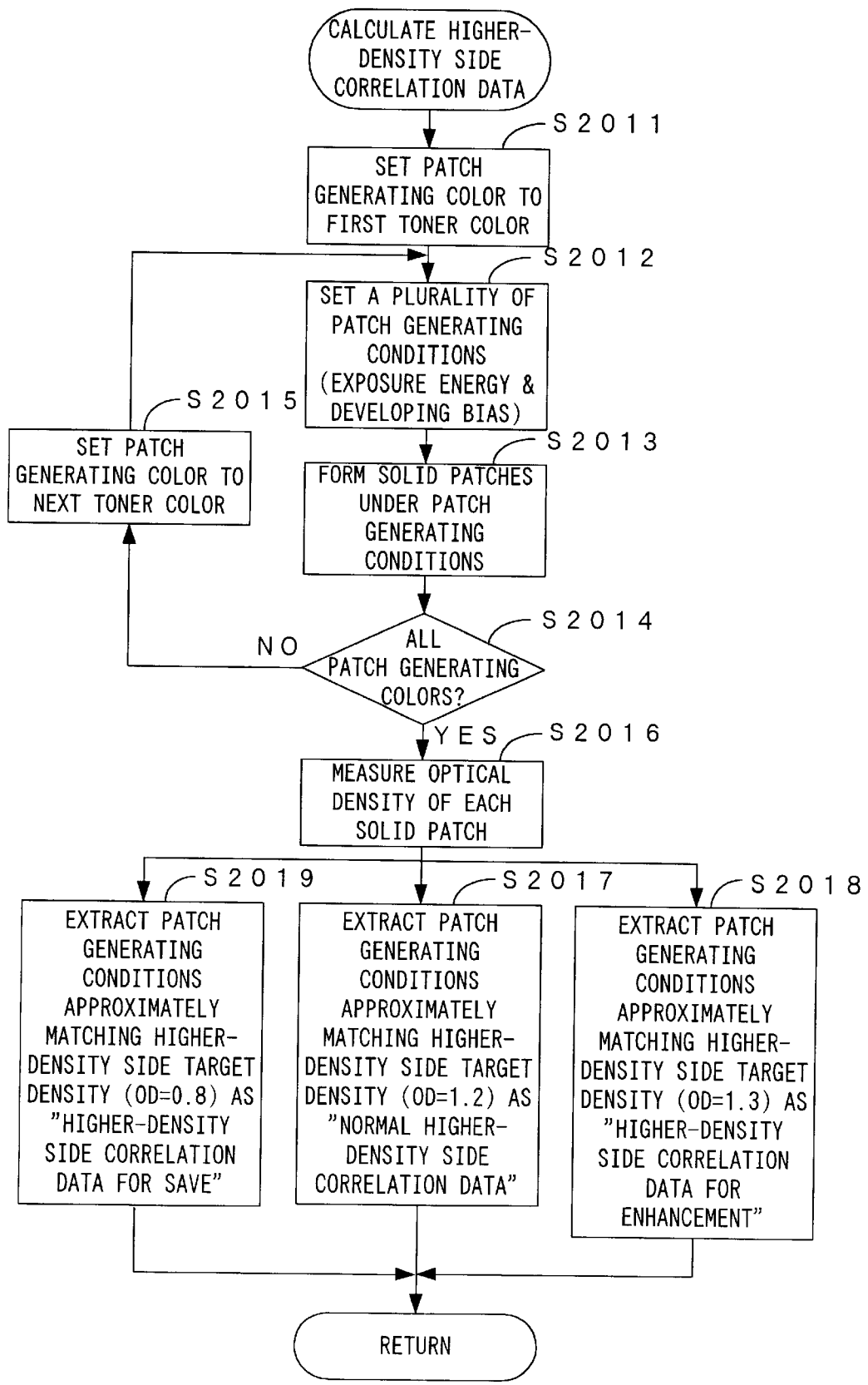
FIG. 61 is a flow chart showing the sequence of deriving the higher-density side correlation data in the thirteenth preferred embodiment.

More specifically, the higher-density side correlation data are calculated while the control unit 1 controls the respective portions of the apparatus in accordance with the sequence shown in the flow chart in FIG. 61.

FIG. 61 is a flow chart showing the sequence of deriving the higher-density side correlation data in the thirteenth preferred embodiment. First, the color in which patch images are to be formed is set to the first color, for example, black (Step S2011). The charging bias is set to an initial value which is stored in the memory 127 in advance, and a plurality of patch generating conditions are set (Step S2012). In this embodiment, the exposure energy E is changed to E1, E2, . . . , Em, and the developing bias Vb is changed to Vb(1), Vb(2), . . . , Vb(6).

Next, solid patch images (higher-density patch images) are formed one after another on the photosensitive member 2 in such patch generating conditions, during which each patch image is primarily transferred onto the outer circumferential surface of the intermediate transfer belt 71 (Step S2013). Although solid patch images are formed in the thirteenth preferred embodiment, this may not be limited to solid patch images. High-density images which are close to solid patch images, e.g., an image whose area ratio is approximately 80% or more may be formed.

At the next step S2014, whether patch images are formed in all toner colors or not is judged. While the judgment remains "NO," the patch generating color is set to the next color (Step S2015) and the steps S2012 and S2013 are repeated, whereby patch images in the other toner colors, namely, cyan (C), magenta (M) and yellow (Y) are further formed on the outer circumferential surface of the intermediate transfer belt 71.

Conversely, if it is judged "YES" at the step S2014, the patch sensor PS measures the optical densities of the respective patch images (Step S2016).

Following this, at the step S2017, patch generating conditions matching with the higher-density side target density (OD=1.2) which is a reference target density are extracted as "normal higher-density side correlation data." For example, as shown in FIGS. 62A, 63A and 65A, when solid patch images generated under the patch generating conditions (E1, Vb(2)), (E2, Vb(3)), . . . among the solid patch images generated under the respective patch generating conditions (E, Vb) match with the higher-density side target density, these conditions (E1, Vb(2)), (E2, Vb(3)), . . . are determined the normal higher-density side correlation data.

Meanwhile, at the step S2018, patch generating conditions matching with the higher-density side target density (OD=1.3) which is a user's target density for the second and the fifth user modes are extracted as "higher-density side correlation data for enhancement." For example, as shown in FIGS. 64A and 67A, when solid patch images generated under the patch generating conditions (E1, Vb(1)), (Em, Vb(4)), . . . among the solid patch images generated under the respective patch generating conditions (E, Vb) match with the higher-density side target density, these conditions (E1, Vb(1)), (Em, Vb(4)), . . . are determined the higher-density side correlation data for enhancement.

Further, at the step S2019, patch generating conditions matching with the higher-density side target density (OD=0.8) which is a user's target density for the fourth and the sixth user modes are extracted as "higher-density side correlation data for save." For example, as shown in FIGS. 66A and 68A, when solid patch images generated under the patch generating conditions (E1, Vb(4)), (E2, Vb(5)), . . . among the solid patch images generated under the respective patch generating conditions (E, Vb) match with the higher-density side target density, these conditions (E1, Vb(4)), (E2, Vb(5)), . . . are determined the higher-density side correlation data for save.

In this manner, after calculating the normal higher-density side correlation data, the higher-density side correlation data for enhancement and the higher-density side correlation data for save (Step S201), patch sensing method is performed to thereby calculate three types of lower-density side correlation data:

(1) correlation data between the exposure energy E and the developing bias Vb for forming a toner image at a lower-density side target density (OD=0.3) as "lower-density side correlation data for enhancement";

(2) correlation data between the exposure energy E and the developing bias Vb for forming a toner image at a lower-density side target density (OD=0.2) as "normal lower-density side correlation data,"; and (3) correlation data between the exposure energy E and the developing bias Vb for forming a toner image at a lower-density side target density (OD=0.1) as "lower-density side correlation data for save" (Step S202).

Figure 69:
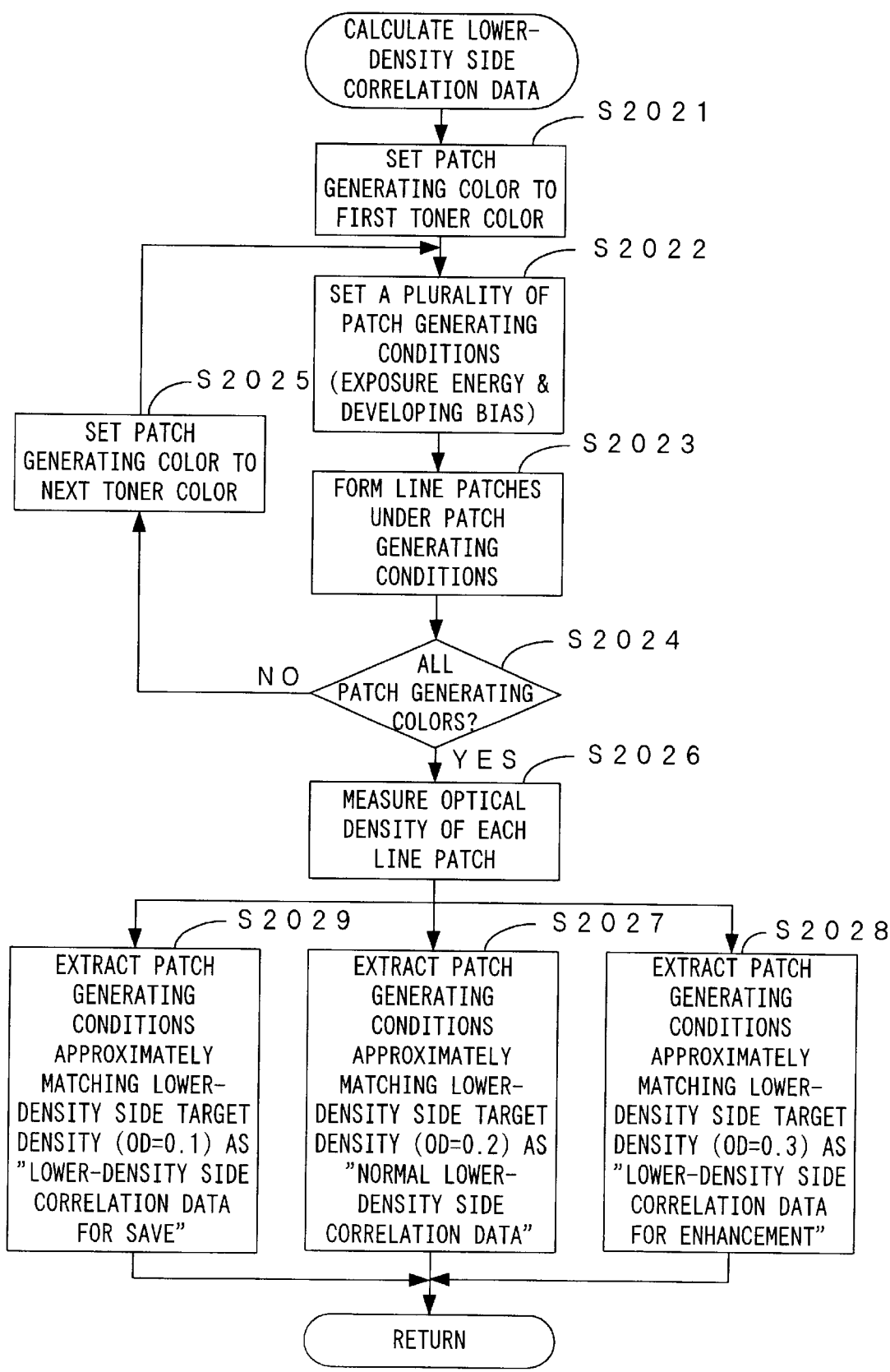
FIG. 69 is a flow chart showing the sequence of deriving the lower-density side correlation data in the thirteenth preferred embodiment.

More specifically, the lower-density side correlation data are calculated while the control unit 1 controls the respective portions of the apparatus in accordance with the sequence shown in the flow chart in FIG. 69.

FIG. 69 is a flow chart showing the sequence of deriving the lower-density side correlation data in the thirteenth preferred embodiment. First, the color in which patch images are to be formed is set to the first color, for example, black (K) (Step S2021). The charging bias is set to the initial value and a plurality of patch generating conditions are set (Step S2022). In this embodiment, the exposure energy E is changed to E1, E2, . . . , Em, and the developing bias Vb is changed to Vb(1), Vb(2), . . . , Vb(6) as in the case of deriving the higher-density side correlation data.

While serially forming 1-on-5-off line patch images LI as that shown in FIG. 7 on the photosensitive member 2 under these patch generating conditions, each patch image is primarily transferred onto the outer circumferential surface of the intermediate transfer belt 71 (Step S2023).

At the next step S2024, whether patch images area formed in all toner colors or not is judged. While the judgment remains "NO," the patch generating color is set to the next color (Step S2025) and the steps S2022 and S2023 are repeated, whereby line patch images in the other toner colors, namely, cyan (C), magenta (M) and yellow (Y) are further formed on the outer circumferential surface of the intermediate transfer belt 71.

Conversely, if it is judged "YES" at the step S2024, the patch sensor PS measures the optical densities of the respective line patch images (Step S2026).

Following this, at the step S2027, patch generating conditions matching with the lower-density side target density (OD=0.2) which is a reference target density are extracted as "normal lower-density side correlation data." For example, as shown in FIGS. 62B, 64B and 66B, when line patch images generated under patch generating conditions (E1, Vb(2)), (E2, Vb(3)), . . . among the line patch images generated under the respective patch generating conditions (E, Vb) match with the lower-density side target density, these conditions (E1, Vb(2)), (E2 Vb(3)), . . . are determined the normal lower-density side correlation data.

Meanwhile, at the step S2028, patch generating conditions matching with the lower-density side target density (OD=0.3) which is a user's target density for the third and the fifth user modes are extracted as "lower-density side correlation data for enhancement." For example, as shown in FIGS. 65A and 67A, when line patch images generated under the patch generating conditions (E2, Vb(1)), (Em, Vb(4)), . . . among the line patch images generated under the respective patch generating conditions (E, Vb) match with the lower-density side target density, these conditions (E2, Vb(1)), (Em, Vb(4)), . . . are determined the lower-density side correlation data for enhancement.

Further, at the step S2029, patch generating conditions matching with the lower-density side target density (OD=0.1) which is a user's target density for the first and the sixth user modes are extracted as "lower-density side correlation data for save." For example, as shown in FIGS. 63A and 68A, when line patch images generated under the patch generating conditions (E1, Vb(2)), . . . among the line patch images generated under the respective patch generating conditions (E, Vb) match with the lower-density side target density, these conditions (E1, Vb(2)), . . . are determined the lower-density side correlation data for sa Luke.

As the six types of correlation data are calculated in this manner, the steps S203 through S209 shown in FIG. 60 are executed to thereby calculate optimal values of the density adjustment factors (the exposure energy and the developing bias) in the first to the sixth user modes and stored in the memory 127.

Step S203: Normal Mode

At the step S203, a product set of the normal higher-density side correlation data and the normal lower-density side correlation data is calculated. For example, when the higher-density side correlation data and the lower-density side correlation data are calculated as shown in FIGS. 62A and 62B, respectively, a product set of the normal higher-density side correlation data and the normal lower-density side correlation data is correlation data (E2, Vb(3)) (FIG. 62C). In response, the exposure energy E2 and the developing bias Vb(3) are set respectively as an optimal exposure energy and an optimal developing bias in the normal mode and stored in the memory 127.

Step S204: First User Mode

At the step S204, a product set of the normal higher-density side correlation data and the lower-density side correlation data for save is calculated. For example, when the higher-density side correlation data and the lower-density side correlation data are calculated as shown in FIGS. 63A and 63B, respectively, a product set of the normal higher-density side correlation data and the lower-density side correlation data for save is correlation data (E1, Vb(2)) (FIG. 63C). In response, the exposure energy E1 and the developing bias Vb(2) are set respectively as an optimal exposure energy and an optimal developing bias in the first user mode and stored in the memory 127.

Step S205: Second User Mode

At the step S205, a product set of the higher-density side correlation data for enhancement and the normal lower-density side correlation data is calculated. For example, when the higher-density side correlation data and the lower-density side correlation data are calculated as shown in FIGS. 64A and 64B, respectively, a product set of the higher-density side correlation data for enhancement and the -normal lower-density side correlation data is correlation data (E1, Vb(1)) (FIG. 64C). In response, the exposure energy E1 and the developing bias Vb(1) are set respectively as an optimal exposure energy and an optimal developing bias in the second user mode and stored in the memory 127.

Step S206: Third User Mode

At the step S206, a product set of the normal higher-density side correlation data and the lower-density side correlation data for enhancement is calculated. For example, when the higher-density side correlation data and the lower-density side correlation data are calculated as shown in FIGS. 65A and 65B, respectively, product set of the normal higher-density side correlation data and the lower-density side correlation data for enhancement is correlation data (Em, Vb(4)) (FIG. 65C). In response, the exposure energy Em and the developing bias: Vb(4) are set respectively as an optimal exposure energy and an optimal developing bias in the third user mode and stored in the memory 127.

Step S207: Fourth User Mode

At the step S207, a product set of the higher-density side correlation data for save and the normal lower-density side correlation data is calculated. For example, when the higher-density side correlation data and the lower-density side correlation data are calculated as shown in FIGS. 66A and 66B, respectively, a product set of the higher-density side correlation data for save and the normal lower-density side correlation data is correlation data (Em, Vb(6)) (FIG. 66C). In response the exposure energy Em and the developing bias Vb(6) are set respectively as an optimal exposure energy and an optimal developing bias in the fourth user mode and stored in the memory 127.

Step S208: Fifth User Mode

At the step S208, a product set of the higher-density side correlation data for enhancement and the lower-density side correlation data for enhancement is calculated. For example, when the higher-density side correlation data and the lower-density side correlation data are calculated as shown in FIGS. 67A and 67B, respectively, no product set of the higher-density side correlation data for enhancement and the lower-density side correlation data for enhancement exists. Hence, correlation data (E3, Vb(1.5)) are calculated through complementary processing based on approximate correlation data (FIG. 67C). In response, the exposure energy E3 and the developing bias Vb(1.5) are set respectively as an optimal exposure energy and an optimal developing bias in the fifth user mode and stored in the memory 127.

Step S209: Sixth User Mode

At the step S209, a product set of the higher-density side correlation data for save and the lower-density side correlation data for save is calculated. For example, when the higher-density side correlation data and the lower-density side correlation data are calculated as shown in FIGS. 68A and 68B, respectively, a product set of the higher-density side correlation data for save and the lower-density side correlation data for save is an empty set as in the fifth user mode. Hence, correlation data (E1.5, Vb(4.5)) are calculated through complementary processing based on approximate correlation data (FIG. 68C). In response, the exposure energy E1.5 and the developing bias Vb(4.5) are set respectively as an optimal exposure energy and an optimal developing bias in the sixth user mode and stored in the memory 127.

The foregoing has described the thirteenth preferred embodiment in relation to examples that correlation data belonging to a product set are only one piece of correlation data in any one of the normal, the first to the fourth user modes. If there are a plurality pieces of correlation data, one piece of correlation data belonging to the product set may be selected and the exposure energy and the developing bias constituting this correlation data may be set respectively as an optimal exposure energy and an optimal developing bias. Further, even when the product set is an empty set as in the fifth and the sixth user modes, an optimal exposure energy and an optimal developing bias may be calculated through calculation based on approximate correlation data.

As described above, actual printing is performed after setting and storing optimal values of the density adjustment factor (an optimal exposure energy and an optimal developing bias) in the normal, the first to the sixth user modes in the manner above according to the thirteenth preferred embodiment. When the normal mode is selected, the exposure energy E2 and the developing bias Vb(3) are read from the memory 127 and printing is executed after these as set respectively as the exposure energy and the developing bias. On the other hand, one of the first to the sixth user modes is selected, an optimal exposure energy and an optimal developing bias corresponding to the selected user mode are read from the memory 127 and printing is executed after these as set respectively as the exposure energy and the developing bias.

The apparatus controls the exposure energy and the developing bias serving as the density adjustment factors which influence the image densities of toner images to thereby adjust the image densities of toner images formed on the photosensitive member 2 to the reference target densities in this manner. Furthermore, in the preferred embodiments described above, the density adjustment factors are modified and set in accordance with a necessity so that toner images are formed on the photosensitive member 2 at the user's target densities which meet a user's request. In short, appropriately setting the user mode makes it possible to modify and set the image densities of toner images on the lower-density side and/or the higher-density side. Hence, the image densities of the toner images are controlled properly while flexibly responding to the user's request.

For instance, when the second, the third or the fifth user mode is selected, the user's target densities are set higher than the reference target densities on the lower-density side and/or the higher-density side, so that it is possible to form darker images than in the normal mode. When the third user mode is selected, in particular, even though the image densities of solid images remain the same as those in the normal mode, line images are printed dark and thin lines show darker than the reference target densities and clearer, and therefore, the third user mode can be the most appropriate for a user who prints out a CAD view or an image with a number of characters.

On the other hand, when the first, the fourth or the sixth user mode is selected, the user's target densities are set lower than the reference target densities on the lower-density side and/or the higher-density side, so that it is possible to form darker toner images than in the normal mode and hence suppress the consumption of the toner. In other words, these user modes function as so-called a toner save mode and realized better effects than conventional toner save modes as described below.

If the objective is to simply reduce the consumption of the toner, as has been practiced already, dots may be pulled out at a certain rate from a dot image of an original image so that the toner is saved. However, since conventional techniques demand to simply skip dots from a dot image, in the case of a lower-density image of a character or a thin line, some data become missing and characters or the like become illegible. Further, in the case of a higher-density image such as a solid image, since the image is expressed by half-tone dots, a toner save mode creates a failure of realizing gradation and makes the image unnatural. Thus, there is a problem with simple skipping of dots that the presentation of image can not be maintained in a real sense.

In contrast, since this embodiment allows to suppress the consumption of the toner by means of adjusted image densities without skipping dots from a dot image of an original image, it is possible to form an image while maintaining the presentation of image created in the normal mode.

Further, the fourth user mode in particular among these user modes, is designed to form toner images at the user's target density which is lower than the higher-density side target density among the reference target densities as to the higher-density side while maintaining the image densities which are the same as the reference target density on the lower-density side. Therefore, this mode not only allows to reduce the consumption of the toner but is particularly excellent in terms of image quality.

This is due to a fact that while a reduction in toner consumption may be achieved by lowering image densities uniformly over the entire density range as in the sixth user mode for instance, once the image densities are reduced in such a manner, it sometimes becomes impossible to correctly reproduce lower-density images such as characters and thin lines so that the images become blurred, for example, and hence illegible. In contrast, since the fourth user mode requires to form toner images in the respective toner colors at the same target density (OD=0.2) as in the normal mode on the lower-density side, it is possible to ensure that lower-density images of characters, thin lines and the like in particular are by no means inferior in legibility than in the normal mode. As to the higher-density side, meanwhile, with the target density reduced down to "0.8" from "1.2," the consumption of the toner is positively suppressed, whereby the toner is saved effectively.

Further, this embodiment achieves the following effect. Between image forming apparatuses of the electrophotographic type, because of differences between the individual apparatuses, a change with time or fatigue of a photosensitive member and toner, a change in temperature and humidity around the apparatus, etc., the image densities of toner images may become different in some cases. However, according to the thirteenth preferred embodiment, since optimal values of the density adjustment factors for each user mode are calculated by so-called patching sensing prior to execution of each user mode, it is possible to form images stably at the target densities for toner save over a wide density range from a low density to a high density without influenced by differences between the individual apparatuses, etc.

N. Fourteenth Preferred Embodiment

By the way, optimal values of the density adjustment factors for each user mode are calculated directly based on the image densities of patch images in the thirteenth preferred embodiment, optimal values of the density adjustment factors for each user mode may be calculated by correcting optimal values of the density adjustment factors for the normal mode calculated by so-called patch sensing method as described below. In short, according to a fourteenth preferred embodiment, optimal values of the density adjustment factors for each user mode are calculated indirectly based on patch images. Now, the fourteenth preferred embodiment will be described with reference to FIGS. 70 through 78. Since the mechanical and electrical structures of an image forming apparatus according to the fourteenth preferred embodiment are the same as those according to the thirteenth preferred embodiment, these structures will be denoted at the same reference symbols as those used for the first preferred embodiment but will not be described again.

Figure 70:
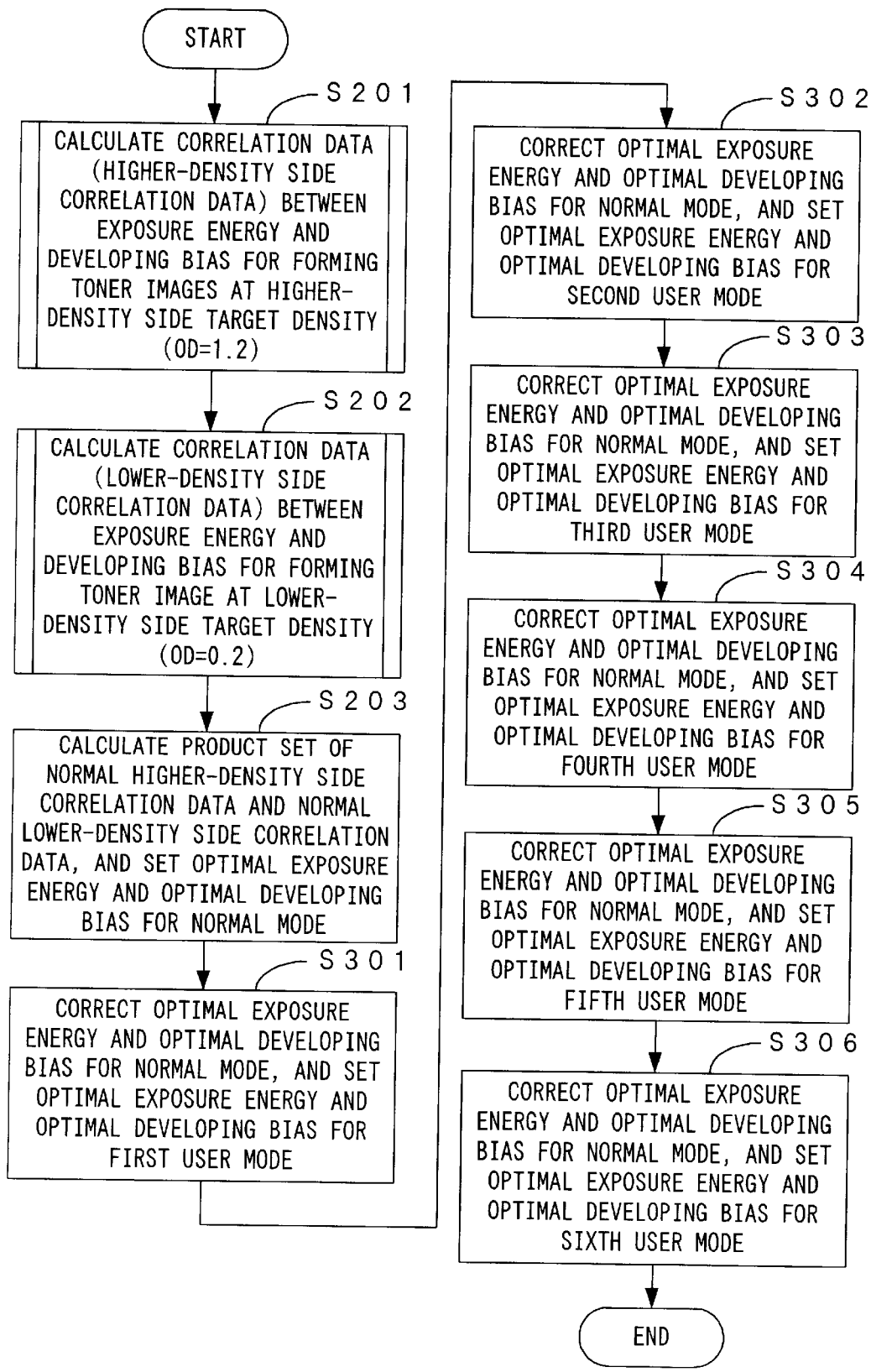
FIG. 70 is a flow chart showing optimization of density adjustment factors according to the fourteenth preferred embodiment.

FIG. 70 is a flow chart showing optimization of density adjustment factors according to the fourteenth preferred embodiment. In the fourteenth preferred embodiment, first, patch sensing method is performed to thereby calculate correlation data between the exposure energy E and the developing bias Vb for forming a toner image at a higher-density side target density (OD=1.2) of a reference target density as "normal higher-density side correlation data" (Step S201) and calculate correlation data between the exposure energy E and the developing bias Vb for forming a toner image at a lower-density side target density (OD 0.2) of the reference target density as "normal lower-density side correlation data" (Step S202). Following this, a product set of the normal higher-density side correlation data and the normal lower-density side correlation data is calculated, and optimal values of the density adjustment factors (the exposure energy E2 and the developing bias Vb(3)) in the normal mode are calculated and stored in the memory 127 (Step S203). A series of patch sensing method processing is the same as those in the thirteenth preferred embodiment, and therefore, will not be described again.

Next, the optimal exposure energy E2 and the optimal developing bias Vb(3) for the normal mode obtained in the manner above are corrected based on a photo-induced discharge characteristic of the photosensitive member 2, thereby calculating optimal valuer of the density adjustment factors (optimal exposure energies and optional developing biases) in the respective user modes (Step S301 to Step S306). Now, the fourth user mode which is the best as a toner save mode will be described first.

Step S304: Fourth User Mode

In the fourth user mode, as shown in Table 1, the lower-density side target density is controlled to the optical density of OD=0.2 which is the same as the reference target density while the higher-density side target density is set lower than the reference target density so that relatively light toner images will be formed. The exposure energy is then corrected to a higher value than the optimal exposure energy E2 which is for the normal mode, and the absolute value of the developing bias is set to a lower value than the absolute value of the optimal developing bias Vb(3) which is for the normal mode. This mode further requires that the corrected exposure energy and the corrected developing bias satisfy the normal higher-density side correlation data. The reason of this correction is as described below.

Figure 71:
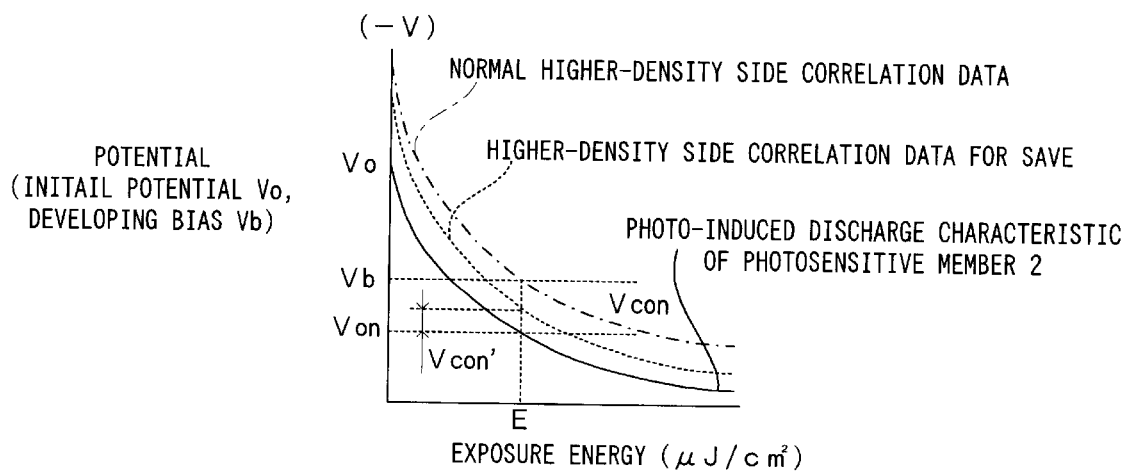
Figure 72:
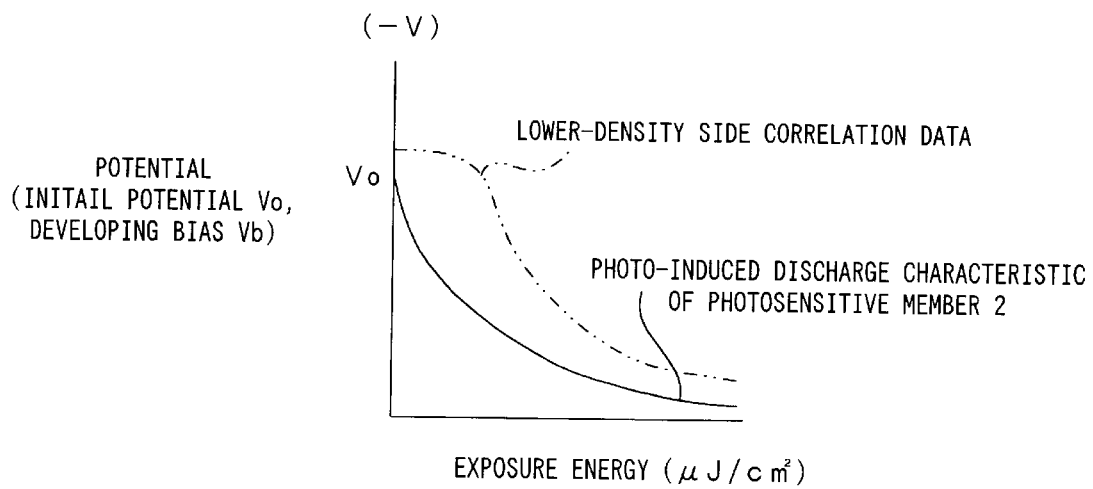

FIG. 71 is a graph showing a relationship between a photo-induced discharge characteristic of a photosensitive member and higher-density side correlation data, wherein the solid line denote the photo-induced discharge characteristic of the photosensitive member 2. As can be seen from the solid line in FIG. 71, the photosensitive member 2 charged by the charging unit 3 has a surface potential of Vo, and when a latent image corresponding to a solid image is formed as the light beam L is irradiated with the exposure energy E upon the photosensitive member 2, a surface potential in the portion bearing the latent image is an exposed area potential Von.

Figure 73:
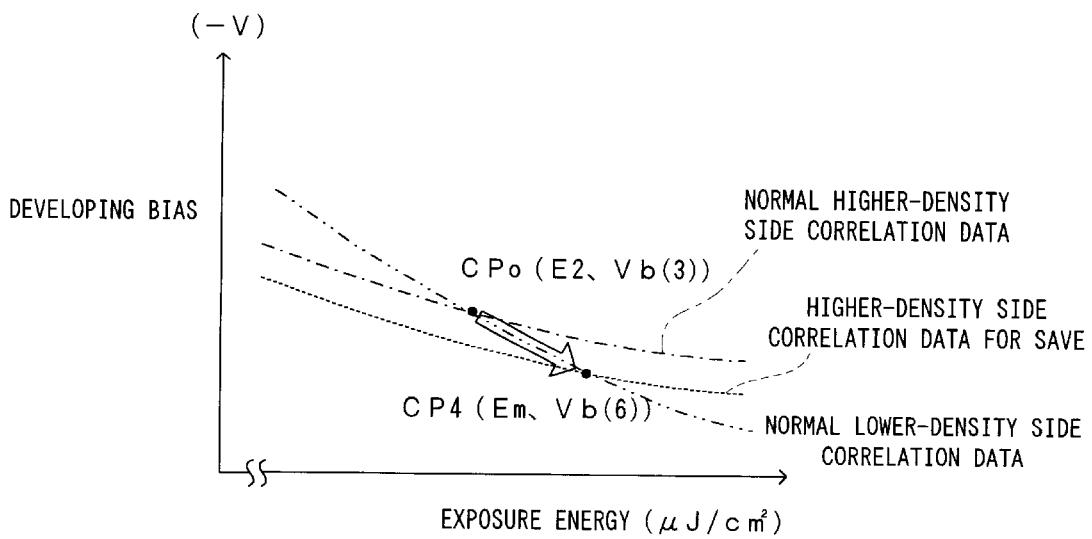
FIGS. 73 to 78 are schematic diagrams showing the correction of obtaining an optimal exposure energy and an optimal developing bias in the fourteenth preferred embodiment.

By the way, to obtain a toner image at the higher-density side target density, it is necessary to have toner adhering to the surface of the photosensitive member 2 in a predetermined quantity (The correlation between target densities and adhering toner quantities is already known.). Thus, the predetermined quantity of the toner is necessary to form toner images at the higher-density side target density (OD= 1.2) of the reference target density. Assuming that a contrast potential (=|(the developing bias)–(the exposed area potential of the photosensitive member 2)|) corresponding to this toner adhesion quantity is a potential Vcon, with the exposure energy E and the developing bias Vb set such that a difference between the exposed area potential Von and the developing bias Vb is the contrast potential Vcon as denoted at the dotted-and-dashed line in FIG. 71, it is possible to form a toner image at the higher-density side target density. That is, the step 5201 described above is nothing but calculation of the normal higher-density side correlation data which are denoted at the dotted-and-dashed line in FIG. 71 based on the photo-induced discharge characteristic of the photosensitive member 2. In addition, as to calculation of the normal lower-density side correlation data by patch sensing method at the step S202, this as well is nothing but calculation of the normal lower-density side correlation data which are denoted at the double-dotted-and-dotted-and-dashed line in FIG. 72 based on the photo-induced discharge characteristic of the photosensitive member 2. Hence, with respect to optimal values in the normal mode, as shown in FIG. 73, an intersection CPn of the dotted-and-dashed line which represents the higher-density side correlation data and the double-dotted-and-dashed line which represents the lower-density side correlation data may be identified, and the exposure energy E2 and the developing bias Vb(3) corresponding to the intersection CPn may be set respectively as an optimal exposure energy and an optimal developing bias and stored in the memory 127 (Step S203).

In contrast, a toner adhesion quantity needed to form a toner image the higher-density side target density (OD=0.8) of a user's target density for the fourth user mode is fewer than that corresponding to a normal target density, which naturally reduces a contrast potential at this toner adhesion quantity. Assuming that this contrast potential is a potential Vcon' (<Vcon), with the exposure energy E and the developing bias Vb set such that a difference between the exposed area potential Von and the developing bias Vb is the contrast potential Vcon' as denoted at the dotted line in FIG. 71, it is possible to form a toner image at the higher-density side target density for the fourth user mode. This dotted line is the very linear curve which represents the higher-density side correlation data for save. Hence, optimal values in the fourth user mode are an intersection CP4 of the higher-density side correlation data for save (dotted line) and the lower-density side correlation data for save (double-dotted-and-dotted-and-dashed line) as shown in FIG. 73. In short, an optimal exposure energy in the user mode is a higher value Em than the optimal exposure energy E2 which is for the normal mode and the absolute value of the developing bias in the user mode is a lower value Vb(6) than the absolute value of the developing bias Vb(3) which is for the normal mode.

Thus, only if the higher-density side target density of the user's target density for the fourth user mode is determined, without taking a trouble of calculating the higher-density side correlation data for save by patch sensing method, optimal values in the fourth user mode are calculated merely by correcting optimal values in the normal mode based on the photo-induced discharge characteristic of the photosensitive member 2 as described above.

With respect to the other user modes as well, correction of optimal values in the normal mode based on the photo-induced discharge characteristic of the photosensitive member 2 makes it possible to calculate optimal values in each user mode, as in the fourth user mode. That is, optimal values in the first to the third, the fifth and the sixth user modes are as described below.

Step S301: First User Mode

Figure 74:
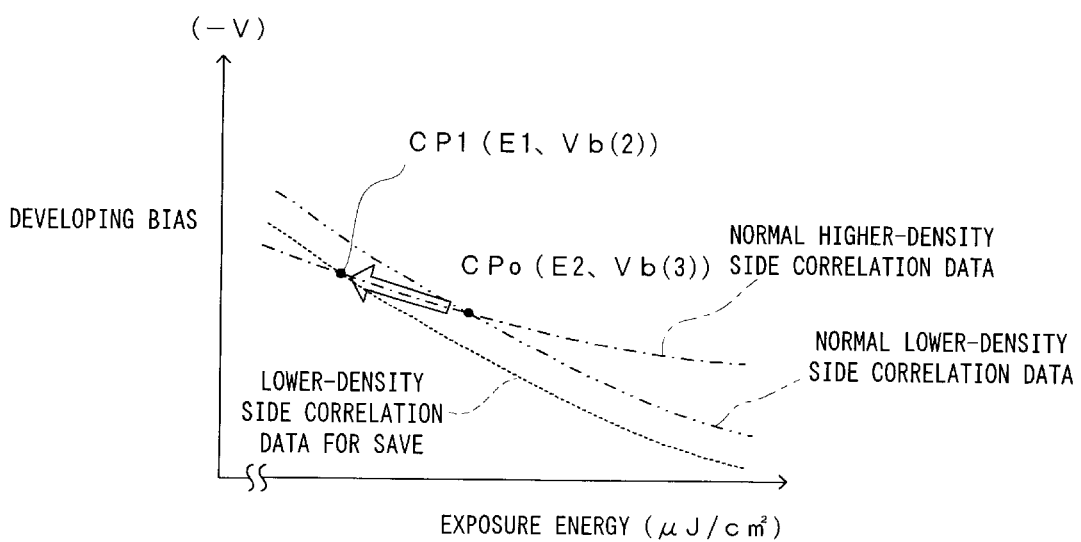

In the first user mode, as shown in FIG. 74, the exposure energy is corrected to the value E1 which is lower than the optimal exposure energy E2 which is for the normal mode and the absolute value of the developing bias is corrected to the value Vb(2) which is higher than the absolute value of the developing bias Vb(3) which is for the normal mode. This mode further requires that the corrected exposure energy E1 and the corrected developing bias Vb(2) satisfy the normal higher-density side correlation data.

Step S302: Second User Mode

Figure 75:
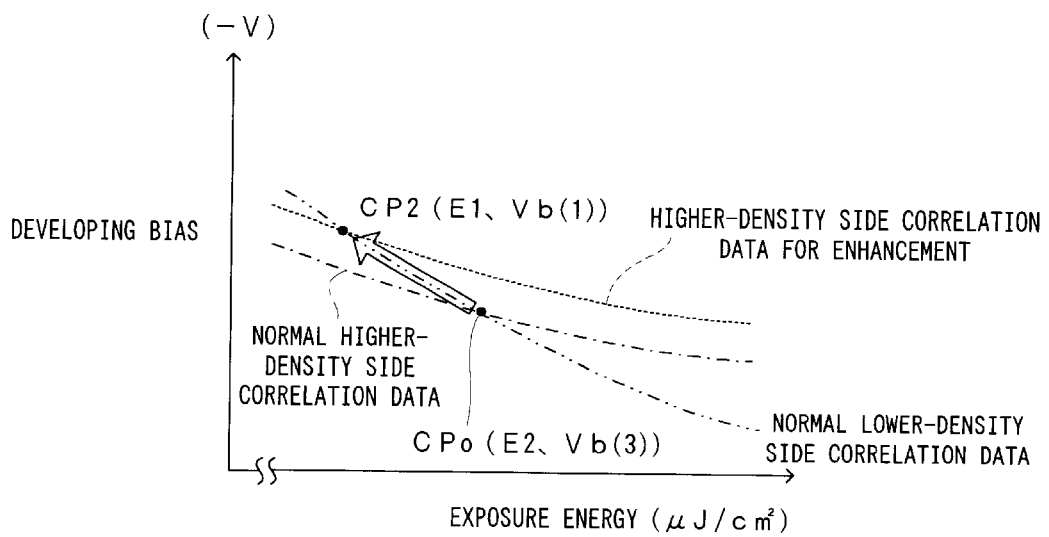

In the second user mode, as shown in FIG. 75, the exposure energy is corrected to the value E1 which is lower than the optimal exposure energy E2 which is for the normal mode and the absolute value of the developing bias is corrected to the value Vb(1) which is higher than the absolute value of the developing bias Vb(3) which is for the normal mode. This mode further requires that the corrected exposure energy E1 and the corrected developing bias Vb(1) satisfy the normal lower-density side correlation data.

Step S303: Third User Mode

Figure 76:
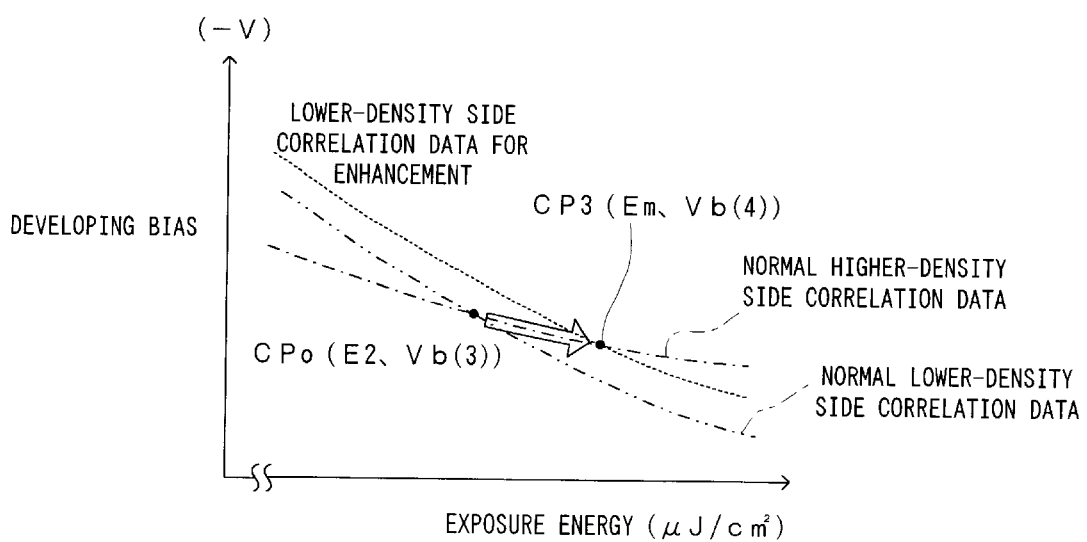

In the third user mode, as shown in FIG. 76, the exposure energy is corrected to the value Em which is higher than the optimal exposure energy E2 which is for the normal mode and the absolute value of the developing bias is corrected to the value Vb(4) which is lower than the absolute value of the developing bias Vb(3) which is for the normal mode. This mode further requires that the corrected exposure energy Em and the corrected developing bias Vb(4) satisfy the normal higher-density side correlation data.

Step S305: Fifth User Mode

Figure 77:
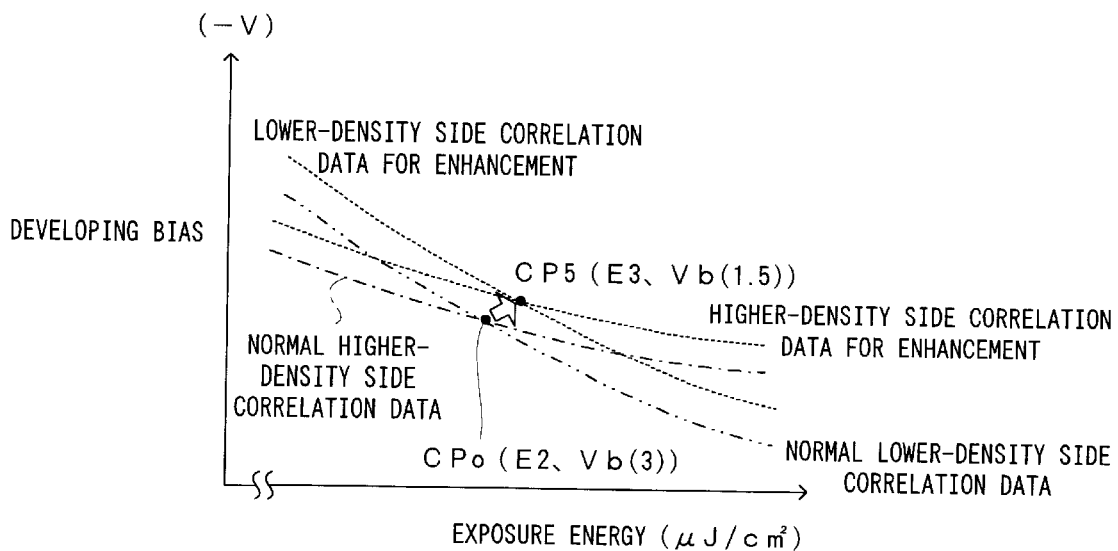

In the fifth user mode, as shown in FIG. 77, the exposure energy is corrected to the value E3 which is higher than the optimal exposure energy E2 which is for the normal mode and the absolute value of the developing bias is corrected to the value Vb(1.5) which is higher thank the absolute value of the developing bias Vb(3) which is for the normal mode.

Step S306: Sixth User Mode

Figure 78:
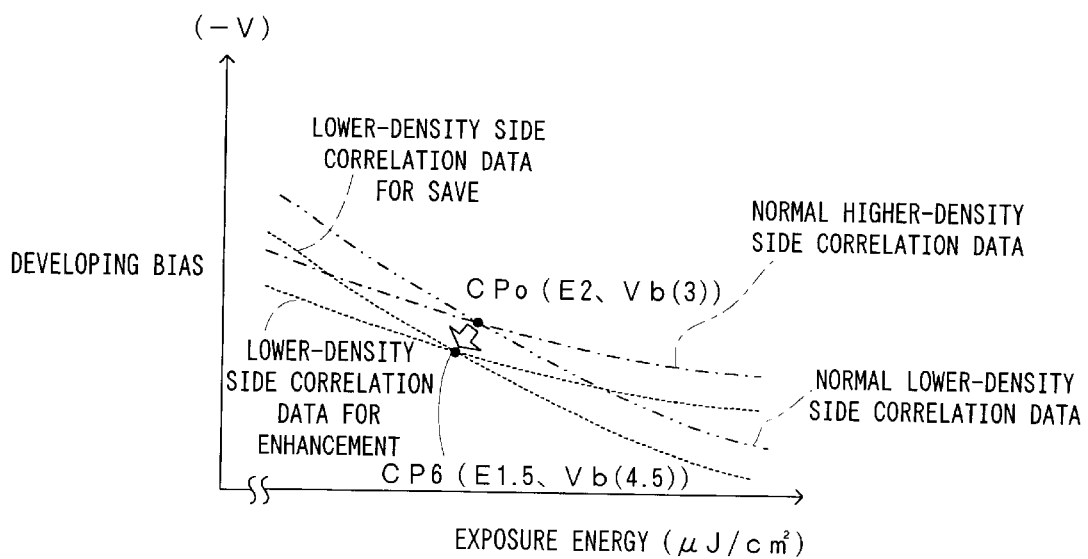

In the sixth user mode, as shown in FIG. 78, the exposure energy is corrected to the value E1.5 which is lower than the optimal exposure energy E2 which is for the normal mode and the absolutely value of the developing bias is corrected to the value Vb(4.5) which is lower than the absolute value of the developing bias Vb(3) which is for the normal mode.

As described above, according to the fourteenth preferred embodiment as well, as in the thirteenth preferred embodiment, the density adjustment factors are modified and set in accordance with a necessity and toner images are accordingly formed on the photosensitive member 2 at image densities which meet a user's request. In short, appropriately setting the user mode makes it possible to modify and set the image densities of toner images on the lower-density side and/or the higher-density side. Hence, the image densities of the toner images are controlled properly while flexibly responding to the user's request.

In the fourteenth preferred embodiment, since the optimal values for the user modes are calculated merely by correcting the optimal values for the normal mode without calculating the higher-density side correlation data for enhancement, the higher-density side correlation data for save, the lower-density side correlation data for enhancement and the lower-density side correlation data for save, the amount of calculation is smaller than in the thirteenth preferred embodiment, which in turn reduces a load upon the control unit 1. Although the optimal values of the density adjustment factors are not calculated directly based on the image densities of patch images during calculation of the optimal values for the respective user modes, since the optimal values of the density adjustment factors are calculated based on the optimal values for the normal mode which are calculated by so-called patch sensing method, the image densities of patch images are utilized indirectly. Hence, in a manner approximately similar to that in the thirteenth preferred embodiment, it is possible to form images at the user's target densities in a wide density range from a low density to a high density without influenced by differences between the individual apparatuses, etc.

Although the thirteenth and the fourteenth preferred embodiments described above use the optical densities of OD=1.3, 1.2 and 0.8 as the higher-density side target densities in the respective modes and the optical densities of OD=0.3, 0.2 and 0.1 as the lower-density side target densities in the respective modes, the values to which the respective target densities are set are not limited to these but may be freely set. The types of the target densities are also optional. In other words, although the preferred embodiments above prepare two types of densities, i.e., the higher-density side target densities and the lower-density side target densities, for each one of the reference target densities and the user's target densities, it is needless to mention that both the reference target densities and the user's target densities may be target densities of only one type, three types or more types.

Further, although the user modes and the user's target densities are associated with each other in advance and the user's target densities are modified and set depending on the selection of mode in the thirteenth and the fourteenth preferred embodiments described above, the user's target densities may be directly modified and set.

Further, although the exposure energy of the light beam L and a developing bias are used as the density adjustment factors in the thirteenth and the fourteenth preferred embodiments described above, the types and the number of the density adjustment factors may be freely determined. The density adjustment factors may include a charging bias, a transfer bias and the like in addition to an exposure energy and a developing bias. The present invention is applicable to image forming apparatuses in which only one density adjustment factor is controlled or more than one density adjustment factors are controlled in combination.

O. Others

Figure 79:
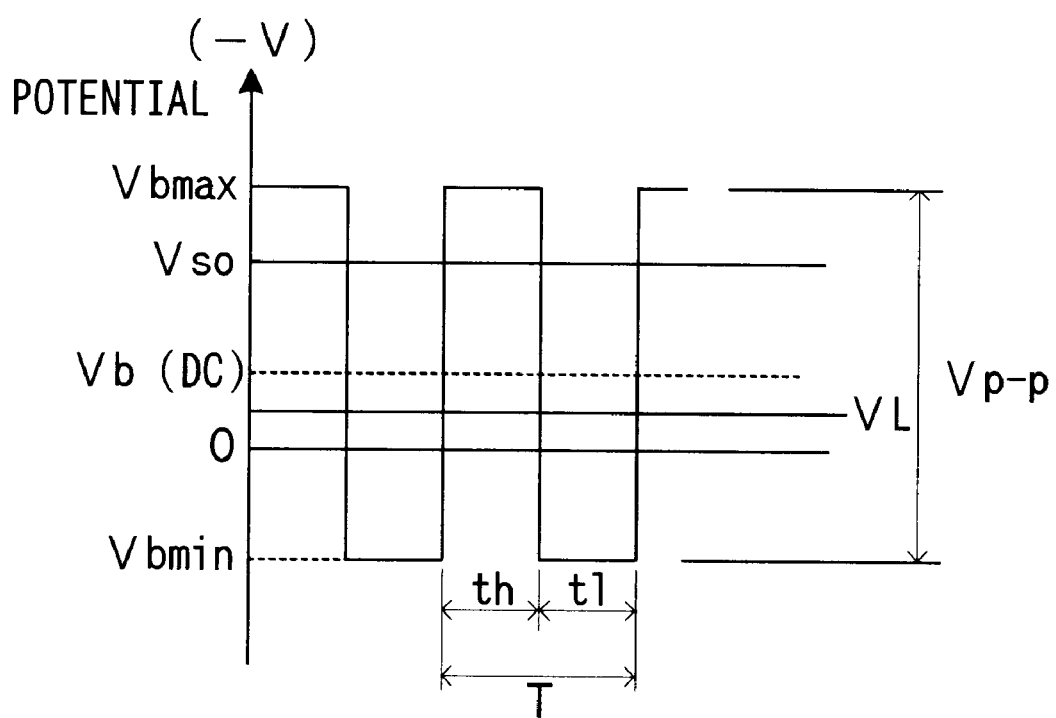
FIG. 79 shows a developing bias which is obtained by superposing an AC component over a DC component Vb(DC).

The present invention is not limited to the preferred embodiments described above, but may be modified in a variety of manners other than those described above to the extent not deviating from the object of the invention. For example, a developing bias containing a DC component is applied to the developer unit 4 in the preferred embodiments described above, a developing bias which is obtained by superposing an AC component over a DC component Vb(DC) as that shown in FIG. 79 may be applied. Where such a developing bias is used, for the purpose of controlling the developing bias to an optimal developing bias, the DC component Vb(DC) may be modified, or a peak-to-peak voltage p-p of the AC component may be modified while fixing the DC component Vb(DC), or further alternatively, a ratio between a higher-potential period th and a lower-potential period t1 during one cycle T of the AC component (duty) may be modified. Instead, both the peak-to-peak voltage, p-p and this ratio (duty) may be controlled while fixing the DC component Vb(DC). Still another alternative is to control the frequency of the AC component.

The developing bias in such a case may be considered to be a time-average value of the voltages applied to the developers. For instance, under the following bias condition, Direct current bias: −200 V, Alternate current bias: Waveform . . . rectangle, Frequency . . . 2 kHz, Duty . . . 50%, Peak-to-peak voltage . . . 1.6 V, the developing bias is −200 V.

Further, although the preferred embodiments described above use the optical density of OD=1.2 as the higher-density side target density (in the normal mode) and the optical density of OD=0.2 as the lower-density side target density (in the normal mode), the values to which the respective target densities are set are not necessarily limited to these.

Further, although the preferred embodiments described above are related to an image forming apparatus which is capable of forming a color image using four toner colors, applications of the present invention are not limited to this. The present invention is applicable of course to image forming apparatuses in which form only monochrome images. In addition, the image forming apparatuses according to the preferred embodiments described above are printers which print an image supplied from an external apparatus such as a host computer through the interface 112 on a sheet such as a copier paper, a transfer paper, a paper and a transparency for an overhead projector, the present invention is generally applicable to image forming apparatuses of the electrophotographic type such as copier machines and facsimile machines.

Further, although toner images on the photosensitive member 2 are transferred onto the intermediate transfer belt 71, the toner images are used as patch images, the optical densities of the patch images are detected and an optimal exposure energy and an optimal developing bias are calculated based on the result of the detection in the preferred embodiments described above, the present invention is applicable to an image forming apparatus in which a toner image is transferred onto other image carrier except for an intermediate transfer belt (transfer drum, transfer belt, transfer sheet, intermediate transfer drum, reflection-type recording sheet, transmission-type recording sheet, etc.) and a patch image is accordingly formed.

When a plurality of solutions are obtained by a patch sensing method, any desired solution may be selected. It is however desirable to select a solution of the exposure energy which is two to five times, more preferably three to four times as large as a so-called half value exposure energy E1/2 of the photosensitive member, whereby the tone resolution of images improves.

Furthermore, while lower-density patches are formed after forming higher-density patches in the preferred embodiments described above, patches mixing these may be formed and sensed.

What is claimed is:

1. An image forming apparatus, comprising:
  a photosensitive member;
  charging means which charges a surface of said photosensitive member;
  exposure means which irradiates a light beam over the surface of said photosensitive member which is charged by said charging means and accordingly forms an electrostatic latent image;
  developer means which visualizes said electrostatic latent image with toner and accordingly forms a toner image; and
  control means which optimizes a plurality of density adjustment factors each influencing the image densities of toner images and accordingly controls the image density of said toner image formed by said developer means, wherein
  said control means sets one piece of correlation data belonging to the product set of lower-density side correlation data and higher-density side correlation data, as optimal values of said plurality of density adjustment factors, said lower-density side correlation data being between said plurality of density adjustment factors and for forming a toner image at a lower-density side target density, said higher-density side correlation data being between said plurality of density adjustment factors and for forming a toner image at a higher-density side target density which is higher than said lower-density side target density.

2. The image forming apparatus of claim 1, wherein said plurality of density adjustment factors are an exposure energy of said light beam and a developing bias which is supplied to said developer means.

3. The image forming apparatus of claim 2, wherein said control means calculates said lower-density side correlation data and said higher-density side correlation data based on a photo-induced discharge characteristic of said photosensitive member and a development γ characteristic of said developer means.

4. The image forming apparatus of claim 3, further comprising surface potential measuring means which measures a surface potential of said photosensitive member, and wherein
  said control means, while modifying and setting an exposure energy of said light beam to multiple levels, forms electrostatic latent images at various exposure energies and causes said surface potential measuring means to measure surface potentials of said electrostatic latent images, to thereby obtain said photo-induced discharge characteristic of said photosensitive member.

5. The image forming apparatus of claim 3, further comprising: an image carrier which carries a toner image formed on said photosensitive member; and density measuring means which measures the image density of a toner image formed on said photosensitive member or said image carrier, and wherein
  said control means, while modifying and setting said developing bias to multiple levels, forms toner images at various developing biases as patch images, causes said density measuring means to measure the image densities of said patch images, to thereby obtain said development γ characteristic.

6. The image forming apparatus of claim 2, further comprising memory means which stores optimal exposure energies and optimal developing biases at various film thickness values of said photosensitive member while associating said optimal exposure energies and said optimal developing biases with said film thickness values, and wherein
  said control means comprises:
    film thickness deriving means which calculates the film thickness of said photosensitive member; and
    optimization means which reads an optimal exposure energy and an optimal developing bias which correspond to the film thickness of said photosensitive member which is calculated by said film thickness deriving means, and sets these respectively as said optimal exposure energy and said optimal developing bias.

7. The image forming apparatus of claim 2, further comprising: an image carrier which carries a toner image which is formed on said photosensitive member; and density measuring means which measures the image density of a toner image formed on said photosensitive member or said image carrier, and wherein
  said control means, while modifying and setting a combination of said exposure energy and said developing bias to multiple levels, forms first toner images with various combinations as higher-density patch images, causes said density measuring means to measure the image densities of said higher-density patch images and determines that combinations, which allow the image densities to approximately match with said higher-density side target density, are said higher-density side correlation data, and
  said control means, while modifying and setting a combination of said exposure energy and said developing bias to multiple levels, forms second toner images whose densities are lower than those of said first toner images with various combinations as lower-density patch images, causes said density measuring means to measure the image densities of said lower-density patch images and determines that combinations, which allow the image densities to approximately match with said lower-density side target density, are said lower-density side correlation data.

8. The image forming apparatus of claim 7, wherein said control means, when a plurality pieces of correlation data are contained in said product set, selects such correlation data in which said exposure energy is two to five times as large as a half decay exposure energy of said photosensitive member as said one piece of correlation data.

9. The image forming apparatus of claim 7, wherein said control means, when a plurality pieces of correlation data are contained in said product set, selects such correlation data in which said exposure energy is three to four times as large as a half decay exposure energy of said photosensitive member as said one piece of correlation data.

10. The image forming apparatus of claim 2, wherein said control means is capable of changing said density adjustment factor within a predetermined programmable range and
said control means, when an optimal exposure energy or an optimal developing bias is outside said programmable range, modifies and sets a charging bias which is supplied to said charging means, optimizes said exposure energy and said developing bias at said modified charging bias, and accordingly updates said optimal exposure energy and said optimal developing bias.

11. The image forming apparatus of claim 10, wherein said control means, when said optimal exposure energy or an optimal developing bias is outside said programmable range, judges whether said optimal exposure energy or said optimal developing bias is beyond an upper limit value of said programmable range or below a lower limit value of said programmable range, and modifies and sets said charging bias in accordance with a result of said judgment.

12. The image forming apparatus of claim 2, wherein said control means provides said developer means with a bias which is obtained by superposing an AC component and a DC component with each other as said developing bias, controls at least one of said DC component, a peak-to-peak voltage of said AC component, a ratio between a higher-potential period and a lower-potential period during one cycle of said AC component and the frequency of said AC component, and adjusts said optimal developing bias.

13. The image forming apparatus of claim 1, wherein said plurality of density adjustment factors are a charging bias supplied to said charging means, an exposure energy of said light beam, and a developing bias supplied to said developer means.

14. The image forming apparatus of claim 13, wherein said control means calculates said lower-density side correlation data and said higher-density side correlation data based on a photo-induced discharge characteristic of said photosensitive member at various charging biases and a development γ characteristic of said developer means.

15. The image forming apparatus of claim 14, further comprising surface potential measuring means which measures a surfaced, potential of said photosensitive member, and wherein
said control means, while modifying and setting an exposure energy of said light beam to multiple levels with a charging bias fixed, forms electrostatic latent images at various exposure energies and causes said surface potential measuring means to measure surface potentials of said electrostatic latent images, to thereby obtain the photo-induced discharge characteristic of said photosensitive member at said charging bias.

16. The image forming apparatus of claim 14, further comprising:
an image carrier which carries a toner image which is formed on said photosensitive member; and density measuring means which measures the image density of a toner image formed on said photosensitive member or said image carrier, and wherein
said control means, while modifying and setting said developing bias to multiple levels, forms toner images at various developing biases as patch images, causes said density measuring means to measure the image densities of said patch images, to thereby obtain said development γ characteristic.

17. The image forming apparatus of claim 13, further comprising memory means which stores optimal charging biases, optimal exposure energies and optimal developing biases at various film thickness values of said photosensitive member while associating said optimal charging biases, said optimal exposure energies and said optimal developing biases with said film thickness values, and wherein
said control means comprises:
film thickness deriving means which calculates the film thickness of said photosensitive member; and
optimization means which reads a charging bias, an exposure energy and a developing bias which correspond to the film thickness of said photosensitive member which is calculated by said film thickness deriving means, and sets these respectively as said optimal charging bias, said optimal exposure energy and said optimal developing bias.

18. The image forming apparatus of claim 13, further comprising:
an image carrier which carries a toner image which is formed on said photosensitive member; and density measuring means which measures the image density of a toner image formed on said photosensitive member or said image carrier, and wherein
said control means, while modifying and setting a combination of said charging bias, said exposure energy and said developing bias to multiple levels, forms first toner images with various combinations as higher-density patch images, causes said density measuring means to measure the image densities of said higher-density patch images and determines that combinations, which allow the image densities to approximately match with said higher-density side target density, are said higher-density side correlation data, and said control means,
said control means, while modifying and setting a combination of said charging bias, said exposure energy and said developing bias to multiple levels, forms second toner images whose densities are lower than those of said first toner images with various combinations as lower-density patch images, causes said density measuring means to measure the image densities of said lower-density patch images and determines that combinations, which allow the image densities to approximately match with said lower-density side target density, are said lower-density side correlation data.

19. The image forming apparatus of claim 13, wherein said control means is capable of changing said density adjustment factor within a predetermined programmable range and
said control means calculates an optimal exposure energy and an optimal developing bias with a charging bias fixed, and when said optimal exposure energy or said optimal developing bias is outside said programmable range, judges whether said optimal exposure energy or said optimal developing bias is beyond an upper limit value of said programmable range or below a lower limit value of said programmable range, modifies and sets said charging bias in accordance with a result of said judgment, and calculates an optimal exposure energy and an optimal developing bias at said charging bias.

20. The image forming apparatus of claim 13, wherein said control means provides said developer means with a bias which is obtained by superposing an AC component and a DC component with each other as said developing bias, controls at least one of said DC component, a peak-to-peak voltage of said AC component, a ratio between a higher-potential period and a lower-potential period during one cycle of said AC component and the frequency of said AC component, and adjusts said optimal developing bias.

21. The image forming apparatus of claim 13, wherein said control means, when a plurality pieces of correlation data are contained in said product set, selects such correlation data in which said exposure energy is two to five times as large as a half decay exposure energy of said photosensitive member as said one piece of correlation data.

22. The image forming apparatus of claim 13, wherein said control means, when a plurality pieces of correlation data are contained in said product set, selects such correlation data in which said exposure energy is three to four times as large as a half decay exposure energy of said photosensitive member as said one piece of correlation data.

23. An image forming method in which a light beam is irradiated over a surface of a photosensitive member at an optimal exposure energy to form an electrostatic latent image, and said electrostatic latent image is visualized with toner while applying an optimal developing bias to developer means, said method comprising:
    a first step of calculating, as lower-density side correlation data, correlation data between exposure energies and developing biases which are necessary to form a toner image at a lower-density side target density;
    a second step of calculating, as higher-density side correlation data, correlation data between exposure energies and developing biases which are necessary to form a toner image at a higher-density side target density which is higher than said lower-density side target density;
    a third step of calculating a product set of said lower-density side correlation data and said higher-density side correlation data; and
    a fourth step of setting an exposure energy and a developing bias constituting one piece of correlation data belonging to the product set respectively as said optimal exposure energy and said optimal developing bias.

24. The image forming method of claim 23, wherein when said optimal exposure energy set at said fourth step outside a programmable range of said exposure energy or said optimal developing bias set at said fourth step is outside a programmable range of said developing bias, after modifying and setting a charging bias which is to be supplied to charging means for charging the surface of said photosensitive member prior to creation of an electrostatic latent image on said photosensitive member, said first to said fourth steps are executed once again to thereby update said optimal exposure energy and said optimal developing bias.

25. An image forming method in which after an optimal charging bias is supplied to charging means and a surface of a photosensitive member is charged, a light beam is irradiated over the surface of said photosensitive member with an optimal exposure energy to form an electrostatic latent image, and said electrostatic latent image is visualized with toner while applying an optimal developing bias to developer means, said method comprising:
    a first step of calculating, as lower-density side correlation data, correlation data between charging biases, exposure energies and developing biases which are necessary to form a toner image at a lower-density side target density;
    a second step of calculating, as higher-density side correlation data, correlation data between charging biases, exposure energies and developing biases which are necessary to form a toner image at a higher-density side target density which is higher than said lower-density side target density;
    a third step of calculating a product set of said lower-density side correlation data and said higher-density side correlation data; and
    a fourth step of setting a charging bias, an exposure energy and a developing bias constituting one piece of correlation data belonging to said product set respectively as said optimal charging bias, said optimal exposure energy and said optimal developing bias.

26. An image forming apparatus, comprising:
developer means which visualizes an electrostatic latent image formed on a photosensitive member with toner;
control means which sets a density adjustment factor influencing the image density of a toner image to a film-thickness-equivalent value which corresponds to the film thickness of said photosensitive member, and accordingly controls the image density of a toner image which is formed on said photosensitive member, and
memory means which stores film-thickness-equivalent values at various film thickness values of said photosensitive member while associating said film-thickness-equivalent values with said film thickness values, and wherein
said control means comprises:
    film thickness deriving means which calculates the film thickness of said photosensitive member; and
    optimization means which reads from said memory means a film-thickness-equivalent value corresponding to the film thickness of said photosensitive member calculated by said film thickness deriving means, and sets said density adjustment factor to this film-thickness-equivalent value,
the image forming apparatus further comprising:
    exposure means which irradiates a surface of said photosensitive member with a light beam and accordingly forms an electrostatic latent image, and wherein
    said control means determines that an exposure energy of said light beam and a developing bias which is supplied to said developer means are said density adjustment factor, and stores one piece of correlation data belonging to a product set of lower-density side correlation data and higher-density side correlation data as said film-thickness-equivalent value in said memory means, said lower-density side correlation data being between said plurality of density adjustment factors and for forming a toner image at a lower-density side target density, said higher-density side correlation data being between said plurality of density adjustment factors and for forming a toner image at a higher-density side target density which is higher than said lower-density side target density.

27. An image forming apparatus comprising:
developer means which visualizes an electrostatic latent image formed on a photosensitive member with toner;
control means which sets a density adjustment factor influencing the image density of a toner image to a film-thickness-equivalent value which corresponds to the film thickness of said photosensitive member, and accordingly controls the image density of a toner image which is formed on said photosensitive member, an image carrier which carries a toner image which is formed on said photosensitive member; and density measuring means which measures the image density of a toner image formed on said photosensitive member or said image carrier, and wherein said control means is capable of changing said density adjustment factor within a predetermined programmable range, and said control means comprises:

film thickness deriving means which calculates the film thickness of said photosensitive member;

programmable range setting means which modifies and sets said programmable range in accordance with the film thickness of said photosensitive member calculated by said film thickness deriving means; and optimization means which forms toner images as patch images while modifying and setting a value of said density adjustment factor to multiple levels within said programmable range set by said programmable range setting means, causes said density measuring means measure the image densities of said patch images, calculates said film-thickness-equivalent value based on a result of said detection, and sets said density adjustment factor to said film-thickness-equivalent value.

28. The image forming apparatus of claim 27, further comprising:

charging means which contacts said photosensitive member and charges a surface of said photosensitive member; and charging bias generating means which supplies a charging bias voltage to said charging means, and wherein when a charging bias is said density adjustment factor, said programmable range setting means modifies and sets a programmable range of said charging bias such that the absolute value of a charging potential of said photosensitive member increases as the film thickness of said photosensitive member decreases.

29. The image forming apparatus of claim 27, further comprising developing bias generating means which supplies a developing bias voltage to said developing means, and wherein when a developing bias is said density adjustment factor, said programmable range setting means modifies and sets a programmable range of said developing bias such that the absolute value of said developing bias decreases as the film thickness of said photosensitive member decreases.

30. The image forming apparatus of claim 27, further comprising exposure means which irradiates a surface of said photosensitive member with a light beam and accordingly forms an electrostatic latent image, and wherein when an exposure energy of said light beam is said density adjustment factor, said programmable range setting means modifies and sets a programmable range of said exposure energy such that said exposure energy decreases as the film thickness of said photosensitive member decreases.

31. The image forming apparatus of claim 27, further comprising:

exposure means which irradiates a surface of said photosensitive member with a light beam and accordingly forms an electrostatic latent image; and developing bias generating means which supplies a developing bias voltage to said developing means, and wherein when a developing bias and an exposure energy of said light beam serve as said density adjustment factor, said programmable range setting means modifies and sets a programmable range of said developing bias such that the absolute value of said developing bias decreases as the film thickness of said photosensitive member decreases, and modifies and sets a programmable range of said exposure energy such that said exposure energy increases as the film thickness of said photosensitive member decreases.

32. The image forming apparatus of claim 27, further comprising:

charging means which charges a surface of said photosensitive member; charging bias generating means which supplies a charging bias voltage to said charging means; and developing bias generating means which supplies a developing bias voltage to said developing means, and wherein when a charging bias and a developing bias serve as said density adjustment factor, said programmable range setting means modifies and sets a programmable range of said charging bias such that the absolute value of a charging potential of said photosensitive member decreases as the film thickness of said photosensitive member decreases, and modifies and sets a programmable range of said developing bias such that the absolute value of said developing bias decreases as the film thickness of said photosensitive member decreases.

33. An image forming apparatus, comprising:

exposure means which irradiates a surface of a photosensitive member with a light beam and accordingly forms an electrostatic latent image;

developer means which visualizes an electrostatic latent image formed on said photosensitive member with toner and accordingly visualizes a toner image; and control means which controls a density adjustment factor influencing the image density of a toner image, to thereby control the image density of a toner image formed on said photosensitive member to a reference target density, and wherein said density adjustment factor is modified and set in accordance with a necessity and the image density of a toner image is accordingly changed to an image density which is deviated from said reference target density.

34. The image forming apparatus of claim 33, further comprising density detecting means which detects the image density of a patch image which is a toner image formed on said photosensitive member or a toner image which is obtained as a toner image formed on said photosensitive member is transferred onto a transfer medium, and wherein said control means has a normal mode which is for forming a toner image at said reference target density and a user mode which is for forming a toner image at a user's target density which is different from said reference target density, and said density adjustment factor is controlled based on the image density of a patch image which is detected by said density detecting means, such that the image density of a toner image becomes said user's target density.

35. The image forming apparatus of claim 34, wherein said reference target density and said user's target density each has a lower-density side target density and a higher-density side target density which is higher than said lower-density side target density and in said user mode, while ensuring that said lower-density side target density of said user's target density approximately matches with said lower-density side target density of said reference target density, said control means controls said density adjustment factor such that said higher-density side target density of said user's target density stays different from said higher-density side target density of said reference target density.

36. The image forming apparatus of claim 34, wherein said reference target density and said user's target density each has a lower-density side target density and a higher-density side target density which is higher than said lower-density side target density, and in said user mode, while ensuring that said higher-density side target density of said user's target density approximately matches with said higher-density side target density of said reference target density, said control means controls said density adjustment factor such that said lower-density side target density of said user's target density stays different from said lower-density side target density of said reference target density.

37. The image forming apparatus of claim 34, wherein said control means forms patch images while modifying and setting said density adjustment factor, and calculates an optimal value of said density adjustment factor which is necessary to form a toner image at said user's target density based on the image densities of said patch images.

38. The image forming apparatus of claim 34, wherein said control means forms patch images while modifying and setting said density adjustment factor, and after calculating an optimal value of said density adjustment factor which is necessary to form a toner image at said reference target density based on the image densities of said patch images, corrects said optimal value and accordingly calculates an optimal value of said density adjustment factor which is necessary to form a toner image at said user's target density.

39. The image forming apparatus of claim 38, wherein said control means performs said correction based on a photo-induced discharge characteristic of said photosensitive member.

40. The image forming apparatus of claim 38, wherein said reference target density and said user's target density each has a lower-density side target density and a higher-density side target density which is higher than said lower-density side target density, and in said normal mode, said control means sets one piece of correlation data belonging to a product set of lower-density side correlation data and higher-density side correlation data as an optimal exposure energy and an optimal developing bias, said lower-density side correlation data being between exposure energies and developing biases, which are necessary to form a toner image at said lower-density side target density of said reference target density, said higher-density side correlation data being between exposure energies and developing biases which are necessary to form a toner image at said higher-density side target density of said reference target density, and in said user mode, said control means corrects an exposure energy to a higher value than said optimal exposure energy and corrects the absolute value of said developing bias to a lower value that the absolute value of said optimal developing bias.

41. The image forming apparatus of claim 40, wherein said control means ensures in said user mode that the corrected exposure energy and the corrected developing bias satisfy said lower-density side correlation data.

42. The image forming apparatus of claim 40, wherein said control means ensures in said user mode that the corrected exposure energy and the corrected developing bias satisfy said higher-density side correlation data.

43. The image forming apparatus of claim 38, wherein said reference target density and said user's target density each has a lower-density side target density and a higher-density side target density which is higher than said lower-density side target density, and in said normal mode, said control means sets one piece of correlation data belonging to said product set of lower-density side correlation data and higher-density side correlation data as an optimal exposure energy and an optimal developing bias, said lower-density side correlation data being between exposure energies and developing biases which are necessary to form a toner image at said lower-density side target density of said reference target density, said higher-density side correlation data being between exposure energies and developing biases which are necessary to form a toner image at said higher-density side target density of said reference target density, and in said user mode, said control means corrects an exposure energy to a lower value than said optimal exposure energy and corrects the absolute value of said developing bias to a higher value than the absolute value of said optimal developing bias.

44. The image forming apparatus of claim 38, wherein said reference target density and said user's target density each has a lower-density side target density and a higher-density side target density which is higher than said lower-density side target density, in said normal mode, said control means sets one piece of correlation data belonging to said product set of lower-density side correlation data and higher-density side correlation data as an optimal exposure energy and an optimal developing bias, said lower-density side correlation data being between exposure energies and developing biases which are necessary to form a toner image at said lower-density side target density of said reference target density, said higher-density side correlation data being between exposure energies and developing biases which are necessary to form a toner image at said higher-density side target density of said reference target density, and in said user mode, said control means corrects an exposure energy to a higher value than said optimal exposure energy and corrects the absolute value of said developing bias to a higher value than the absolute value of said optimal developing bias.

45. The image forming apparatus of claim 38, wherein said reference target density and said user's target density each has a lower-density side target density and a higher-density side target density which is higher than said lower-density side target density, in said normal mode, said control means sets one piece of correlation data belonging to said product set of lower-density side correlation data and higher-density side correlation data as an optimal exposure energy and an optimal developing bias, said lower-density side correlation data being between exposure energies and developing biases which are necessary to form a toner image at said lower-density side target density of said reference target density, said higher-density side correlation data being between exposure energies and developing biases which are necessary to form a toner image at said higher-density side target density of said reference target density, and in said user mode, said control means corrects an exposure energy to a lower value than said optimal exposure energy and corrects the absolute value of said developing bias to a lower value than the absolute value of said optimal developing bias.

46. An image forming method in which a surface of a photosensitive member is exposed to a light beam, an electrostatic latent image is accordingly formed, said electrostatic latent image is visualized with toner and a toner image is accordingly formed, characterized in comprising the steps of:

controlling a density adjustment factor influencing the image density of a toner image so that the image density of a toner image becomes a reference target density; and modifying said density adjustment factor in accordance with a necessity so as to change the image density of a toner image to an image density which is deviated from said reference target density.

* * * * *